United States Patent

Muraji et al.

[11] Patent Number: 5,886,745
[45] Date of Patent: Mar. 23, 1999

[54] PROGRESSIVE SCANNING CONVERSION APPARATUS

[75] Inventors: Tsutomu Muraji, Ikoma; Keiichi Kuzumoto, Neyagawa; Satoshi Hirotsune, Settsu; Mitsuru Kotaka, Sakai, all of Japan

[73] Assignee: Matsushita Electric Industrial Co., Ltd., Kadoma, Japan

[21] Appl. No.: 568,477

[22] Filed: Dec. 7, 1995

[30] Foreign Application Priority Data

| Dec. 9, 1994 | [JP] | Japan | 6-305785 |
| Dec. 9, 1994 | [JP] | Japan | 6-305786 |
| Dec. 28, 1994 | [JP] | Japan | 6-326696 |
| Jul. 14, 1995 | [JP] | Japan | 7-178482 |

[51] Int. Cl.$^6$ ................................................ H04N 7/01
[52] U.S. Cl. ................................................ 348/448
[58] Field of Search ............................ 348/441, 448, 348/449, 450, 451, 452; H04N 7/01, 11/20

[56] References Cited

U.S. PATENT DOCUMENTS

| 4,985,764 | 1/1991 | Sato | 348/448 |
| 5,093,721 | 3/1992 | Rabii | 348/448 |
| 5,410,356 | 4/1995 | Kikuchi et al. | 348/452 |
| 5,488,422 | 1/1996 | Faroudja et al. | 348/448 |
| 5,532,751 | 7/1996 | Lui | 348/448 |

FOREIGN PATENT DOCUMENTS

| 2246686 | 10/1990 | Japan . |
| 4343590 | 11/1992 | Japan . |
| 4364685 | 12/1992 | Japan . |
| 6153169 | 5/1994 | Japan . |

Primary Examiner—Michael H. Lee
Attorney, Agent, or Firm—Renner, Otto, Boisselle, Sklar

[57] ABSTRACT

A progressive scanning conversion apparatus for converting an interlaced scan video signal into a progressive scan video signal by performing interpolation based on original pixels which are obtained in a matrix by sampling the interlaced scan video signal in a current field, original pixels which are obtained in a matrix by sampling the interlaced scan video signal in a previous field which is immediately prior to the current field, and original pixels which are obtained in a matrix by sampling the interlaced scan video signal in a next field which is immediately following the current field. The apparatus includes a motion vector detector for detecting a motion vector between two of the current field, the previous field, and the next field; a motion estimation circuit for estimating a pixel value in the current field, from one of a pixel in the previous field and a pixel in the next field using the motion vector detected by the vector detection means; and an interpolated pixel generator for generating an interpolated pixel used for conversion by multiplying the pixel value obtained by the motion estimation means and the corresponding pixel value in the current field by a weighting factor and summating the multiplication results.

17 Claims, 29 Drawing Sheets

FIG. 2A  Previous field (t−1)
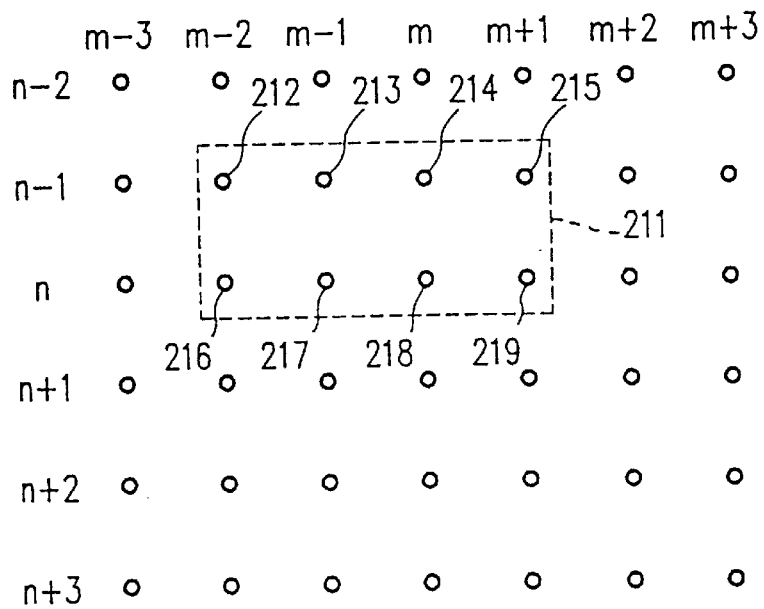
FIG. 2B  Current field (t)
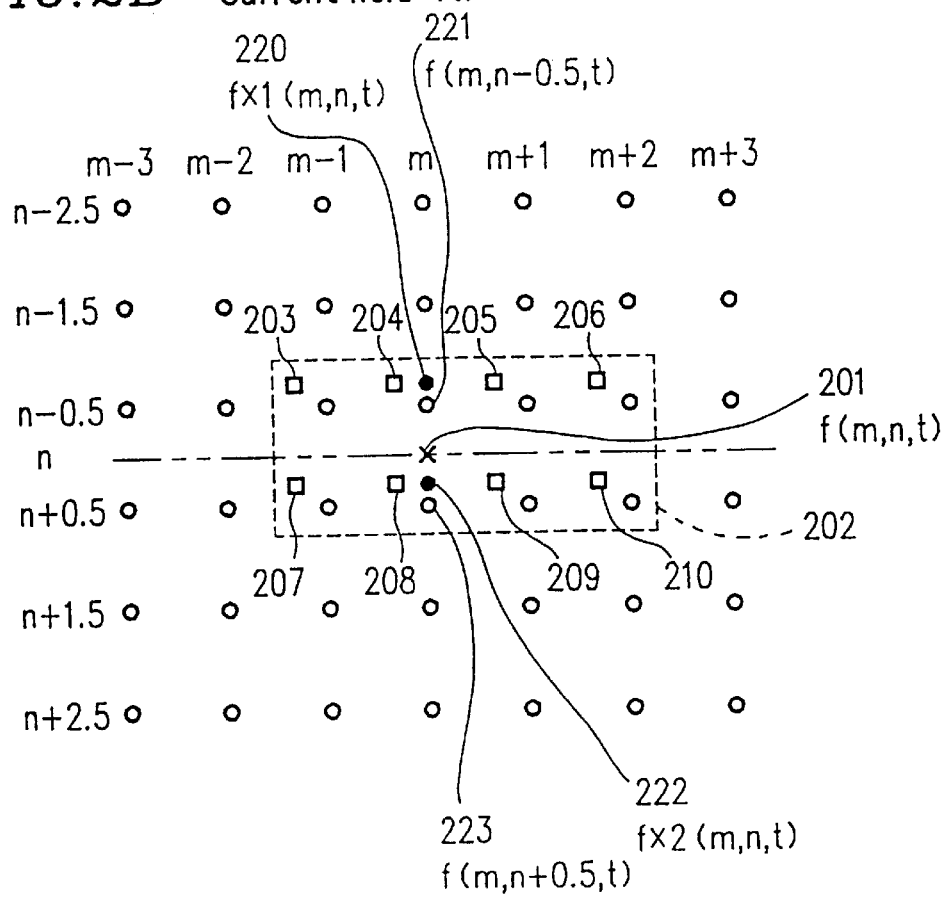

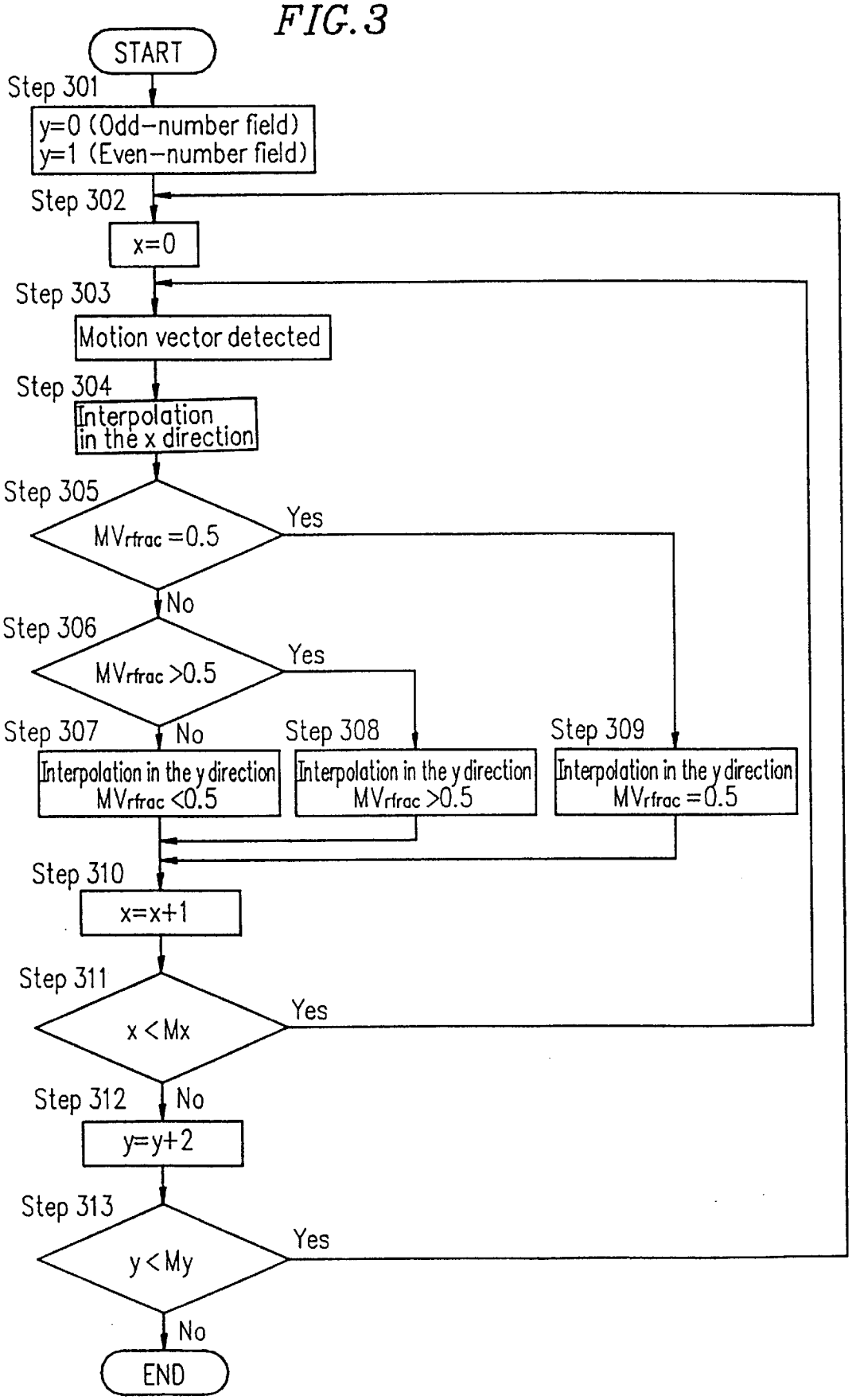

$a=b=c=d=g=100$
$e=f=0$
$h=i=l=m=n=100$
$j=k=0$

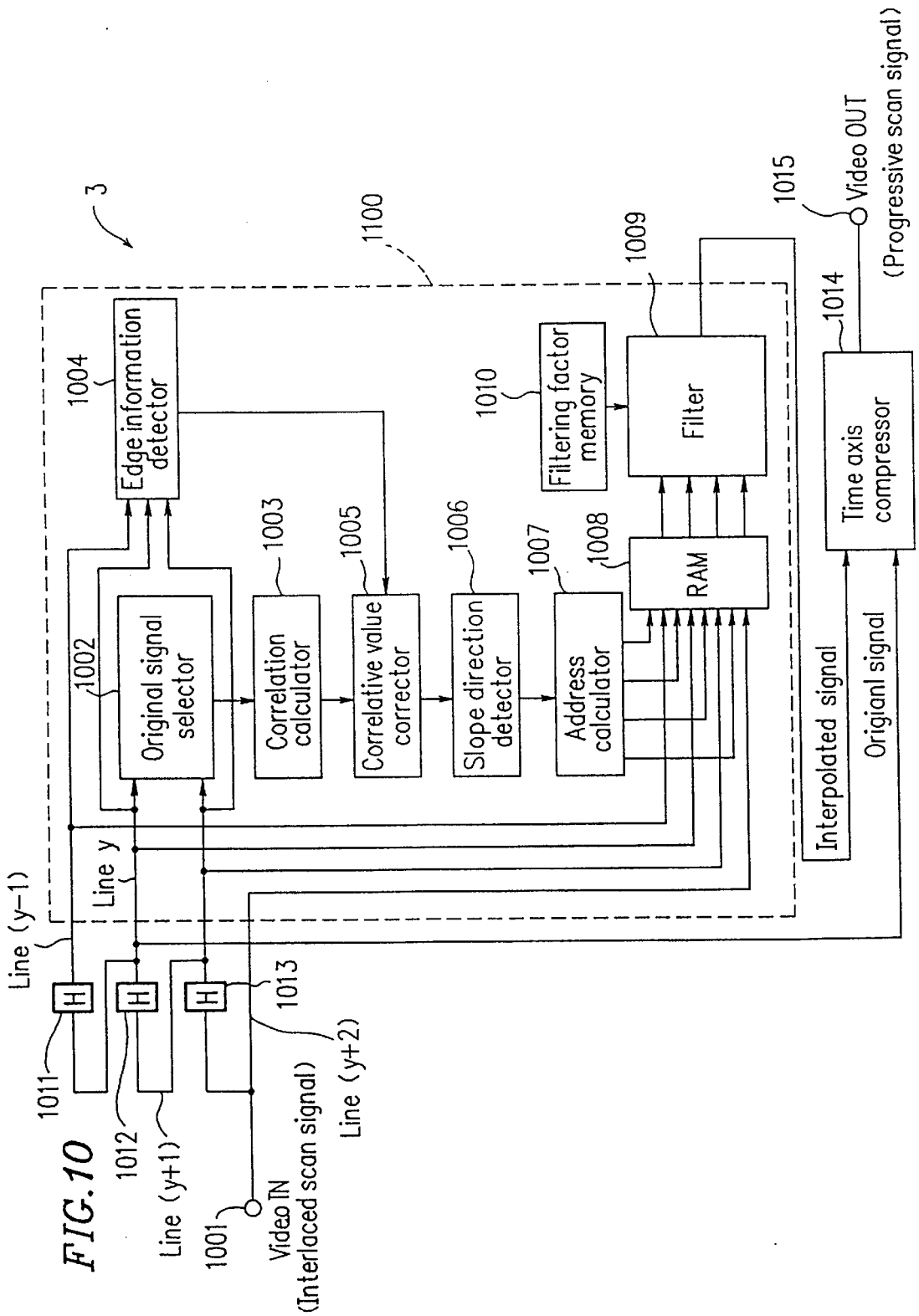

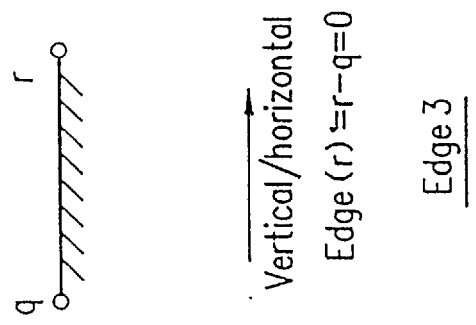
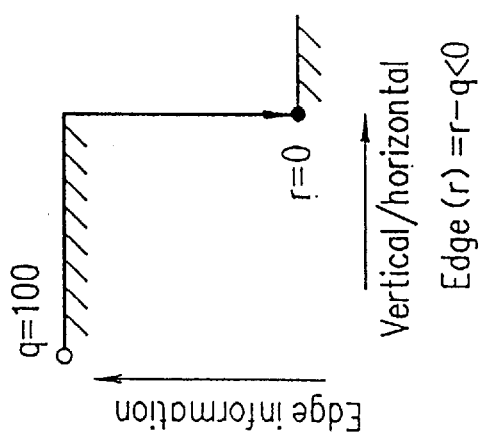
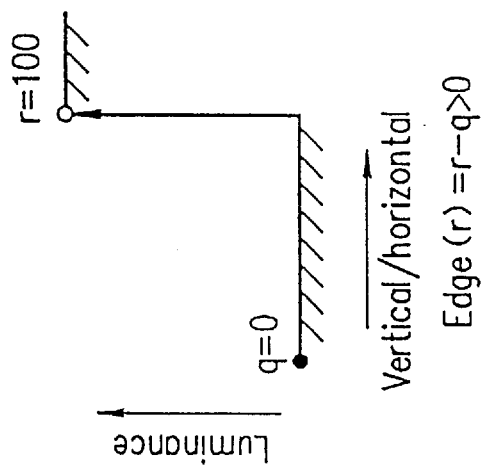

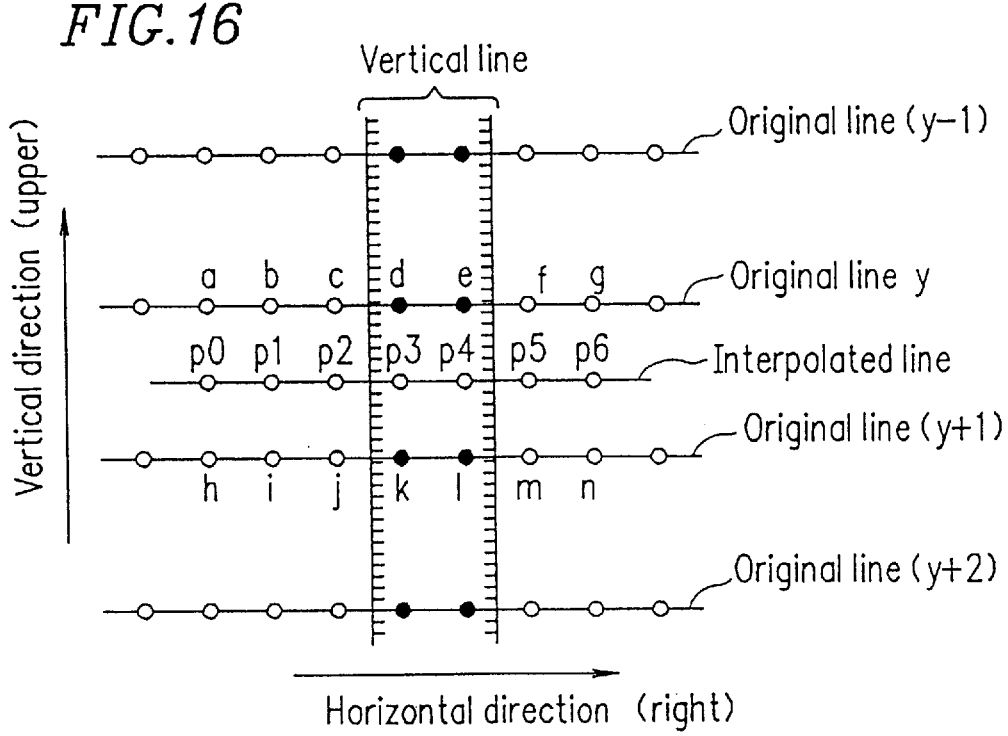

FIG. 20
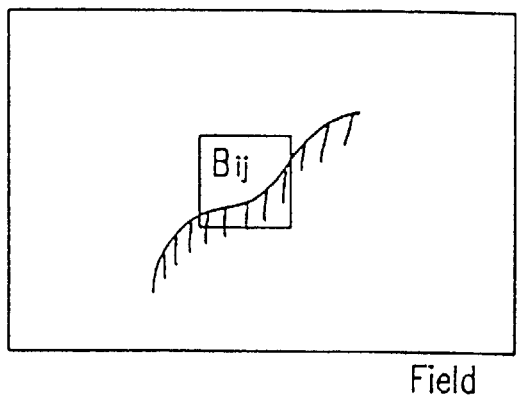
Field
FIG. 21
| B(i-1)(j-1) | B(i-1)j | B(i-1)(j+1) |
| --- | --- | --- |
| Bi(j-1) | Bij | Bi(j-1) |
| B(i+1)(j-1) | B(i+1)j | B(i+1)(j+1) |
FIG. 22
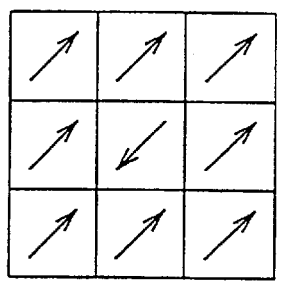
FIG. 23
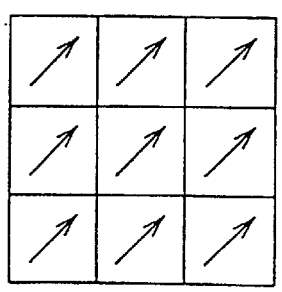

PROGRESSIVE SCANNING CONVERSION APPARATUS

BACKGROUND OF THE INVENTION

1. Field of the Invention

The present invention relates to a progressive scanning conversion apparatus for converting an interlaced scan video signal into a progressive scan video signal.

2. Description of the Related Art

A conventionally well known progressive scanning conversion apparatus for converting a 2:1 interlaced scan video signal into a 1:1 progressive scan video signal is a motion adaptive line scanning interpolator which is used in a receiving circuit for IDTV (improved definition television). In the motion adaptive line scanning interpolator, a motion detector determines whether there is a motion or not. When there is a motion, a signal from a line scanning interpolator is selected; and when there is no motion, a signal from a field scanning interpolator is selected. As a line scanning interpolator, two types have been proposed: one is a "twice-writing" line scanning interpolator, by which a previously scanned line is written for the second time; and the other is an "average" line scanning interpolator which uses an average of a current line signal and a previous line signal. Further, another type of line scanning interpolator has been proposed, which uses an average of the pixel values in an oblique direction having a high level of correlation (oblique average line scanning interpolation), in order to prevent deterioration in the resolution of an oblique edge (Japanese Laid-Open Patent Publication No. 6-153169).

A conventional progressive scanning conversion apparatus will be described with reference to FIGS. 28, 7 and 8.

FIG. 28 is a block diagram of a conventional motion adaptive line scanning interpolator 100. An interlaced scan signal which is input to an input terminal 2801 (hereinafter, referred to as a "next field signal") is output from a field memory 2802 as a video signal delayed by one field (hereinafter, referred to as a "current field signal") and from a field memory 2803 as a video signal delayed by another field (hereinafter, referred to as a "previous field signal"). Based on the differential absolute value between the next field signal and the previous field signal, whether a motion exists or not is determined pixel by pixel by a motion detector 2805. A line scanning interpolator 2807 generates an interpolated signal by one of two methods: one is the twice-writing line scanning interpolation, by which a video signal which is delayed by a line memory 2804 by one line (hereinafter, referred to as a "previous line signal") is written for the second time; and the other is average line scanning interpolation, by which an average of the previous line signal and the current line signal is used. A field scanning interpolator 2806 generates an interpolated signal from the previous field signal. A switch 2808 selects one of the interpolated signals based on the determination result of the motion detector 2805. If a motion exists, the switch 2808 selects the interpolated signal generated by the line scanning interpolator 2807; and if a motion does not exist, the switch 2808 selects the interpolated signal generated by the field scanning interpolator 2806. The current field signal and the interpolated signal which is output from the switch 2808 are converted into a progressive scan signal by a time axis compressor 2809 and then output from an output terminal 2810.

FIG. 7 is a view showing an oblique edge on the display. Letters a through n denote original pixels on original lines which represent an interlaced scan video signal. Letters p0 through p6 denote interpolated pixels to be generated by interpolation in order to generate a progressive scan video signal. For simplicity, letters a through n and p0 through p6 also represent the values of the respective pixels. The values of the original pixels (corresponding to the luminance on the display) are: a=b=c=d=e=h=i=j=100 and f=g=k=l=m=n=0. The edge parallel to the direction f-k shown in FIG. 7 will be referred to the "f-k" edge. The display is white in an area upper left to the f-k edge and black in an area lower right to the f-k edge. The motion adaptive line scanning interpolator 100 operates in the following manner to generate an interpolated pixel.

In the case where the motion detector 2805 determines that there is no motion, the switch 2808 selects the interpolated signal generated by the field scanning interpolator 2806. If the image is a still picture, the pixel values are: p0=p1=p2=p3=100 and p4=p5=p6=0. Thus, a line is generated by interpolation.

In the case where the motion detector 2805 determines that there is a motion, the switch 2808 selects the interpolated signal generated by the line scanning interpolator 2807. If the line scanning interpolator 2807 performs interpolation by twice-writing line scanning interpolation, a previously scanned line is written for the second time. Thus, the pixel values are: p0=p1=p2=p3=p4=100; and p5=p6=0. In this manner, a line is generated by interpolation. If the line scanning interpolator 2807 performs interpolation by average line scan interpolation, an average of the scan lines which are adjacent to the interpolated line (line to be generated) is used. Thus, the pixel values are: p0=p1=p2=100; p3=p4=50; and p5=p6=0.

In the case where an average of pixel values lined in an oblique direction having a high level of correlation is used for line scanning interpolation (oblique average line scanning interpolation), the differential values between a plurality of pairs of original pixels in the vertical and oblique directions passing the interpolated pixel are compared. The direction in which the pair of pixels have the minimum differential value is regarded as having the highest correlation. The average of the pair of pixels in that direction is used as the interpolated pixel value. The directions compared are the vertical direction, three oblique directions to the right, and three oblique directions to the left. For example, with respect to the interpolated pixel p3, such directions are directions a-n, b-m, c-l, d-k, e-j, f-i, and g-h. The pixel values are: p0=p1=100; p2=100 (c-j or d-i), p3=100 (e-j); p4=0 (f-k); and p5=p6=0.

Such a conventional motion adaptive line scanning interpolator 100 has the problem in that the following quality deterioration occurs at an edge of a moving picture generated because of line interpolation.

In the case where the oblique f-k edge shown in FIG. 7 is obtained by twice-writing line scanning interpolation, the pixel values are: p3=p4=100 (i.e., white). Accordingly, the edge is not completely straight but is zigzagged. As a result, interline flicker and pairing artifact which are generated during interlaced scanning are not alleviated. The interline flicker and pairing artifact are causes of image quality deterioration in an interfaced scan moving image.

In the case where the oblique f-k edge shown in FIG. 7 is obtained by average line scanning interpolation, the pixel values are: p3=p4=50 (i.e., gray). As a result, interline flicker and pairing artifact are slightly alleviated but the resolution in oblique directions is lowered, thereby blurring the oblique f-k edge.

In the case where an average of pixel values located in an oblique direction having a high level of correlation (oblique average line scanning interpolation) is used for line scanning interpolation, the pixel values are: p3=100 and p4=0. The f-k edge is sufficiently generated. In the case of an oblique line A shown in FIG. 8, the values of the pixels p0 through p6 are each 100. The interpolation direction for the pixel p3 cannot be specified since the differential values, namely, the correlation is the same in the directions a-n, b-m, c-l, e-j and g-h. Even if an algorithm for selecting an intermediate direction is used, the value of the pixel p3 is 100 by selecting the direction c-l. In the case of the pixel p4 also, the correlation is the same in the directions c-n, d-m and f-k. Thus, the pixel value p4=100. Accordingly, the oblique line A is cut; that is, interpolation is not performed.

For the oblique line A shown in FIG. 8, the average line scanning interpolation is better than the oblique average line scanning interpolation because the line generated by the former is blurred but not cut.

As is described above, the oblique average line scanning interpolation is effective for generating an edge of an image having a relatively large area but cannot be useful for generating a relatively thin oblique line.

SUMMARY OF THE INVENTION

In one aspect of the present invention, a progressive scanning conversion apparatus converts an interlaced scan video signal into a progressive scan video signal by performing interpolation based on original pixels which are obtained in a matrix by sampling the interlaced scan video signal in a current field, original pixels which are obtained in a matrix by sampling the interlaced scan video signal in a previous field which is immediately prior to the current field, and original pixels which are obtained in a matrix by sampling the interlaced scan video signal in a next field which is immediately following the current field. The apparatus includes a motion vector detection device for detecting a motion vector between two of the current field, the previous field, and the next field; a motion estimation device for estimating a pixel value in the current field, from one of a pixel in the previous field and a pixel in the next field using the motion vector detected by the vector detector; and an interpolated pixel generation device for generating an interpolated pixel used for conversion by multiplying the pixel value obtained by the motion estimation device and the corresponding pixel value in the current field by a weighting factor and summating the multiplication results.

In another aspect of the present invention, a progressive scanning conversion apparatus converts an interlaced scan signal into a progressive scan signal by performing interpolation based on original pixels which are obtained in a matrix by sampling the interlaced scan video signal in one field. The apparatus includes a slope direction detection device for detecting a slope direction of a pair of original pixels, the pixel values of which have a minimum correlative value among a plurality of pairs of original pixels which are symmetrical with respect to an interpolated pixel to be generated for conversion; a slope direction storage device for storing the slope direction detected by the slope direction detection device; and a filter device for generating the interpolated pixel. The slope direction detection device detects the slope direction from among a plurality of slope directions in a prescribed range, the center of the prescribed range being a prescribed slope direction stored in the slope direction storage device. The slope direction storage device sequentially stores slope direction detected by the slope direction detection device while outputting the prescribed slope direction among the stored slope directions. The filter device generates the interpolated pixel for conversion based on a prescribed number of original pixels in the slope direction detected by the slope direction detection device.

In still another aspect of the present invention, a progressive scanning conversion apparatus converts an interlaced scan signal into a progressive scan signal by performing interpolation based on original pixels which are obtained in a matrix by sampling the interlaced scan video signal in one field. The apparatus includes an original pixel selection device for selecting a plurality of pairs of original pixels which are symmetrical with respect to an interpolated pixel to be generated for conversion; a correlative value calculation device for calculating correlative values of the values of the pairs of original pixels selected by the original pixel selection device; an edge information detection device for detecting edge information of each of the original pixels; a correlative value correction device for correcting the correlative values calculated by the correlative value calculation device, using the edge information detected by the edge information detection device; a slope direction detection device for detecting a slope detection of the pair of original pixels having a minimum correlative value among the correlative values obtained by the correlative value correction device; and a filter device for generating the interpolated pixel based on a prescribed number of original pixels in the slope direction detected by the slope direction detection device.

In yet another aspect of the present invention, a progressive scanning conversion apparatus converts an interlaced scan signal into a progressive scan signal by performing interpolation based on original pixels which are obtained in a matrix by sampling the interlaced scan video signal in one field. The apparatus includes an original pixel selection device for selecting a plurality of pairs of original pixels which are symmetrical with respect to an interpolated pixel to be generated for conversion; a correlative value calculation device for calculating correlative values of the values of the pairs of original pixels selected by the original pixel selection device; a vertical direction edge information detection device for detecting edge information in the vertical direction of each of the original pixels; a first correlative value correction device for correcting the correlative values calculated by the correlative value calculation device, using the edge information in the vertical direction detected by the vertical direction edge information detection device; a second correlative value correction device for correcting the correlative values obtained by the first correlative value correction device using the edge information in the vertical direction of each of the pairs of original pixels; a slope direction detection device for detecting a slope detection of the pair of original pixels having a minimum correlative value among the correlative values obtained by the first and second correlative value correction device; and a filter device for generating the interpolated pixel based on a prescribed number of original pixels in the slope direction detected by the slope direction detection device.

In yet another aspect of the preset invention, a progressive scanning conversion apparatus converts an interlaced scan signal into a progressive scan signal by performing interpolation based on original pixels which are obtained in a matrix by sampling the interlaced scan video signal in a current field, original pixels which are obtained in a matrix by sampling the interlaced scan video signal in a previous field which is immediately prior to the current field, and original pixels which are obtained in a matrix by sampling the interlaced scan video signal in a next field which is immediately following the current field. The apparatus includes a first field memory for storing the interlaced scan video signal in the current field; a second field memory for storing the interlaced scan video signal in the previous field which is immediately prior to the current field; a motion vector detection device for detecting a motion vector between the current field and the next field which is immediately following the current field; a motion estimation device for performing interpolation of a scan line by the motion vector; an intrafield interpolation device for performing interpolation of a scan line by the video signal in the current field; interpolated signal selection signal for selecting one of a signal generated by the motion estimation device and a signal generated by the intrafield interpolation device, the selection being performed based on a motion vector reliability determination result obtained by the motion vector detection device.

In yet another aspect of the present invention, a progressive scanning conversion apparatus converts an interlaced scan signal into a progressive scan signal by performing interpolation based on original pixels which are obtained in a matrix by sampling the interlaced scan video signal in a current field, original pixels which are obtained in a matrix by sampling the interlaced scan video signal in a previous field which is immediately prior to the current field, and original pixels which are obtained in a matrix by sampling the interlaced scan video signal in a next field which is immediately following the current field. The apparatus includes a first field memory for storing the interlaced scan video signal in the current field; a second field memory for storing the interlaced scan video signal in the previous field which is immediately prior to the current field; a motion vector detection device for detecting a motion vector between the current field and the next field which is immediately following the current field, the motion vector being detected with such precision as to have a fractional value; a motion estimation interpolation device for generating a pixel by the motion vector; an oblique line interpolation device for generating a pixel by oblique line interpolation using a pair of original pixels having a highest level of correlation among a plurality of pairs of original pixels in the current field which are symmetrical with respect to the interpolated signal to be generated; and an interpolated pixel selection device for selecting one of the pixel generated by the motion estimation interpolation device and the pixel generated by the oblique line interpolation device, the selection being performed based on the motion vector and a motion vector reliability determination result both obtained by the motion vector detection device.

Thus, the invention described herein makes possible the advantages of providing a progressive scanning conversion apparatus for performing effective interpolation even for generating an oblique edge and an oblique line, with high quality having less interline flicker or pairing artifact, both in a moving picture and a still picture.

These and other advantages of the present invention will become apparent to those skilled in the art upon reading and understanding the following detailed description with reference to the accompanying figures.

BRIEF DESCRIPTION OF THE DRAWINGS

FIGS. 2A and 2B are views respectively showing pixels in a previous field and a current field which are input to the progressive scanning conversion apparatus in the first example;

FIG. 3 is a flowchart illustrating the operation of the progressive scanning conversion apparatus in the first example;

FIG. 10 is a block diagram of a progressive scanning conversion apparatus in a third example according to the present invention;

FIG. 15 is a view describing a plurality of types of edge;

FIG. 16 is a view showing a vertical line on the display;

FIG. 20 is a view showing the position of a pixel block in an image to be generated using by block matching;

FIG. 21 is a view illustrating pixel blocks used in block matching;

FIGS. 22 and 23 are views showing motion vectors in different cases;

DESCRIPTION OF THE PREFERRED EMBODIMENTS

Figure 1:
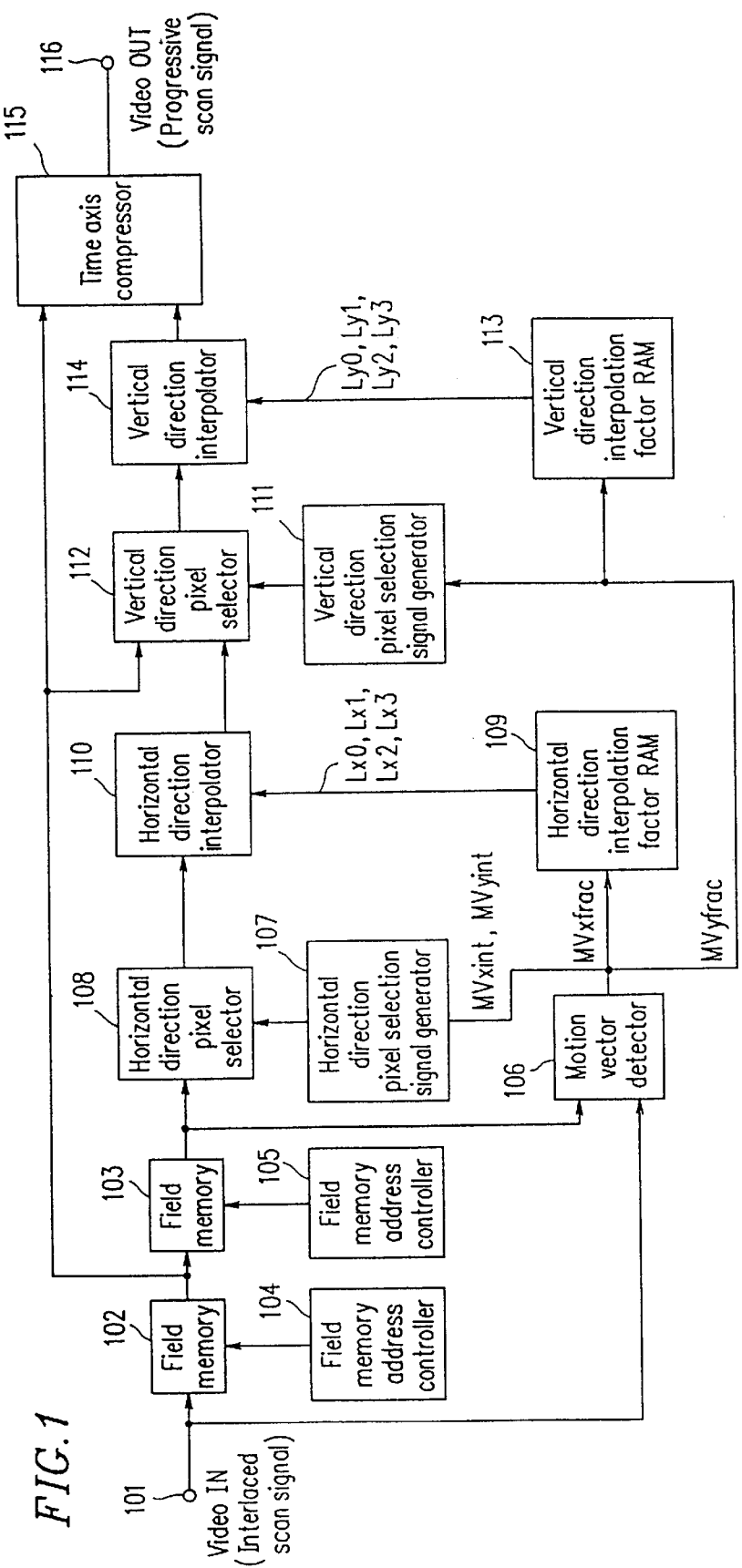
FIG. 1 is a block diagram of a progressive scanning conversion apparatus in a first example according to the present invention.

Hereinafter, the present invention will be described by way of illustrative examples with reference to the accompanying drawings. The same reference numeral denotes the same element.

EXAMPLE 1

FIG. 1 is a block diagram of a progressive scanning conversion apparatus 1 in a first example according to the present invention. The operation of the progressive scanning conversion apparatus 1 will be described together with the structure thereof.

A video input terminal 101 receives a signal obtained by interlaced scanning. (In this specification, a signal obtained by interlaced scanning will be referred to as an "interlaced scan signal"; and a signal obtained by progressive scanning will be referred to as a "progressive scan signal".) Field memories 102 and 103 each delay the input signal by one field.

Conversion of an interlaced scan signal into a progressive scan signal requires interpolation of pixel values of the interlaced scan signal. A pixel value is a value which defines the color of the pixel forming a display image. In the case of monochrome display, a pixel value is a numerical figure representing the luminance of the pixel. When, for example, 8 bits are allocated for the pixel value, a pixel value can be one of the numerical figures between 0 to 255. In the case of color display, a pixel value is a numerical figure representing the luminance of the RGB (red, green or blue) component of the pixel.

In this specification, description will be done based on three sequential fields of the input interlaced scan signal. The three fields will be referred to respectively as "(t−1)th field", "t'th field", and "(t+1)th field", where t is an integer. The (t−1)th field is the oldest on the time axis, and the (t+1)th field is the latest on the time axis. The t'th field is the one which is being processed for interpolation and will be referred to as a "current field". The (t−1)th field will be referred to as a "previous field", and the (t+1)th field will be referred to as a "next field". In this specification, the term "current field signal" is used for simplicity to express a signal representing a pixel on the current field. The terms "previous field signal" and the "next field signal" are respectively used similarly. For example, when the field memory 102 outputs a current field signal; the video input terminal 101 receives a next field signal, and the field memory 103 outputs a previous field signal.

Field memory address controller 104 and 105 respectively control the addresses of the field memories 102 and 103, thus updating the pixel value data stored in the field memories 102 and 103 and also selectively outputting necessary pixel values.

FIGS. 2A and 2B are views respectively showing pixels in a previous field and a current field which are input to the progressive scanning conversion apparatus 1.

In FIGS. 2A and 2B, f(x,y,t) represents the value of a pixel represented by coordinates (x,y) in the t'th field, where x, y and t are all integers. In this specification, the pixel represented by coordinates (x,y) will be referred to as the "pixel (x,y)". For simplicity, a monochrome display is described herein, and thus the pixel value is a numerical figure representing the luminance of the pixel. A motion vector (MVx,MVy) used for interpolation is obtained from the previous field and the next field. It can be assumed that the pixel at (x,y) in the previous field has moved to the pixel (x+MVx, y+MVy) in the next field. Components of a motion vector, namely, MVx and MVy respectively represent the x component in the horizontal direction, namely, line direction, and the y component in the direction vertical to the line direction. The positive direction of the x and y components are the positive direction of the x and y coordinates in FIGS. 2A and 2B. A unit length of MVx corresponds to a dot pitch in the horizontal direction; and a unit length of MVy corresponds to a line pitch in one field. Where the distance between adjacent pixels in the x and y directions is 1, the motion vector can be detected with such precision as to have a fractional value. Namely, MVx=MVxint+MVxfrac, where MVxint represents the integer value and MVxfrac represents the fractional value. MVy=MVyint+MVyfrac, where MVyint epresents the integer value and MVyfrac represents the ractional value.

In order to generate a progressive scan signal, he pixel values in the current field corresponding to the pixel values in the previous field which are indicated by "○" (FIG. 2A) are needed in addition to the pixel values on the current field indicated by "○" (FIG. 2B). The former pixel values are obtained by interpolation. In this example, the pixel value indicated by "×" in FIG. 2B which corresponds to the pixel value at (m,n) in FIG. 2A will be found by interpolation, where m and n are integers. The pixel (m,n), which is the target for interpolation will be referred to as an "interpolated pixel", and the value thereof will be referred to as an "interpolated pixel value".

The interpolated pixel value in this example is the value of a pixel 201 f(m,n,t). In this example, the motion vector (MVx,MVy), including an integer value and a fractional value, is (0.7, 0.2). An area 202 indicated by the dotted line is an area in the vicinity of the interpolated pixel 201 f(m,n,t). The area 202 is represented by the x coordinate of (m−1.5 to m+2.5) and the y coordinate of (n−1.0) to (n+1.0). A pixel in the previous field moves to a pixel in the area 202 in the current field by the motion vector. Once the motion vector and the area 202 are given, the location of the pixel in the area 202 in the previous field before moving to the current field is determined. Since the motion vector is (0.7, 0.2), pixels 203 through 210 in the area 202 (FIG. 2B) correspond to pixels 212 through 219 in an area 211 in the previous field (FIG. 2A). It should be noted that the pixels 203 through 210 are virtual pixels used in calculation and thus do not exist in the current field. Rather, the pixels 203 through 210 are obtained by projecting the pixels 212 through 219 in the previous field on the current field. The value of the interpolated pixel 201 f(m,n,t) is obtained by using the values of the pixels 203 through 210. Interpolation performed in such a manner is more precise than interpolation performed by using only the pixels in the current field.

Referring back to FIG. 1, a motion vector detector 106 detects a motion vector (MVx,MVy) corresponding to the interpolated pixel in the current field using the previous field signal and the next field signal.

In this example, the motion vector (MVx,MVy) is detected using a plurality of pixels in the previous field and a plurality of pixels in the next field, but the method for detection is not limited to this. For example, a motion vector can be detected using a plurality of pixels in the previous field and a plurality of pixels in the current field.

A horizontal direction pixel selection signal generator 107 generates a selection signal for selecting pixels in the previous field to be used for interpolation in the horizontal direction, using the integer value of the motion vector, namely, MVxint and MVyint. The generated signal is sent to a horizontal direction pixel selector 108. Based on the input signal, the horizontal direction pixel selector 108 selects the pixels in the previous field to be used for interpolation in the horizontal direction, and outputs the values of the selected pixels to a horizontal direction interpolator 110. Referring to FIGS. 2A and 2B, the pixels 203 through 210 are considered to have the same values as those of the pixels 212 through 219. Accordingly, the horizontal direction pixel selection signal generator 107 and horizontal direction pixel selector 108 select and output to the horizontal direction interpolator 110 the values of the pixels 212 through 219 among the pixels in the previous field stored in the field memory 103.

Hereinafter, a scheme for obtaining the value of the interpolated pixel 201 f(m,n,t) by interpolation will be described. For interpolation, a lagrange interpolation polynomial is used.

First, interpolation in the x direction is performed. In detail, a pixel 220 fx1(m,n,t) is formed from the pixels 203 through 206 using third-order lagrange interpolation. Actual calculation is executed as is expressed by equations (1) and (3) through (7). Then, a pixel 222 fx2(m,n,t) is formed from the pixels 207 through 210 by third-order lagrange interpolation. Actual calculation is executed as is expressed by equations (2) and (3) through (7). In the equations, Lx0 through Lx3 are interpolation factors in the x direction.
Equations <<<(1)–(7)>>>

$$fx1(m, n, t) = \sum_{k=0}^{3} Lxk \times f(m - 2 - MVxint + k, n - 1 - MVyint, t - 1) \quad (1)$$

$$fx2(m, n, t) = \sum_{k=0}^{3} Lxk \times f(m - 2 - MVxint + k, n - MVyint, t - 1) \quad (2)$$

$$Lx0 = \frac{x(x+1)(x+2)}{6} \quad (3)$$

$$Lx1 = \frac{-(x-1)(x+1)(x+2)}{2} \quad (4)$$

$$Lx2 = \frac{(x-1)x(x+2)}{2} \quad (5)$$

$$Lx3 = \frac{-(x-1)x(x+1)}{6} \quad (6)$$

$$x = MVxfrac - 1 \quad (7)$$

Next, interpolation in the y direction is performed. In detail, the value of the pixel 201 f(m,n,t) is formed from the pixels 220 through 223 by third-order lagrange interpolation. Actual calculation is executed as is expressed by equations (8) through (13) or (14) through (19). In the equations, Ly0 through Ly3 are interpolation factors in the y direction.
Equations <<<(8)–(19)>>>

$$f(m, n, t) = Ly0 \times fx1(m, n, t) + \quad (8)$$
$$Ly1 \times f(m, n - 0.5, t) + Ly2 \times fx2(m, n, t) + Ly3 \times f(m, n + 0.5, t)$$

$$Ly0 = \frac{-0.25(y+1)}{y^2 - 0.25} \quad (9)$$

$$Ly1 = \frac{0.5y(y+1)}{(y+0.5)(y+1.5)} \quad (10)$$

$$Ly2 = \frac{0.25y}{(y+0.5)(y+1.5)} \quad (11)$$

$$Ly3 = \frac{0.5y(y+1)}{y^2 - 0.25} \quad (12)$$

$$y = MVyfrac - 1 \quad (13)$$

$$f(m, n, t) = Ly0 \times f(m, n - 0.5, t) + \quad (14)$$
$$Ly1 \times fx1(m, n, t) + Ly2 \times f(m, n + 0.5, t) + Ly3 \times fx2(m, n, t)$$

$$Ly0 = \frac{0.5y(y+1)}{(y+0.5)(y+1.5)} \quad (15)$$

$$Ly1 = \frac{-0.25(y+1)}{y^2 - 0.25} \quad (16)$$

$$Ly2 = \frac{0.5y(y+1)}{y^2 - 0.25} \quad (17)$$

$$Ly3 = \frac{0.25y}{(y+1.5)(y+0.5)} \quad (18)$$

$$y = MVyfrac - 1 \quad (19)$$

The interpolation in the y direction is performed in three different ways in accordance with the fractional value of the y component of the motion vector. The reason is that the positional relationship (distance) between the pixel 220 obtained by the interpolation in the x direction of the four pixels moved by the motion vector and the interpolated pixel 201, and the positional relationship (distance) between the pixel 222 obtained by the interpolation in the x direction of the four pixels moved by the motion vector and the interpolated pixel 201 change depending on whether the fractional value of the y component of the motion vector is more than 0.5 or less than 0.5. Equations (8) through (13) are used when MVyfrac<0.5, equations (14) through (19) are used when MVyfrac>0.5 and equations (20) through (24) are used when MVyfrac=0.5.

When such a value is 0.5; the pixels 220 and 221 are the same in the current field, and the pixels 222 and 223 are the same in the current field. In such a case, one pixel has two values. The above-mentioned lagrange interpolation equations which are based on four pixels cannot be used. Accordingly, lagrange interpolation is performed by equations (20) through (24) using four pixels in the current field: f(m, n−1.5,t), f(m,n−0.5,t)(221), f(m,n+0.5,t)(223), and f(m, n+1.5,t).
Equation <<<(20)–(24)>>>

$$f(m, n, t) = Ly0 \times f(m, n - 1.5, t) + \quad (20)$$
$$Ly1 \times f(m, n - 0.5, t) + Ly2 \times f(m, n + 0.5, t) + Ly3 \times f(m, n + 1.5, t)$$

$$Ly0 = -\frac{1}{16} \quad (21)$$

$$Ly1 = \frac{9}{16} \quad (22)$$

$$Ly2 = \frac{9}{16} \quad (23)$$

$$Ly3 = -\frac{1}{16} \quad (24)$$

When the fractional value of the y component of the motion vector is close to 0.5, the denominator is close to zero in the equation for obtaining an interpolation factor. As a result, the interpolation factor becomes large. An excessively large interpolation factor generates powder-like noise. Accordingly, a value of MVyfrac such as 0.4<MVyfrac<0.5 is replaced with 0.4 in obtaining the interpolation factor. A value of MVyfrac such as 0.5<MVyfrac<0.6 is replaced with 0.6 in obtaining the interpolation factor. In such a manner, the powder-like noise is alleviated to improve the image quality.

Referring back to FIG. 1, a horizontal direction interpolation factor RAM (random access memory) 109 stores the horizontal direction interpolation factors Lx0, Lx1, Lx2 and Lx3 and outputs values thereof in. accordance with the value of MVxfrac to the horizontal direction interpolator 110. The horizontal direction interpolation factor RAM 109 stores the values of the horizontal direction interpolation factors Lx0, Lx1, Lx2 and Lx3 corresponding to MVxfrac in the form of a look-up table in this example, but other forms are possible. Any device which receives MVxfrac and outputs the value of the interpolation factor corresponding to MVxfrac input thereto can be used instead of the RAM 109.

The horizontal direction interpolator 110 performs the above-described lagrange interpolation using the pixels selected by the horizontal direction pixel selector 108 and the horizontal direction interpolation factors Lx0, Lx1, Lx2 and Lx3 output by the horizontal direction interpolation factor RAM 109, thereby generating the values of the pixels 220 fx1(m,n,t) and 222 fx2(m,n,t).

A vertical direction pixel selection signal generator 111 generates a selection signal for selecting pixels in the current field to be used for interpolation in the vertical direction and the pixels obtained by horizontal interpolation, using the fractional value of the motion vector, namely, MVyfrac. The generated signal is sent to a vertical direction pixel selector 112. Based on the input signal, the vertical direction pixel selector 112 selects the pixels in the current field to be used for interpolation in the vertical direction and the pixels obtained by horizontal interpolation. The vertical direction pixel selector 112 then outputs the values of the selected pixels to a vertical direction interpolator 114. Referring to FIGS. 2A and 2B, the vertical direction pixel selection signal generator 111 and the vertical direction pixel selector 112 select and output to the vertical direction interpolator 114 the values of the pixels 221 and 223 among the pixels in the current field stored in the field memory 102 and the value of the pixels 220 and 222 which are output by the horizontal direction interpolator 110.

A vertical direction interpolation factor RAM 113 stores the vertical direction interpolation factors Ly0, Ly1, Ly2 and Ly3 and outputs values thereof in accordance with the value of MVyfrac to the vertical direction interpolator 114. The vertical direction interpolation factor RAM 113 stores the values of the vertical direction interpolation factors Ly0, Ly1, Ly2 and Ly3 in the form of a look-up table in this example, but other forms are possible. Any device which receives MVyfrac and outputs the value of the interpolation factor corresponding to MVyfrac can be used instead of the RAM 113.

The vertical direction interpolator 114 performs the above-described lagrange interpolation using the pixels selected by the vertical direction pixel selector 112 and the vertical direction interpolation factors Ly0, Ly1, Ly2 and Ly3 output by the vertical direction interpolation factor RAM 113, thereby generating the value of the pixel 201 f(m,n,t).

A time axis compressor 115 receives a signal representing the value of the interpolated pixel output by the vertical direction interpolator 114 (interpolated signal) and a current field signal output by the field memory 102 and then performs time axis compression, thereby outputting a progressive scan signal from an output terminal 116. The time axis compressor 115 can be implemented by, for example, a buffer memory and a memory controller. The memory controller controls the memory so that data carried by the current field signal is written to odd-number addresses in the buffer memory and data carried by the interpolated signal is written into even-number addresses in the buffer memory. By reading the addressed sequentially, the progressive scan signal is obtained.

In this manner, the interlaced scan signal which is input to the input terminal 101 is finally output from the output terminal 116 in the form of a progressive scan signal.

FIG. 3 is a flowchart illustrating the above-described operation of the progressive scanning conversion apparatus 1. Steps 301 through 313 will be described, hereinafter. In the following description, "horizontal addresses" are numbered for each pixel, and "vertical addresses" are numbered for each line in a frame formed by the progressive scan signal. Thus, adjacent two lines in the interlaced field are, for example, different from each other by two in the vertical address number. In terms of the unit length in the coordinate system, "1" corresponds to the distance between two pixels adjacent in the horizontal direction and to twice of the distance between two lines adjacent in the vertical direction in the progressive frame. Thus, two adjacent lines in the interlaced field are different from each other by two in the coordinate system and two adjacent lines in the progressive frame are different from each other by one in the coordinate system.

In step 301, a vertical address counter is initialized. In detail, a vertical address in the field memory 103 is initialized by the field memory address controller 105. In an odd-number field, the counter is initialized to 0; and in an even-number field, the counter is initialized to 1.

In step 302, a horizontal address counter is initialized to zero. In detail, a horizontal address in the field memory 103 is initialized by the field memory address controller 105.

In step 303, a two-dimensional motion vector is detected by the motion vector detector 106 with such precision as to have a fractional value, using a block matching method.

In step 304, interpolation in the x direction is performed. The lagrange interpolation factors Lx0, Lx1, Lx2, and Lx3 are obtained from MVxfrac using equations (3) through (7). The pixels 220 fx1(m,n,t) and 222 fx2(m,n,t) are calculated using equations (1) and (2) in the following manner. Among the values of the interpolation factors Lx0, Lx1, Lx2 and Lx3 stored in the horizontal direction interpolation factor RAM 109, the desired values of the interpolation factors Lx0, Lx1, Lx2 and Lx3 are retrieved, using MVxfrac of the motion vector detected by the motion vector detector 106. In the horizontal direction pixel selection signal generator 107, a signal for selecting the pixels to be used for interpolation in the horizontal direction are generated using MVxint and MVyint. In the horizontal direction pixel selector 108, the pixels to be used for interpolation in the x direction are selected based on the signal output from the horizontal direction pixel selection signal generator 107. The pixels 220 and 222 are formed by the horizontal direction interpolator 110 based on equations (1) and (2), using the values of the pixels selected by the horizontal direction pixel selector 108 and the desired values of the interpolation factors Lx0, Lx1, Lx2 and Lx3 retrieved from the horizontal direction interpolation factor RAM 109.

In step 305, whether MVyfrac=0.5 or not is determined. If so, the operation goes to step 309; and if not, the operation goes to step 306.

In step 306, whether MVyfrac is more than 0.5 or less than 0.5 is determined. If MVyfrac>0.5, the operation goes to step 308; and if MVyfrac<0.5, the operation goes to step 307.

In step 307, interpolation in the y direction is performed. The lagrange interpolation factors Ly0 through Ly3 are obtained from MVyfrac using equations (9) through (13). The interpolated pixel 201 f(m,n,t) is formed using equation (8) in the following manner. Among the values of the interpolation factors Ly0 through Ly3 stored in the vertical direction interpolation factor RAM 113, the desired values of the interpolation factors Ly0 through Ly3 are retrieved, using MVyfrac of the motion vector detected by the motion vector detector 106. In the vertical direction pixel selection signal generator 111, a signal for selecting the pixels to be used for interpolation in the y direction are generated using MVyfrac. In the vertical direction pixel selector 112, the pixels to be used for interpolation in the y current field are selected based on the signal output from the vertical direction pixel selection signal generator 111. The interpolated pixel 201 is formed by the vertical direction interpolator 114 based on equation (8), using the values of the pixels selected by the vertical direction pixel selector 112 and the desired values of the interpolation factors Ly0 through Ly3 retrieved from the vertical direction interpolation factor RAM 113.

In step 308, interpolation in the y direction is performed. The lagrange interpolation factors Ly0 through Ly3 are obtained from MVyfrac using equations (15) through (19). The interpolated pixel 201 f(m,n,t) is formed using equation (14) in the following manner. Among the values of the interpolation factors Ly0 through Ly3 stored in the vertical direction interpolation factor RAM 113, the desired values of the interpolation factors Ly0 through Ly3 are retrieved, using MVyfrac of the motion vector detected by the motion vector detector 106. In the vertical direction pixel selection signal generator 111, a signal for selecting the pixels to be used for interpolation in the y direction are generated using MVyfrac. In the vertical direction pixel selector 112, the pixels to be used for interpolation in the y current field are selected based on the signal output from the vertical direction pixel selection signal generator 111. The interpolated pixel 201 is formed by the vertical direction interpolator 114 based on equation (14), using the values of the pixels selected by the vertical direction pixel selector 112 and the desired values of the interpolation factors Ly0 through Ly3 retrieved from the vertical direction interpolation factor RAM 113.

In step 309, interpolation in the y direction is performed. The lagrange interpolation factors Ly0 through Ly3 are obtained from MVyfrac using equations (21) through (24). The interpolated pixel 201 f(m,n,t) is formed using equation (20) in the following manner. Among the values of the interpolation factors Ly0 through Ly3 stored in the vertical direction interpolation factor RAM 113, the desired values of the interpolation factors Ly0 through Ly3 are retrieved, using MVyfrac of the motion vector detected by the motion vector detector 106. In the vertical direction pixel selection signal generator 111, a signal for selecting the pixels to be used for interpolation in the y direction are generated using MVyfrac. In the vertical direction pixel selector 112, the pixels to be used for interpolation in the y direction are selected based on the signal output from the vertical direction pixel selection signal generator 111. The interpolated pixel 201 is formed by the vertical direction interpolator 114 based on equation (20), using the values of the pixels selected by the vertical direction pixel selector 112 and the desired values of the interpolation factors Ly0 through Ly3 retrieved from the vertical direction interpolation factor RAM 113.

In step 310, the horizontal address counter in the field memory 103 is incremented by 1 by a signal for incrementing the horizontal address which is input to the field memory 103 from the field memory address controller 105.

In step 311, whether the horizontal address is less than the number of pixels (Mx) forming the field or not is determined. If x<Mx, namely, if the interpolated pixel which is now being processed does not exist at the forward end of the line in the scanning direction, the operation goes back to step 303. If x≧Mx, namely, if the interpolated pixel which is now being processed exists on an end of the line, the operation goes to step 312.

In step 312, the vertical address counter in the field memory 103 is incremented by 2 by a signal for incrementing the vertical address which is input to the field memory 103 from the field memory address controller 105.

In step 313, whether the vertical address is less than the number of lines (My) forming the field or not is determined. If y<My, namely, if the interpolated pixel which is now being processed does not exist on the last line of the field to be scanned, the operation goes back to step 302. If y≧My, namely, if the interpolated pixel which is now being processed exists on the last line of the field to be scanned, the operation is terminated.

In this manner, interpolation for one frame is completed; namely, an interlaced scan signal is converted into a progressive scan signal.

In the first example, the motion vector is detected based on the previous field and the next field, but the method for detection is not limited to this. For example, a motion vector can be detected based on the previous field and the current field, or based on the current field and the next field. In the case where pixels before and after the interpolated pixel in the current field are used for interpolation calculation, the pixel value in the previous field and the pixel value in the next field are each multiplied by a weighting factor, and the resultant values are summated, thereby obtaining the value of the interpolated pixels. In this specification, these operations of multiplication and summation for obtaining the interpolated value is referred to as "filtering". In one simple method, an average of the pixel value in the previous field and the pixel value in the next field is used as the value of the interpolated pixel.

The motion vector can be detected based on original pixels in the interpolated field (current field) and original pixels in the previous field or in the next field. In such a case, the pixel values in the previous field and the pixel values in the next field are multiplied by their respective weighting factors, and the resultant values are summated, thereby estimating pixels in the interpolated field. Then, the values of such estimated pixels and the original pixels in the interpolated field are further multiplied by their respective weighting factors, and the resultant values are summated.

The interpolation is performed using lagrange interpolation polynomials in the first example, but spline interpolation polynomials can also be used. A two-dimensional motion vector is detected by the block matching method in the first example, but a gradient method or a phase correlation method can also be used.

EXAMPLE 2

A progressive scanning conversion method used by a progressive scanning conversion apparatus 2 in a second example according to the present invention will be described.

Figure 6:
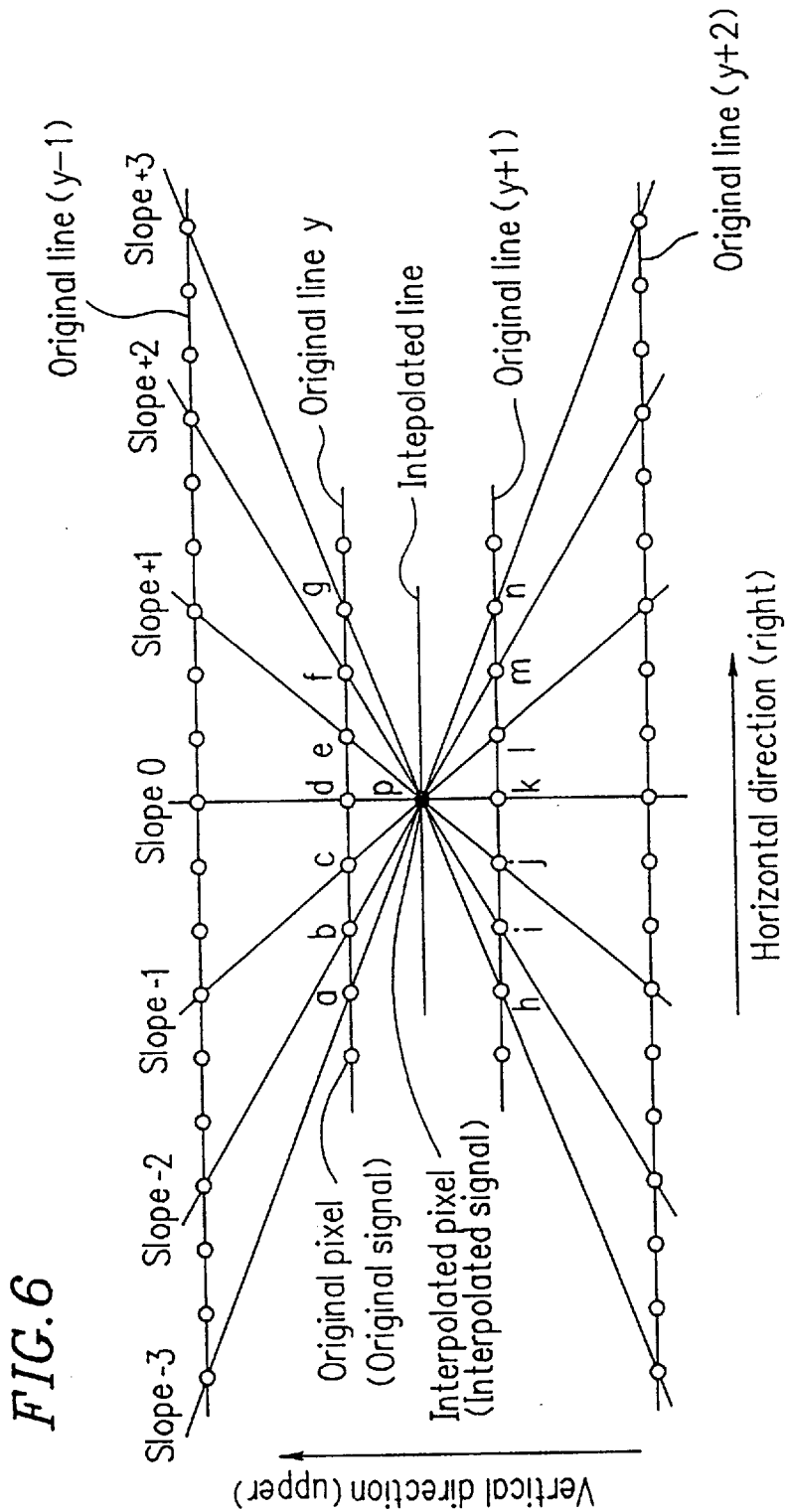
FIG. 6 is a view showing pixels on original lines and on lines to be formed by interpolation.

FIG. 6 shows pixels on original lines and lines to be formed by interpolation (interpolation lines). First, the vertical direction and the oblique direction of a line connecting pixels on original lines (y−1), y, (y+1) and (y+2) are defined. An original line is represented by an interlaced scan signal. Generation of a progressive scan signal requires a value of an interpolated pixel p on an interpolation line from an original pixel on the original line. In FIG. 6, an interpolated pixel is represented by p, and original pixels sampled in a matrix from an interlaced scan video signal are represented by a through n. The original pixels a through n are on the original lines y and (y+1). The original pixels d and k located on the vertical line passing through the original pixel p are in the slope direction 0 with respect to the original pixel p. The original pixel e located to the right of the pixel d by one pixel and the pixel j located on the line connecting the pixels e and p are in the slope direction +1 with respect to the original pixel p. Similarly, the original pixels f and i are in the slope direction +2; and the original pixels g and h are in the slope direction +3. The original pixels c and l are in the slope direction −1; the original pixels b and m are in the slope direction −2; and the original pixels a and n are in the slope direction −3. In the following description, as such a direction is closer to the horizontal direction, namely, the line direction, the slope direction will be described as "steep". In the following description, the two pixels defining each slope direction (for example, the pixels d and k) will be referred to as a "pixel pair".

Figure 7:
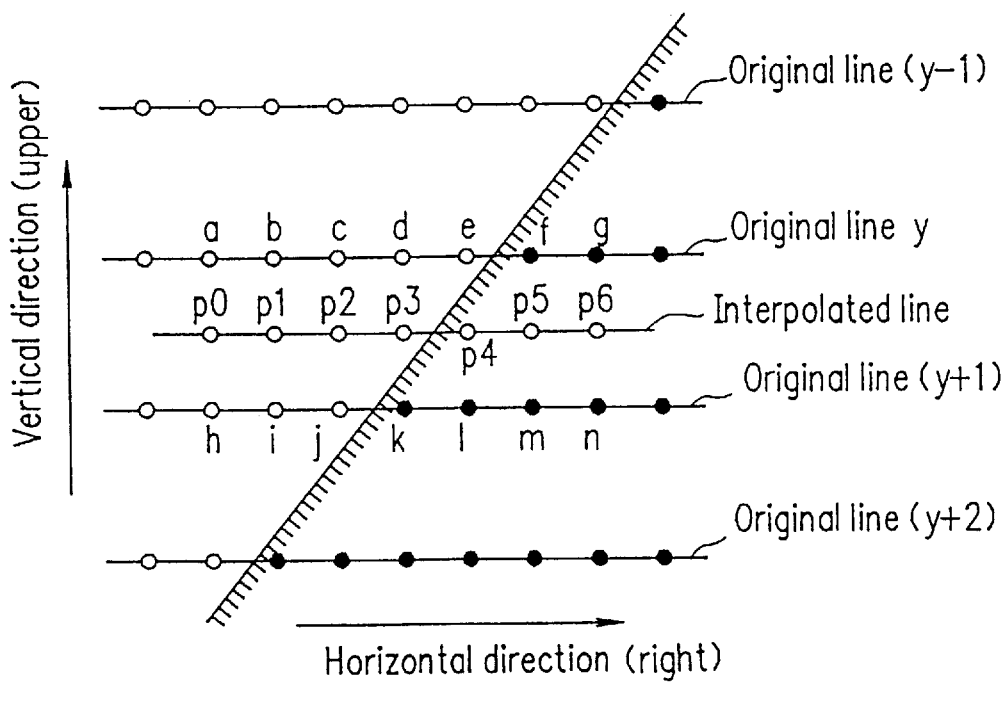
FIG. 7 is a view showing an oblique edge on the display.

FIG. 7 shows original pixels including an oblique line and interpolated pixels. As in FIG. 6, original pixels sampled in a matrix from an interlaced scan video signal are represented by a through n. Interpolated pixels on an interpolation line to be formed to generate a progressive scan video signal are represented by p0 through p6. For simplicity, letters a through n and p0 through p6 also represent the values of their respective pixels. The values of the original pixels (corresponding to the luminance on the display) are a=b= c=d=e=100, f=g=0, h=i=j=100, and k=l=m=n=0. The edge along line f-k shown in FIG. 7 will be referred to the "f-k" edge. The display is white in an area upper left to the f-k edge and black in an area lower right to the f-k edge.

A method for generating interpolated pixels p0 through p6 will be described with reference to FIG. 6. In the following description, the direction of a line used for the value of an interpolated pixel will be referred to the "interpolation slope direction". For example, in the case where the original pixels e and j are used for finding the pixel value p3, the interpolation slope direction is 1. The method for generating an interpolated pixel is divided in the following four steps.

In step 1, three "slope candidates" are specified. The three slope candidates are: a slope direction which has already been used to generate an adjacent interpolated pixel; a slope direction which is sloped to the right by one pixel with respect to the above-mentioned used slope direction, and a slope direction which is sloped to the left by one pixel with respect to the above-mentioned used slope direction. The slope candidates are targets to be searched for in order to obtain the direction of the edge by the method described later.

As is described above, a pair of pixels exist in each slope direction. Such a pair of pixels are symmetrical with respect to the interpolated pixel. In step 2, the differential absolute value between the values of the pair of pixels in each slope candidate.

In step 3, the pair of pixels having the minimum differential absolute value is determined to have "the highest correlation" of the three pairs of pixels. By using the pair of pixels having the highest correlation to perform interpolation, continuity and smoothness of the original edge can be maintained, as a result of which, the image quality is improved. In the case where one pair of pixels having the minimum differential absolute value cannot be specified, the pair of pixels in the slope direction which has already been used for generating the adjacent interpolated pixel is regarded as having the highest correlation.

In step 4, the values of the pair of pixels obtained in step 3 are averaged. The resultant value is considered as the value of the interpolated pixel.

The pixel values p0 through p6 are obtained as follows using the method described in steps 1 through 4.

In this example, the interpolated pixel has already been generated using the original pixels a and h in the slope direction 0. The pixel value p0 is the average of the pixel values a and h, which is 100. Next, the pixel value p1 is obtained. Since the slope direction which has already been used is 0, the slope candidates are 0, +1 (sloped to the right) and −1 (sloped to the left). The pixel pairs in such slope candidates for the interpolated pixel p1 are b and i (slope 0), c and h (slope +1), and a and j (slope −1). The differential absolute value of each pixel pair is 0. Since one pixel pair having the highest correlation cannot be specified, the pixels b and i (slope 0) are regarded as having the highest correlation. Accordingly, the pixel value p1 is 100 (average of the pixel values b and i).

In the same manner, the pixel value p2 is obtained. The pixel pairs in the three slope candidates for the interpolated pixel p2 are c and j (slope 0), d and i (slope +1), and b and k (slope −1). The differential absolute value is the same between the slope candidates −1, 0 and +1. Since slope 0 is regarded as having the highest correlation pixels (namely, pixels b and i) thereon with respect to the interpolated pixel p1, the pixels c and j (slope 0) are regarded as having the highest correlation. Accordingly, the pixel value p2 is 100 (average of the pixel values c and j).

In the case of the pixel value p3, the differential absolute value is smallest in the slope candidate +1 (e and j). Accordingly, the pixel value p3 is 100 (average of the pixel values e and j).

In the case of the pixel value p4, the differential absolute value is smallest in the slope candidate +1 (f and k) among the slope candidates 0, +1 and +2. Accordingly, the pixel value p4 is 0 (average of the pixel values f and k).

In the case of the pixel value p5, the differential absolute value is the same among the slope candidates 0, +1 and +2. Thus, the pixels g and l (slope +1; the interpolation slope direction for the pixel p4) is regarded as having the highest correlation. Accordingly, the pixel value p5 is 0 (average of the pixel values g and l).

In the case of the pixel value p6, the pixels on the slope candidate +1 is regarded as having the highest correlation. Accordingly, the pixel value p6 is 0.

The pixel values p0 through p3 are 100, and the pixel values p4 through p6 are 0. In this manner, the f-k edge is completely generated.

Figure 8:
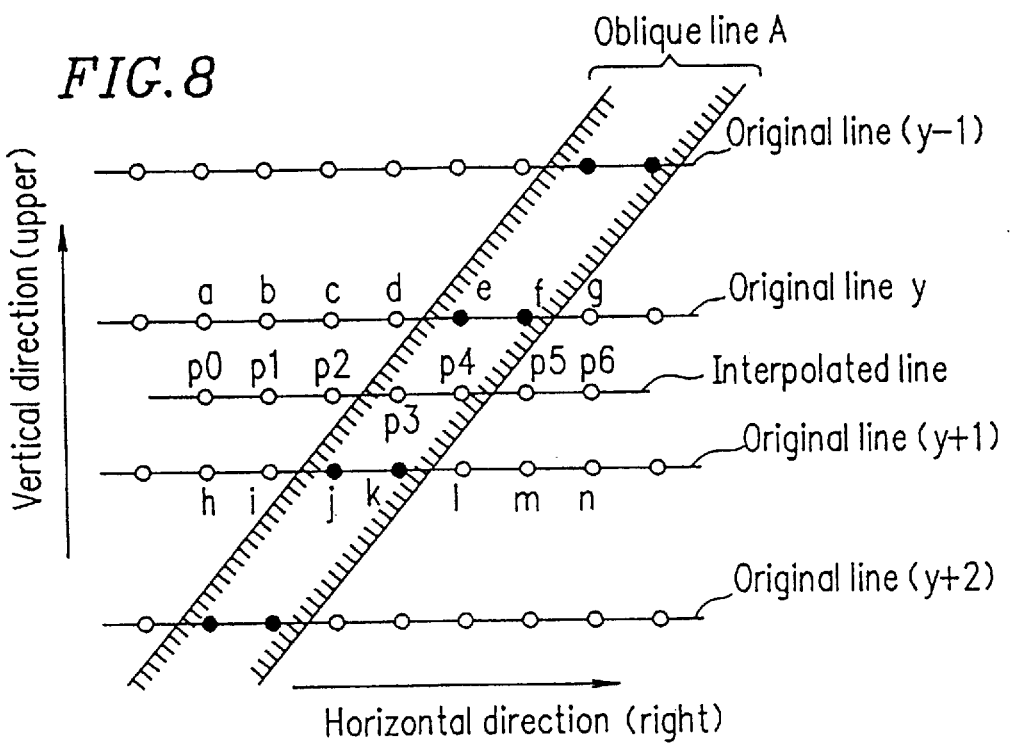
FIG. 8 is a view showing an oblique line on the display.

FIG. 8 shows an oblique line A. For generating the oblique line A, the values of the interpolated pixels p0 through p6 are obtained.

In this example, the interpolated pixel p0 has already been generated using the original pixels a and h in the slope direction 0. The pixel value p0 is the average of the pixel values a and h, which is 100. Next, the pixel value p1 is obtained. The differential absolute value is the same among the slope candidates 0, +1 and −1. Therefore, the pixels b and i in the slope candidate 0 used for interpolation of p0 are regarded as having the highest correlation. Accordingly, the pixel value p1 is 100 (average of the pixel values b and i).

In the case of the pixel value p2, the differential absolute value is smallest in the slope candidate +1, and the pixels d and i have the highest correlation. Accordingly, the pixel value p2 is 100 (average of the pixel values d and i).

In the case of the pixel value p3, the differential absolute value is smallest in the slope candidate +1 (e and j) among the slope candidates 0, +1 and +2. Accordingly, the pixel value p3 is 0 (average of the pixel values e and j).

In the case of the pixel value p4, the differential absolute value is smallest in the slope candidate +1 (f and k) among the slope candidates 0, +1 and +2. Accordingly, the pixel value p4 is 0 (average of the pixel values f and k).

In the case of the pixel value p5, the differential absolute value is smallest in the slope candidate +1 (g and l) among the slope candidates 0, +1 and +2. Accordingly, the pixel value p5 is 100 (average of the pixel values g and l).

In the case of the pixel value p6, the pixels on the slope candidate +1 is regarded as having the highest correlation. Accordingly, the pixel value p6 is 100.

The pixel values p0 through p2 are 100, the pixel values p3 and p4 are 0, and the pixel values p5 and p6 are 100. In this manner, the oblique line A is completely generated.

Figure 9:
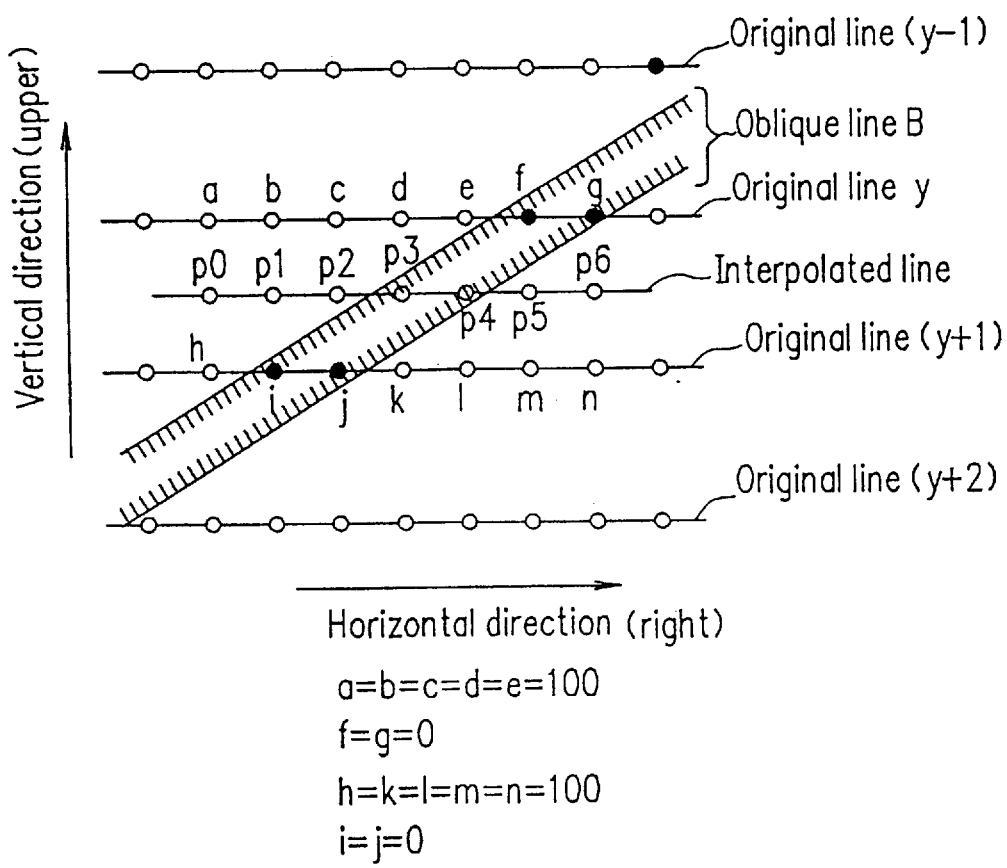
FIG. 9 is a view showing another oblique line on the display.

FIG. 9 shows an oblique line B which is steeper than the oblique line A. For generating the oblique line B, the values of the interpolated pixels p0 through p6 are obtained.

In this example, the interpolated pixel p0 has already been generated using the original pixels a and h in the slope direction 0. The pixel value p0 is the average of the pixel values a and h, which is 100. Next, the pixel value p1 is obtained. The differential absolute value is smallest in the slope candidate +1 (c and h) among the slope candidates −1, 0 and +1. Accordingly, the pixel value p1 is 100 (average of the pixel values c and h).

In the case of the pixel value p2, the differential absolute value is smallest in the slope candidate +2 (e and h) among the slope candidates 0, +1 and +2. Accordingly, the pixel value p2 is 100 (average of the pixel values e and h).

In the case of the pixel value p3, the differential absolute value is smallest in the slope candidate +2 (f and i) among the slope candidates +1, +2 and +3. Accordingly, the pixel value p3 is 0 (average of the pixel values f and i).

In the case of the pixel value p4, the differential absolute value is smallest in the slope candidate +2 (g and j) among the slope candidates +1, +2 and +3. Accordingly, the pixel value p4 is 0 (average of the pixel values g and j).

In the case of the pixel value p5, the differential absolute value is smallest in the slope candidate +2 among the slope candidates +1, +2 and +3. Accordingly, the pixel value p5 is 100 (average of the pixel values in the slope candidate +2).

In the case of the pixel value p6, the pixels on the slope candidate +2 is regarded as having the highest correlation. Accordingly, the pixel value p6 is 100.

The pixel values p0 through p2 are 100, the pixel values p3 and p4 are 0, and the pixel values p5 and p6 are 100. In this manner, the oblique line B is completely generated.

By the above-described manner in the second example, effective interpolation can be performed even for an oblique edge and an oblique line.

In the second example, the value of the interpolated pixel is obtained by averaging the values of the pair of pixels which are regarded as having the highest correlation, but the present invention is not limited to this. The value of an interpolated pixel can be obtained more precisely by using a larger number of original pixels. For example, two original pixels on the lines above the interpolated pixel and two original pixels on the lines below the interpolated pixel, all of which are in the interpolation slope direction, can be used. In such a case, each of the four original pixels and their respective weighting factors are multiplied, and the resultant values are summated. For example, in order to obtain the pixel value p3 in FIG. 9, a pixel in the slope direction +2 and on the original line (y−1) and a pixel in the slope direction +2 and on the original line (y+2) can be used in addition to the original pixels f and i.

In the second example, the slope candidates are specified based on the interpolation slope direction which has been used to generate an interpolated pixel adjacent in the horizontal direction. The same effect is achieved by specifying the slope candidates based on the interpolation slope direction which has been used to generate an interpolated pixel adjacent in the vertical direction.

In the second example, the correlation is determined using two original pixels, but a larger number of original pixels (for example, four pixels) can be used. In such a case, for example, the sum of the original pixel on the line (y−1) and the original pixel on the line y and the sum of the original pixel on the line (y+1) and the original pixel on the line (y+2) are obtained, and the absolute value between the two sums is used for determination of correlation.

Hereinafter, the progressive scanning conversion apparatus 2 in the second example will be described with reference to FIG. 4. In the following description, an interlaced scan signal representing an original pixel (for example, the pixel a in FIG. 6) will be referred to as an "original signal"; and a progressive scan signal representing an interpolated pixel (for example, the pixel p in FIG. 6) will be referred to as an "interpolated signal". The expression "the original signals e and j of slope +1" means signals representing the original pixels e and j on the line in the slope direction +1.

Figure 4:
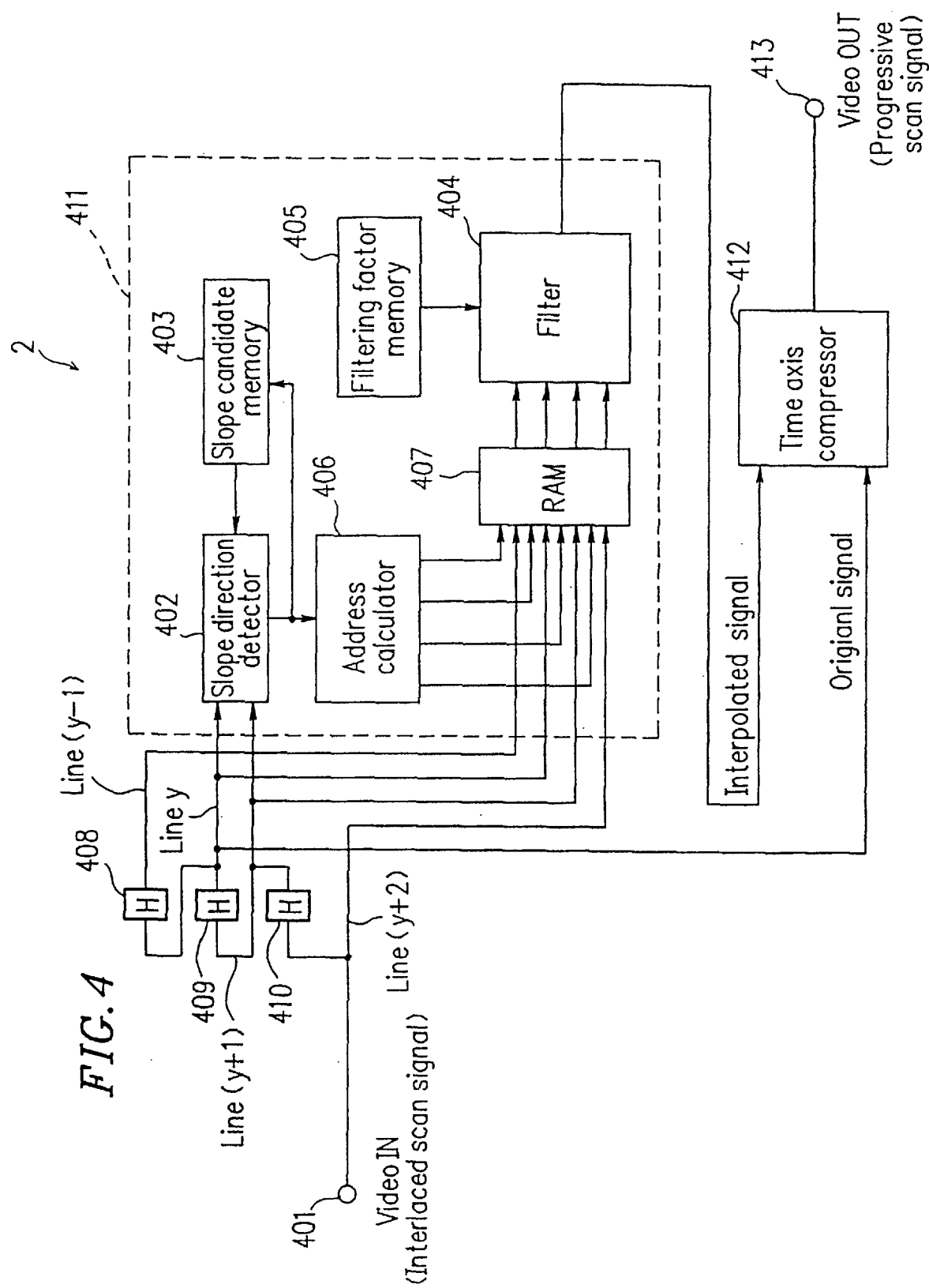
FIG. 4 is a block diagram of a progressive scanning conversion apparatus in a second example according to the present invention.

FIG. 4 is a block diagram of the progressive scanning conversion apparatus 2 for effecting the progressive scanning conversion method in this example.

The input signal supplied to an input terminal 401 is a digital video signal (original signal) obtained by sampling a 2:1 interfaced scan video signal at a sampling frequency fs (MHz). The output signal sent out from an output terminal 413 is a 1:1 progressive scan signal (sampling frequency: 2×fs (MHz)). A intrafield interpolator 411 interpolates the original signals and outputs the resultant signal to a time axis compressor 412.

The interlaced scan signal input to the input terminal 401 is delayed by 1H memories 408, 409 and 410 (1H: a period required to scan one line of an interlaced scan signal). As a result of the delay, original signals regarding lines (y−1), y, (y+1) and (y+2) are obtained simultaneously. These original signals are stored in a RAM 407. Simultaneously, the original signals regarding the lines y and (y+1) are input to a slope direction detector 402. The slope direction detector 402 detects a slope direction having the highest correlation and sends data representing the detected slope direction to an address calculator 406. The slope direction having the highest correlation is determined from among the three slope candidates, which are: the slope direction which has been used to generate an adjacent interpolated pixel, a slope direction which is sloped to the right by one with respect to the used slope direction, and a slope direction which is sloped to the left by one with respect to the used slope direction. The detected slope direction (interpolation direction) is also stored in a slope candidate memory 403. The interpolation direction used for the adjacent pixel required by the slope direction detector 402 is stored in the slope candidate memory 403 and is supplied to the slope direction detector 402 as necessary.

The address calculator 406 finds the address in the RAM 407 at which the original signals required to generate the interpolated signal are stored. The original signals required to generate the interpolated signal are the four original signals on the lines (y−1), y, (y+1) and (y+2) and further in the interpolation direction detected by the slope direction detector 402, wherein the interpolated pixel is located at the center of the four original pixels.

The four original signals retrieved from the RAM 407 by the address calculator 406 are each multiplied by a prescribed weighting factor stored in a filtering factor memory 405, and the resultant values are summated. The value obtained by the summation is output to the time axis compressor 412 as the interpolated signal.

The time axis compressor 412 compresses the original signals and the interpolated signals to signals having a data rate which is twice the data rate of the original signals, and outputs the original signals and the interpolated signals alternately, thereby generating a progressive scan video signal. The progressive scan video signal is output from the output terminal 413.

Figure 5:
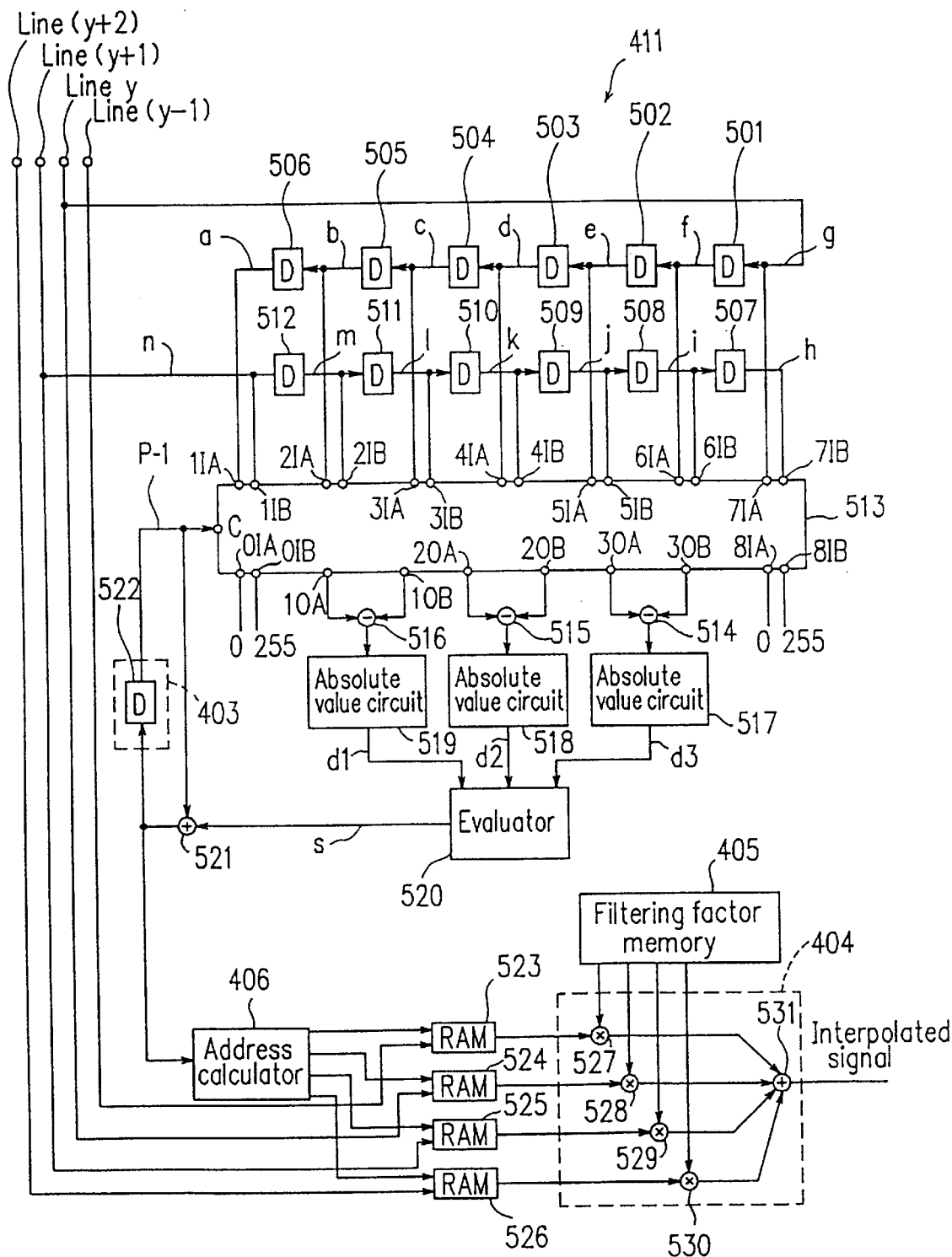
FIG. 5 is a block diagram of an intrafield interpolator in the progressive scanning conversion apparatus shown in FIG. 4.

FIG. 5 is a block diagram of the intrafield interpolator 411. The operation of the intrafield interpolator 411 will be described in detail with reference to FIG. 5.

The signal which is delayed by the 1H memory 409 is an original signal representing a pixel on the line y. The signal is further delayed by 1D delay devices 501 through 506 (1D corresponds to one pixel in interlaced scanning), thereby obtaining original signals a through g. As is mentioned above, the original signals a through g represent the original pixels a through g on the line y in FIG. 6.

The signal which is delayed by the 1H memory 410 is an original signal representing a pixel on the line (y+1). The signal is further delayed by 1D delay circuits 507 through 512, thereby obtaining original signals h through n. As is mentioned above, the original signals h through n represent the original pixels h through n on the line (y+1) in FIG. 6.

A switch 513 is controlled by a signal $P_{-1}$ input to a terminal C thereof. When $P_{-1}=-3$, terminals 0IA and 1OA, 0IB and 1OB, 1IA and 2OA, 1IB and 2OB, 2IA and 3OA, and 2IB and 3OB are connected to each other. When $P_{-1}=-2$, terminals 1IA and 1OA, 1IB and 1OB, 2IA and 2OA, 2IB and 2OB, 3IA and 3OA, and 3IB and 3OB are connected to each other. When $P_{-1}=-1$, terminals 2IA and 1OA, 2IB and 1OB, 3IA and 2OA, 3IB and 2OB, 4IA and 3OA, and 4IB and 3OB are connected to each other. When $P_{-1}=0$, terminals 3IA and 1OA, 3IB and 1OB, 4IA and 2OA, 4IB and 2OB, 5IA and 3OA, and 5IB and 3OB are connected to each other. When $P_{-1}=1$, terminals 4IA and 1OA, 4IB and 1OB, 5IA and 2OA, 5IB and 2OB, 6IA and 3OA, and 6IB and 3OB are connected to each other. When $P_{-1}=2$, terminals 5IA and 1OA, 5IB and 1OB, 6IA and 2OA, 6IB and 2OB, 7IA and 3OA, and 7IB and 3OB are connected to each other. When $P_{-1}=3$, terminals 6IA and 1OA, 6IB and 1OB, 7IA and 2OA, 7IB and 2OB, 8IA and 3OA, and 8IB and 3OB are connected to each other.

The terminal 0IA is always supplied with signal 0, 0IB is always supplied with signal 255, 8IA is always supplied with signal 0, and 8IB is always supplied with signal 255. The value 0 is the minimum value and the value 255 is the maximum which the original signal can have. The original signals are set in this manner in order to avoid an evaluator 520 (described later) from determining that the signals at 0IA and 0IB and the signals at 8IA and 8IB have the highest correlation. By such setting, $P_{-1}$ is prevented from becoming less than −3, or more than 3.

$P_{-1}$ represents the interpolation direction which has already been used to generate the adjacent interpolated pixel. By inputting $P_{-1}$ to the terminal C of the switch 513, the determination of the correlation based on the above-mentioned three slope candidates can be performed.

The detailed operation will be described with reference to FIG. 7. The pixel value p3 will be obtained. The original signals a through n correspond to the signals a through n in FIG. 7. The interpolation direction used to generate the pixel value p2 is slope direction 0; namely, $P_{-1}=0$. In the switch 513, 3IA and 1OA, 3IB and 1OB, 4IA and 2OA, 4IB and 2OB, 5IA and 3OA, and 5IB and 3OB are connected to each other. The slope candidates for p3 are slope directions 0 (d and k), +1 (e and j), and −1 (c and l). A subtractor 516 and an absolute value circuit 519 generate the differential absolute value d1 between the pixel values c and l, the differential absolute value d2 between the pixel values d and k, and the differential absolute value d3 between the pixel values e and j. The evaluator 520 determines the minimum of d1, d2 and d3. When d1 is minimum, the output S=−1; when d2 is minimum, the output S=0; and when d3 is minimum, the output S=1. When the minimum absolute value cannot be specified, the output S is set to be 0. The output S and the interpolation direction $P_{-1}$ are summated by an adder 521 to find the interpolation direction P. In the case of p3, the absolute value d3 (e and j) is minimum, and thus the output S=1. From $P_{-1}=0$ and S=1, the interpolation direction for p3 is P=1. This represents the slope direction +1. For finding p4, $P_{-1}=1$ since the interpolation direction for p3 is delayed by the 1D delay circuit 522.

The address calculator 406 shown in FIG. 4 finds the addresses in RAMs 523 through 526 upon receiving the value of the interpolation direction P. The RAM 523 through 526 shown in FIG. 5 respectively store original signals on the lines (y−1), y, (y+1) and (y+2). The address calculator 406 finds the four addresses of the original signals in the slope direction +1 with respect to the interpolated pixel p3. The four original signals retrieved from the RAMs 523 through 526 by the address calculator 406 are respectively multiplied by prescribed weighting factors which are output from the filtering factor memory 405 by multipliers 527 through 530 included in a filter 404. The resultant values are summated by an adder 531, thereby obtaining the interpolated signal.

The prescribed weighting factors stored in the filtering factor memory 405 can be, for example, 0 for the multiplier 527, 0.5 for the multiplier 528, 0.5 for the multiplier 529, and 0 for the multiplier 530. In such a case, the average of the two original signals (one above the interpolated pixel and one below the interpolated pixel) in the interpolation direction P are found for interpolation. Alternatively, the prescribed weighting factors can be −0.212 for the multiplier 527, 0.637 for the multiplier 528, 0.637 for the multiplier 529, and −0.212 for the multiplier 530. In such a case, cubic convolution interpolation is performed in the interpolation direction P. Alternatively, the prescribed weighting factors can be −0.0625 for the multiplier 527, 0.5625 for the multiplier 528, 0.5625 for the multiplier 529, and −0.0625 for the multiplier 530. In such a case, lagrange interpolation is performed in the interpolation direction P. Whichever set of coefficients is used in this case, the value of the interpolated signal p3 is 100.

The pixel value p4 is obtained in the same manner. By the interpolation for p3, $P_{-1}=1$. Thus, in the switch 513, 4IA and 1OA, 4IB and 1OB, 5IA and 2OA, 5IB and 2OB, 6IA and 3OA, and 6IB and 3OB are connected to each other. The slope candidates are 0, +1 and +2. Since the original signals a through n have already passed the 1D delay circuits 501 through 506 and 507 through 512, the original pixels to be used are e and l, f and k, and g and j. Since the differential absolute value d1 is minimum in this case for p4, the output S from the evaluator 520 is 0. S=0 is summated with $P_{-1}=1$, resultant in P=1 (interpolation direction for p4). Thus, the original signals in the slope direction +1 with respect to the interpolated pixel p4 are used to obtain p4=0.

By repeating the above-described steps for each interpolated pixel, a progressive scan signal is generated. Effective interpolation can be achieved even for an oblique edge or an oblique line.

In the above example, the slope candidates are specified based on the interpolation slope direction which has been used to generate an interpolated pixel adjacent in the horizontal direction. Alternatively, the slope candidates can be specified based on the interpolation slope direction which has been used to generate an interpolated pixel adjacent in the vertical direction, using 1H delay circuits instead of the 1D delay circuits.

In the above example, the evaluation of the correlation is performed based on the differential absolute value between two original signals, but a larger number of original signals can be used.

EXAMPLE 3

A progressive scanning conversion method in a third example will be described.

An image displayed using pixels on a two-dimensional plane has an edge. The edge is not necessarily parallel or perpendicular to the scan line. Accordingly, in order to determine whether there is an edge or not, information indicating whether or not there is an edge in both the horizontal direction and the vertical direction is required. Such information will be referred to as "edge information". Two-dimensional edge information can be divided into two pieces of one-dimensional information. For simplicity, one-dimensional information will be described.

FIG. 15 is a view showing three types of one-dimensional edge information. With reference to FIG. 15, the edge information will be defined. The interpolation direction and the slope direction are as defined with reference to FIG. 6 in the second example.

In FIG. 15, letters q and r represent values of original pixels obtained by sampling an interlaced scan signal in a matrix by a dot clock fs (MHz) in the horizontal direction and by a line clock fh (kHz) in the vertical direction. Such a pixel corresponds to the luminance on the display.

The original pixel q is previous with respect to the original pixel r by one dot in the horizontal direction and by one line in the vertical direction. The value obtained by subtracting the value of pixel q from the value of pixel r (r−q) is defined as "edge information Edge(r)". If Edge(r)>0, such edge information Edge(r) is categorized as edge 1. If Edge(r)<0, such edge information Edge(r) is categorized as edge 2. In these two cases, the original pixel is expressed as "having an edge". If Edge(r)=0, such edge information Edge(r) is categorized as edge 3. In this case, the original pixel is expressed as "having no edge". In edge 1 or 2, as the absolute value of the edge information Edge(r) is larger, the edge is sharper (e.g., difference in the luminance of the two original pixels is greater). As the absolute value of the edge information Edge(r) is smaller, the edge is smoother (e.g., difference in the luminance of the two original pixels is smaller). The above-mentioned three kinds of an edge is referred to as a "category" of the edge. For example, edge 1 and edge 2 are different in the category of the edge.

The interpolated pixels p0 through p6 in an image having an oblique edge shown in FIG. 7 is generated in the following six steps.

In step 1, seven slope directions from −3 through +3 are selected as slope candidates.

In step 2, the differential absolute value of each of the pairs of pixels in the directions of the slope candidates and symmetrical with respect to the interpolated pixel to be generated is found.

In step 3, edge information is obtained for the original pixels, the differential absolute values between which are obtained in step 2. As is described above, the edge information in this example is the difference of each original pixel value with respect to the previous original pixel value by one dot in the horizontal direction and by one line in the vertical direction. For example, the edge information of the original pixel i in the horizontal direction is pixel value i−(minus) pixel value h. The edge information of the original pixel i in the vertical direction is pixel value i−(minus) pixel value b. Alternatively, the edge information can be the difference of each original pixel value with respect to the next original pixel value by one dot in the horizontal direction and by one line in the vertical direction.

In step 4, the differential absolute values obtained in step 2 are corrected based on the edge information obtained in step 3. In detail, the differential absolute value between the edge information in the horizontal direction of each pair of the original pixels is obtained. Then, the differential absolute value between the edge information in the vertical direction of each pair of original pixels is also obtained. A pair of original pixels located in the direction in which the oblique edge exists have close edge information as well as close pixel values. Thus, the correlation between the two original pixels is higher as the differential absolute value in the edge information of the two original pixels is smaller. The similarity of edge information of the pair of original pixels is higher, namely, the correlation between the pair of original pixels is higher, when both of the pixels have an edge than not. The correlation is higher when the edge information of the pair of original pixels is in the same category than when such edge information is in different categories.

For these reasons, in the case where the pair of pixels both have an edge and the edge information thereof is in the same category, (edge 1 or 2 in FIG. 15), a negative value α (correction value) is added to the differential absolute value in the edge information. In the case where there is no edge (i.e., edge 3 in FIG. 15), no correction is performed (correction value: 0). The differential absolute value in the edge information thus obtained is added to the differential absolute value in the pixel values which is found in step 2.

In step 5, the pair of pixels having the minimum differential absolute value among the differential absolute values obtained in step 4 is determined to have the highest correlation. When one pair of pixels having the minimum differential absolute value cannot be specified, the pair of pixels in the slope direction 0 is determined to have the highest correlation.

In step 6, the values of the original pixels having the highest correlation are averaged. The resultant value is the value of the interpolated pixel.

In accordance with the above-described steps 1 through 6, the pixel values p0 through p6 are found.

With reference to FIG. 7, generation of the interpolated pixel p3 will be described in detail.

The seven slope candidates are −3 through +3. The original pixels in such slope candidates are: a and n (−3), b and m (−2), c and l (−1), d and k (0), e and j (+1), f and i (+2), and g and h (+3). The differential absolute value of the pairs of pixels are: 100 in the slope candidates −3 through 0, +2 and +3;. and 0 in the slope candidate +1.

Edge information of the original pixels a through n are obtained. The edge information of the original pixels a through e, h through j, m and n is 0 in both the horizontal direction and the vertical direction. The edge information of the original pixels f and k is −100 both in the horizontal direction and the vertical direction. The edge information of the original pixels g and l is 0 in the horizontal direction and −100 in the vertical direction.

The differential absolute values in the edge information between the pairs of original pixels are 0 in the horizontal and vertical directions in the slope candidates −3 and −2. In the slope candidates −1 and +3, such differential absolute values are 0 in the horizontal direction and 100 in the vertical direction. In the slope candidates 0 and +2, such differential absolute values are 100 in the horizontal and vertical directions.

Now, a slope candidate in which the differential absolute value in the edge information in the horizontal direction or the vertical direction is 0 will be found. When the differential absolute value in the edge information of the pairs of pixels is 0 and the edge information thereof is the same (edge 1 or 2), a negative value α=−10 (referred to as "correction value") is added to the differential absolute value in the edge information. The correction value α is not limited to −10, but can be any negative value. The differential absolute value in the edge information is 0 in the slope candidates −3, −2 and +1 in the horizontal and vertical directions and in the slope candidates −1 and +3 in the horizontal direction. In either case, the category of the edge information is 3 (i.e., no edge exists), and thus the correction value is not added.

Next, the differential absolute values in the edge information in the horizontal and vertical directions are added to the differential absolute values in the pixel values between the respective pairs of original pixels in the seven slope candidates. The resultant values are: 100 in the slope candidates −3 and −2; and 0 in the slope candidate +1. In the slope candidates −1 and +3, the resultant value is 200 after addition of the differential absolute value in the edge information in the vertical direction (100). In the slope candidates 0 and +2, the resultant value is 300 after addition of the differential absolute values in the edge information in the horizontal and vertical directions (200). The interpolation direction P is +1. The pixel value p3 is the average of the pixel values e and j, namely, 100.

The pixel value p4 is found in the same manner. The differential absolute values between the pairs of original pixels after the step of correction based on the edge information are: 100 in the slope candidates −3 through −1 and +3 with no correction; 200 in slope direction 0 and +2 after addition of 100 (differential absolute value in the edge information in the vertical direction); and −20 in the slope candidate +1 after addition of −20 (−10 for the horizontal direction and −10 for the vertical direction). Accordingly, the original pixels f and k in the slope candidate +1 is determined to have the highest correlation. The average of the pixel values f and k is 0.

In the same manner, it is found that the pixel values p0 through p2 are each 100 and that the pixel values p5 and p6 are each 0.

In this manner, the oblique f-k edge is generated by interpolation.

With reference to FIG. 8, generation of the oblique line A will be described. As an example, generation of the original pixels p3 and p4 will be described.

First, the original pixel p3 will be generated. The differential absolute values between the pairs of pixel values are: 0 in the slope candidates −3 through −1, +1 and +3; and 100 in the slope candidates 0 and +2. Such differential absolute values are corrected based on the edge information. Regarding the slope candidate −3, either the original pixel a or n does not have any edge in the horizontal or vertical direction (edge 3 in FIG. 15). Accordingly, no correction is performed, and thus the differential absolute value is 0.

Regarding the slope candidate −2, the original pixel b has no edge in the horizontal or vertical direction. The original pixel m has no edge in the horizontal direction, but has edge 1 in the vertical direction. The differential absolute value in the edge information in the vertical direction is 100. Such a value is added to the differential absolute value between the pixel values (0), thereby obtaining 100.

Regarding the slope candidate −1, the original pixel c has no edge in the horizontal or vertical direction. The original pixel 1 has edge 1 in both the horizontal and vertical directions. The differential absolute value in the edge information in the vertical direction (100) and such differential absolute value in the horizontal direction (100) are added to the differential absolute value between the pixel values (0), thereby obtaining 200.

Regarding the slope candidate 0, the original pixel d has no edge in the horizontal or vertical direction. The original pixel k has no edge in the horizontal direction, but has edge 2 in the vertical direction. The differential absolute value in the edge information in the vertical direction (100) is added to the differential absolute value between the pixel values (100), thereby obtaining 200.

Regarding the slope candidate +1, the original pixel e has edge 2 in both the horizontal and vertical directions. The original pixel j also has edge 2 in both the horizontal and vertical directions. The differential absolute value in the edge information in the horizontal and vertical directions is 0. The correction value −10 for the horizontal direction and the correction value −10 for the vertical direction are added to the differential absolute value between the pixel values (0), thereby obtaining −20.

Regarding the slope candidate +2, the original pixel f has no edge in the horizontal direction, but has edge 2 in the vertical direction. The original pixel i has no edge in the horizontal or vertical direction. The differential absolute value in the edge information in the vertical direction is 100. Such a value is added to the differential absolute value between the pixel values (100), thereby obtaining 200.

Regarding the slope candidate +3, the original pixel g has edge 1 in both the horizontal and vertical directions. The original pixel h has no edge in the horizontal or vertical direction. The differential absolute value in the edge information in the horizontal direction (100) and such a differential absolute value in the vertical direction (100) are added to the differential absolute value between the pixel values (0), thereby obtaining 200.

Accordingly, the original pixels e and j in the slope candidate +1 have the highest correlation. The pixel value of p3 is the average of the pixel values e and j, namely, 0.

The pixel value p4 is found in the same manner. The differential absolute values between the original pixel values after the step of correction are: 0 in the slope candidates −3 and −2 with no correction; 100 in slope −1 after addition of 100, 500 in the slope candidate 0 after addition of 400; −10 in the slope candidate +1 after addition of the correction value −10; 500 in the slope candidate +2 after addition of 400; and 100 in the slope candidate +3 after addition of 100. Thus, the original pixels f and k in the slope candidate +1 are averaged to obtain 0 as the value of the pixel p4.

In the same manner, it is found that the pixel values p0 through p2, p5 and p6 are each 100.

In this manner, the oblique line A is generated by interpolation.

With reference to FIG. 9, generation of the steeper oblique line B will be described. As an example, generation of the original pixels p3 and p4 will be described.

First, the original pixel p3 will be generated. The differential absolute values between the pairs of pixel values are:

0 in the slope candidates −3 through 0, and +2; and 100 in the slope candidates +1 and +3. Such differential absolute values are corrected based on the edge information. Regarding the slope candidate −3, the original pixel a has no edge in the horizontal or vertical direction. The original pixel n has no edge in the horizontal direction, but has edge 1 in the vertical direction. The differential absolute value in the edge information in the vertical direction (100) is added to the differential absolute value between the pixel values (0), thereby obtaining 100.

Regarding the slope candidate −2, the original pixel b has no edge in the horizontal or vertical direction. The original pixel m has no edge in the horizontal direction, but has edge 1 in the vertical direction. The differential absolute value in the edge information in the vertical direction (100) is added to the differential absolute value between the pixel values (0), thereby obtaining 100.

Regarding the slope candidate −1, the original pixel c has no edge in the horizontal or vertical direction. The original pixel l has no edge in the horizontal or vertical direction. The differential absolute values in the edge information in both the horizontal and vertical directions are both 0. No correction is performed, and thus the differential absolute value between the pixel values is 0.

Regarding the slope candidate 0, the original pixel d has no edge in the horizontal or vertical direction. The original pixel k has edge 1 in the horizontal direction, but has no edge in the vertical direction. The differential absolute value in the edge information in the horizontal direction (100) is added to the differential absolute value between the pixel values (0), thereby obtaining 100.

Regarding the slope candidate +1, the original pixel e has no edge in the horizontal or vertical direction. The original pixel j has no edge in the horizontal direction, but has edge 2 in the vertical direction. The differential absolute value in the edge information in the vertical direction (100) is added to the differential absolute value between the pixel values (100), thereby obtaining 200.

Regarding the slope candidate +2, the original pixel f has edge 2 in both the horizontal and vertical directions. The original pixel i has edge 2 in both the horizontal and vertical directions. The differential absolute value in the edge information is 0 in both the horizontal and vertical directions. The correction value −10 for the horizontal direction and the correction value −10 or the vertical direction are added to the differential absolute value between the pixel values (0), thereby obtaining −20.

Regarding the slope candidate +3, the original pixel g has no edge in the horizontal direction, but has edge 2 in the vertical direction. The original pixel h has no edge in the horizontal or vertical direction. The differential absolute value in the edge information in the vertical direction (100) is added to the differential absolute value between the pixel values (100), thereby obtaining 200.

Accordingly, the original pixels f and i in the slope candidate +2 have the highest correlation. The pixel value of p3 is the average of the pixel values f and i, namely, 0.

The pixel value p4 is found in the same manner. The absolute values between the original pixel values after the step of correction are: 0 in the slope candidates −3 and 0 with no correction; 100 in slope −2 and −1 after addition of 100 (differential absolute value of the edge information in the vertical direction), 400 in the slope candidate +1 after addition of 300 (100 as the differential absolute value of the edge information in the vertical direction and 200 as the differential absolute value of the edge information in the horizontal differential absolute value); −10 in the slope candidate +2 after addition of the correction value −10; and 400 in the slope candidate +3 after addition of 300 (100 as the differential absolute value of the edge information in the vertical direction and 200 as the differential absolute value of the edge information in the horizontal differential absolute value). Thus, the original pixels g and j in the slope candidate +2 are averaged to obtain 0 as the value of the pixel p4.

In the same manner, it is found that the pixel values p0 through p2, p5 and p6 are each 100.

In this manner, the oblique line B is generated by interpolation.

By the method in this example, effective line scanning interpolation can be performed even for an oblique edge or an oblique line.

In the above example, the value of the interpolated pixel is obtained by averaging the values of the pair of pixels which are regarded as having the highest correlation, but the present invention is not limited to this. The value of an interpolated pixel can be obtained more precisely by using a larger number of original pixels. For example, two original pixels on the lines above the interpolated pixel and two original pixels on the lines below the interpolated pixel, all of which are in the interpolation slope direction, can be used. In such a case, each of the four original pixels is multiplies by the respective weighting factor, and the resultant values are summated.

Further, the evaluation of the correlation is performed based on the differential absolute value between two original signals, but a larger number of original signals can be used.

Hereinafter, the progressive scanning conversion apparatus 3 in the third example will be described with reference to FIG. 10.

FIG. 10 is a block diagram of the progressive scanning conversion apparatus 3 for effecting the progressive scanning conversion method in this example.

The input signal supplied to an input terminal 1001 is a digital video signal (original signal) obtained by sampling a 2:1 interfaced scan video signal at a sampling frequency fs (MHz). The output signal sent out from an output terminal 1015 is a 1:1 progressive scan signal (sampling frequency: 2×fs (MHz)). An intrafield interpolator 1100 interpolates the original signals and outputs the resultant signal to a time axis compressor 1014. The time axis compressor 1014 compresses the interpolated signals and the original signals compresses in the direction of time axis and outputs the resultant signal as a progressive scan signal.

The interlaced scan signal input to the input terminal 1001 is delayed by 1H memories 1011, 1012 and 1013 (1H: a period required to scan one line of an interlaced scan signal). As a result of the delay, original signals regarding lines (y−1), y, (y+1) and (y+2) are obtained simultaneously. These original signals are stored in a RAM 1008. Simultaneously, the original signal selector 1002 selects the original signals in the slope candidates in the lines y and (y+1). The correlative value between the selected original signals in each of the slope candidates is calculated by a correlation calculator 1003. An edge information detector 1004 detects the edge information of each of the original signals on the lines y and (y+1) in the horizontal and vertical directions. Based on the edge information, the correlative value calculated by the correlation calculator 1003 is corrected by a correlative value corrector 1005. The correlative value after correction is input to a slope direction detector 1006. The slope direction detector 1006 detects a slope direction having the highest correlation and outputs the detected slope direction to an address calculator 1007.

The address calculator 1007 calculates the address in the RAM 1008 at which the original signals required to generate the interpolated signal are stored. The original signals required to generate the interpolated signal are the four original signals on the lines (y−1), y, (y+1) and (y+2) and further in the interpolation direction. Such four signals are detected by the slope direction detector 1006.

The four original signals retrieved from the RAM 1008 by the address calculator 1007 are each multiplied by a prescribed weighting factor stored in a filtering factor memory 1010 by a filter 1009, and the resultant values are summated. The value obtained by the summation is output to the time axis compressor 1014 as the interpolated signal.

The time axis compressor 1014 compresses the original signals and the interpolated signals to signals having a data rate which is twice the data rate of the original signals, and outputs the original signals and the interpolated signals alternately, thereby generating a progressive scan video signal. The progressive scan video signal is output from the output terminal 1015.

Figure 11A:
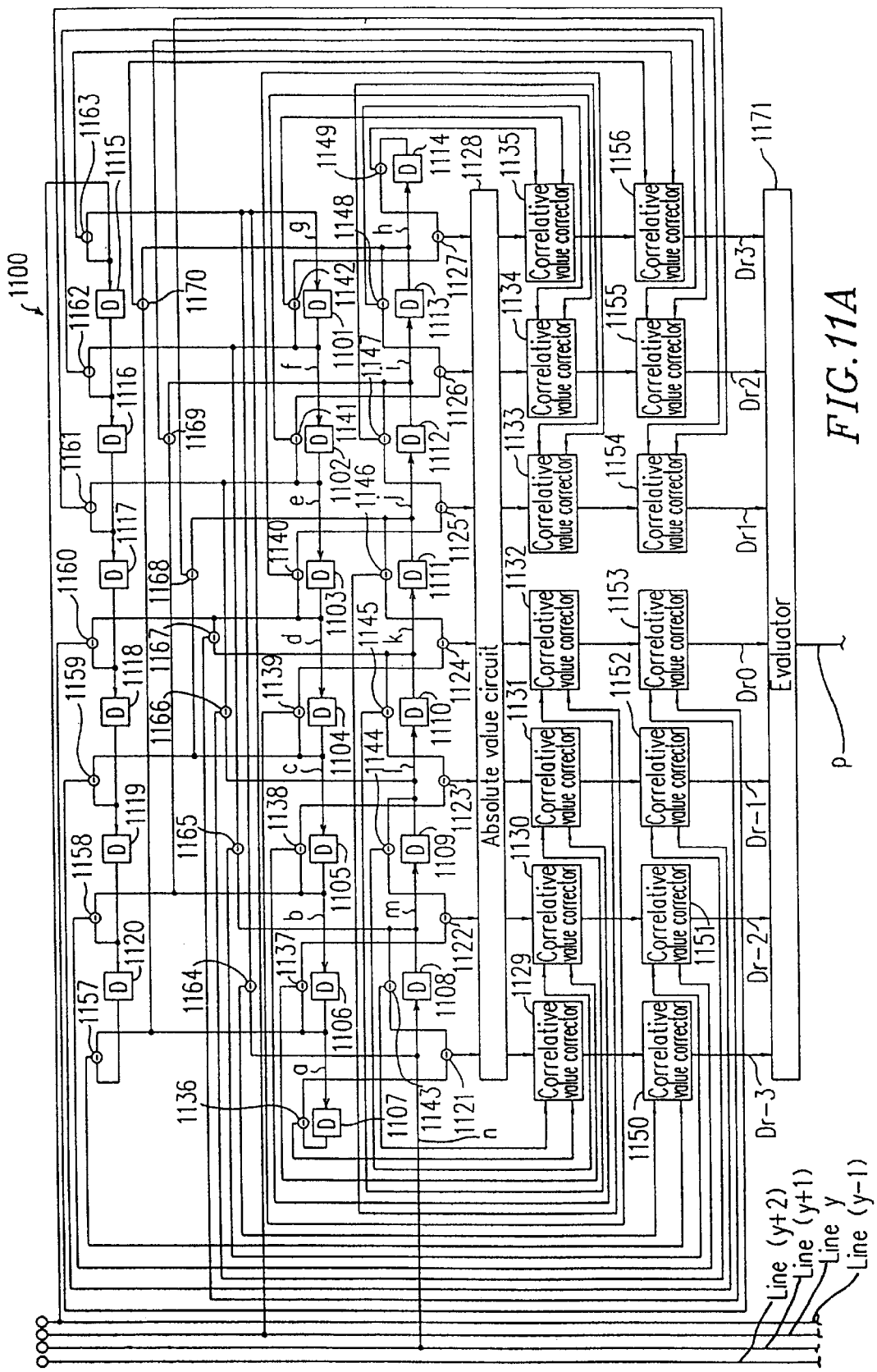
FIG. 11 is a block diagram of an intrafield interpolator usable in the progressive scanning conversion apparatus shown in FIG. 10.
Figure 11B:
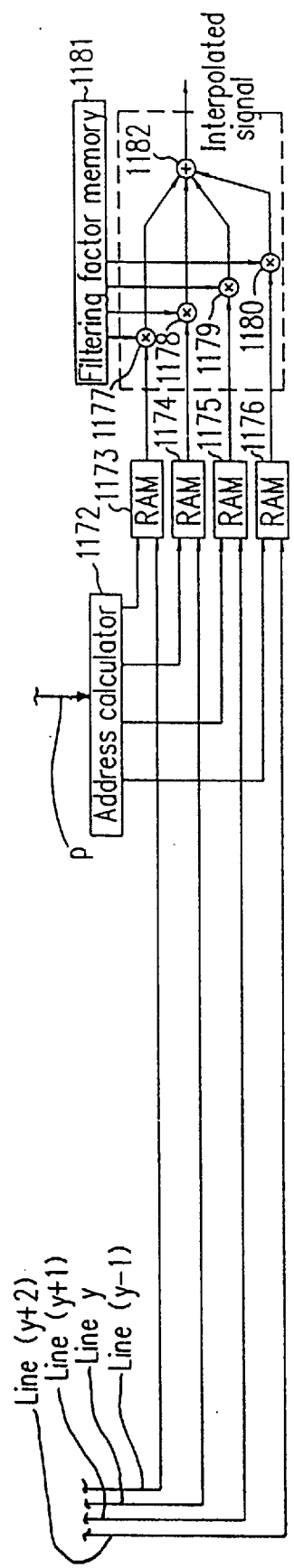

FIG. 11 is a block diagram of the intrafield interpolator 1100. The operation of the intrafield interpolator 1100 will be described in detail with reference to FIG. 11.

The signal which is delayed by the 1H memory 1012 (FIG. 10) is an original signal representing a pixel on the line y. The signal is further delayed by 1D delay devices 1101 through 1106 (1D corresponds to one pixel in interlaced scanning), thereby obtaining original signals a through g. The original signals a through g represent the original pixels a through g on the line y in FIG. 6.

The signal which is delayed by the 1H memory 1013 is an original signal representing a pixel on the line (y+1). The signal is further delayed by 1D delay circuits 1108 through 1113, thereby obtaining original signals h through n. The original signals h through n represent the original pixels h through n on the line (y+1) in FIG. 6.

By subtractors 1121 through 1127, the differential values of the respective pairs of original pixels in the slope candidates −3 through +3 shown in FIG. 6. The obtained differential values are turned into absolute values by an absolute value circuit 1128 and are output to correlative value correctors 1129 through 1135 as correlative values. 1D delay circuits 1115 through 1120 delay the original signals on the line (y−1). 1D delay circuits 1107 and 1114 delay the input signals during the period of 1D.

By subtractors 1136 through 1142, the edge information in the horizontal direction of the original signals on the line y (for example, pixel value j−(minus) pixel value i) is obtained. By subtractors 1143 through 1149, the edge information in the horizontal direction of the original signals on the line (y+1) is obtained. Based on the edge information in the horizontal direction of the original signals on the line y and such edge information of the original signals on the line (y+1), the absolute values obtained by the absolute value circuit 1128 are respectively corrected by the correlative value correctors 1129 through 1135.

The correction is performed by the correlative value correctors 1129 through 1135 in the following manner.

First, the differential values in the edge information in the horizontal direction between the respective pairs of pixels in the slope candidates −3 through +3 are calculated. The differential value in the edge information of each pair of pixels is turned into an absolute value. Based on the absolute value, the correlative value is corrected. The correction is performed simply by adding the correlative value and the differential absolute value in the edge information in the horizontal direction. When the differential absolute value in the edge information in the horizontal direction is excessively small, the correction method is slightly different. An excessively small differential absolute value in the edge information indicates that the edge information of the pair of pixels is similar. However, the meaning of the correlation when both of the pixels have an edge is different from that when neither of the pixels has an edge.

Comparing a pair of pixels both having the same category of edge information (edge 1 or 2) and another pair of pixels having edge 3 (no edge); if the differential absolute values in the edge information of the two pairs are the same, it is determined that the correlation between the first pair (both having edge 1 or 2) is higher than the correlation between the second pair (no edge).

Accordingly, when both pixels have an edge and the differential absolute value in the edge information is small, a correction value $\alpha$ ($\alpha<0$) is added to the correlative value after addition of the differential absolute value in the edge information. Any circuit for performing such processing can be used as the correlative value correctors 1129 through 1135. The correlative value correctors 1129 through 1135 can be implemented by a memory storing look-up table memories.

The correlative values obtained by the correlative value correctors 1129 through 1135 are respectively input to another correlative value correctors 1150 through 1156 for correcting the correlative values based on the edge information in the vertical direction.

By subtractors 1157 through 1163, the edge information in the vertical direction of the original signals on the line y (for example, pixel value k (line y)−(minus) pixel value d (line y−1)) is obtained. By subtractors 1164 through 1170, the edge information in the vertical direction of the original signals on the line (y+1) is obtained. Based on the edge information in the vertical direction of the original signals on the line y and such edge information of the original signals on the line (y+1), the correlative values input to the correlative value correctors 1150 through 1156 are corrected.

The correlative value correctors 1150 through 1156 perform in the same manner as the correlative value correctors 1129 through 1135.

An evaluator 1171 determines the minimum value from among correlative values $Dr_{-3}$ through $Dr_{+3}$ obtained by the correlative value correctors 1150 through 1156. When $Dr_{-3}$ is determined to be minimum, the interpolation direction is the slope candidate −3 shown in FIG. 6, and thus −3 is output as the interpolation direction P. Similarly, when $Dr_{-2}$ is determined to be minimum, P=−2; when $Dr_{-1}$ is determined to be minimum, P=−1; when $Dr_0$ is determined to be minimum, P=0; when $Dr_{+1}$ is determined to be minimum, P=+1; when $Dr_{+2}$ is determined to be minimum, P=+2; and when $Dr_{+3}$ is determined to be minimum, P=+3.

An address calculator 1172 calculates the addresses in RAMs 1173 through 1176. In detail, the RAMs 1173 through 1176 respectively store the original signals on the lines (y−1), y, (y+1) and (y+2). The address calculator 1172 calculates the addresses in the RAMs 1173 through 1176 at which the four original signals required to generate the interpolated pixel are stored. The four original signals retrieved from the RAMs 1173 through 1176 by the address calculator 1172 are respectively multiplied by prescribed weighting factors which are output from a filtering factor memory 1181 by multipliers 1177 through 1180. The resultant values are summated by an adder 1182, thereby obtaining the interpolated signal.

By the progressive scanning conversion apparatus 3, the pixel value p3 shown in FIG. 7 is generated in the following manner. In the following description, the original signals a through n correspond to the original pixels a through n in FIG. 6.

The differential values between the pairs of pixels in the slope candidates −3 (a and n), −2 (b and m), −1 (c and l), 0 (d and k), +1 (e and j), +2 (f and i) and +3 (g and h) by the subtractors 1121 through 1127, and are turned into absolute values by the absolute value circuit 1128. The absolute values obtained by the absolute value circuit 1128, namely, the correlative values are: 100 in the slope candidates −3 through 0, +2 and +3; and 0 in the slope candidate +1.

The edge information in the horizontal direction of the original signals a through g on the line y is obtained by the subtractors 1136 through 1142. The results are: 0 for the original signals a through e and g; and −100 for the original signal f. The edge information in the horizontal direction of the original signals h through n on the line (y+1) is obtained by the subtractors 1143 through 1149. The results are: 0 for the original signals 1 through n and h through j; and −100 for the original signal k.

The differential absolute values in the edge information of the original signals in the slope candidates −3 through +3 are obtained by the correlative value correctors 1129 through 1135. The obtained absolute values are: 0 in the slope candidates −3 through −1, +1 and +3; and 100 in the slope candidates 0 and +2. Such absolute values are added to the correlative values output by the absolute value circuit 1128. In the slope candidates −3 through −1, +1 and +3, either the original signals on the line y or the original signals on the line (y+1) do not have any edge. Thus, the correlative value does not change. In the slope candidates 0 and +2, either one of the original signals has an edge in the horizontal direction. Thus, the correlative value is added to the differential absolute value in the edge information in the horizontal direction. As a result, the correlative values after correction are 200 in both the slope candidates 0 and +2.

The edge information in the vertical direction of the original signals a through g on the line y is calculated by the subtractors 1157 through 1163. The resultant values are: 0 for the original signals a through e; −100 for the original signals f and g. The edge information in the vertical direction of the original signals h through n on the line (y+1) is calculated by the subtractors 1164 through 1170. The resultant values are: 0 for the original signals h through j, m and n; and −100 for the original signals k and l.

The differential absolute values in the edge information in the vertical direction of the original signals in the slope candidates −3 through +3 are obtained by the correlative value correctors 1150 through 1156. The resultant values are: 0 for the slope candidates −3, −2 and +1; and 100 for the slope candidates −1, 0, +2 and +3. Such differential absolute values are respectively added to the correlative values obtained by the correlative value correctors 1129 through 1135. The resultant values are: 100 for the slope candidates −3 and −2; 200 for the slope candidates −1 and +3; 300 for the slope candidates 0 and +2; and 0 for the slope candidate +1.

The minimum value among the correlative values obtained by the correlative value correctors 1150 through 1156 is determined by the evaluator 1171. The correlative value $Dr_1=0$ in the slope candidate +1 is determined to be minimum, and thus 1 is output as the interpolation direction P.

Accordingly, the address calculator 1172 calculates the addresses in the slope candidate +1 with respect to the pixel p3. The four signals retrieved from the RAMs 1173 through 1176 by the address calculator 1172 are respectively multiplied by prescribed weighting factors stored in the filtering factor memory 1181 by the multipliers 1177 through 1180. The resultant values are summated by the adder 1182. Thus, the interpolated signal is generated.

The prescribed weighting factors stored in the filtering factor memory 1181 can be, for example, 0 for the multiplier 1177, 0.5 for the multiplier 1178, 0.5 for the multiplier 1179, and 0 for the multiplier 1180. In such a case, the two original signals (one above the interpolated pixel and one below the interpolated pixel) in the interpolation direction P are averaged for interpolation. Alternatively, the prescribed weighting factors can be −0.212 for the multiplier 1177, 0.637 for the multiplier 1178, 0.637 for the multiplier 1179, and −0.212 for the multiplier 1180. In such a case, cubic convolution interpolation is performed in the interpolation direction P. Still alternatively, the prescribed weighting factors can be −0.0625 for the multiplier 1177, 0.5625 for the multiplier 1178, 0.5625 for the multiplier 1179, and −0.0625 for the multiplier 1180. In such a case, lagrange interpolation is performed in the interpolation direction P. Whichever set of coefficients is used in this case, the value of the interpolated signal p3 is 100.

In the same manner, the pixel value p4 is generated. The correlative values between the original signals in the slope candidates −3 through +3 are obtained. The differential absolute values in the edge information in the horizontal direction are 0 for all of the seven slope candidates. In the slope candidates −3 through 0, +2 and +3, either the original pixels on the line y or the original pixels on the line (y+1) do not have any edge. In the slope candidate +1, the original pixel on the line y and the original pixel on the line (y+1) have similar edge information. Thus, the correction value $\alpha 1$ for the edge information in the horizontal direction is added to the correlative value in the slope candidate +1. Herein, the correction value $\alpha 1=-10$. The correlative values after such correction are: 100 for the slope candidates −3 through 0, +2 and +3; and −10 in the slope candidate +1.

Next, the edge information in the vertical direction of the original pixels is obtained by the subtractors 1157 through 1163, and then the differential absolute values in the edge information in the vertical direction are obtained. The resultant values are: 0 for the slope candidates −3 through −1, +1 and +3; and 100 for the slope candidates 0 and +2. The differential absolute values are added to the respective correlative values obtained by correction based on the edge information in the horizontal direction. The resultant values are: 100 for the slope candidates −3 through −1 and +3; 200 for the slope candidates 0 and +2; and −5 for the slope candidate +1.

In the slope candidate +1, the original pixel on the line y and the original pixel on the line (y+1) have similar edge information. Thus, a correction value $\alpha 2$ for the edge information in the vertical direction is added to the correlative value. Herein, the correction value $\alpha 2=-10$. Among the correlative values obtained by such correction, only the correlative value in the slope candidate +1 is −20.

Such obtained correlative values are each corrected based on the differential absolute values in the edge information in the horizontal and vertical directions of the original signals on the lines y and (y+1). The resultant correlative values ($Dr_{-3}$ through $Dr_{+3}$) are: 100 for the slope candidates −3 through −1 and +3; −20 for the slope candidate +1; and 200 for the slope candidates 0 and +2. The evaluator 1171 determines $Dr_1 = -20$ to be minimum and outputs 1 as the interpolation direction P. From the original signals in the slope direction +1 with respect to the interpolated pixel p4, the pixel value p4 is 0.

Figure 12A:
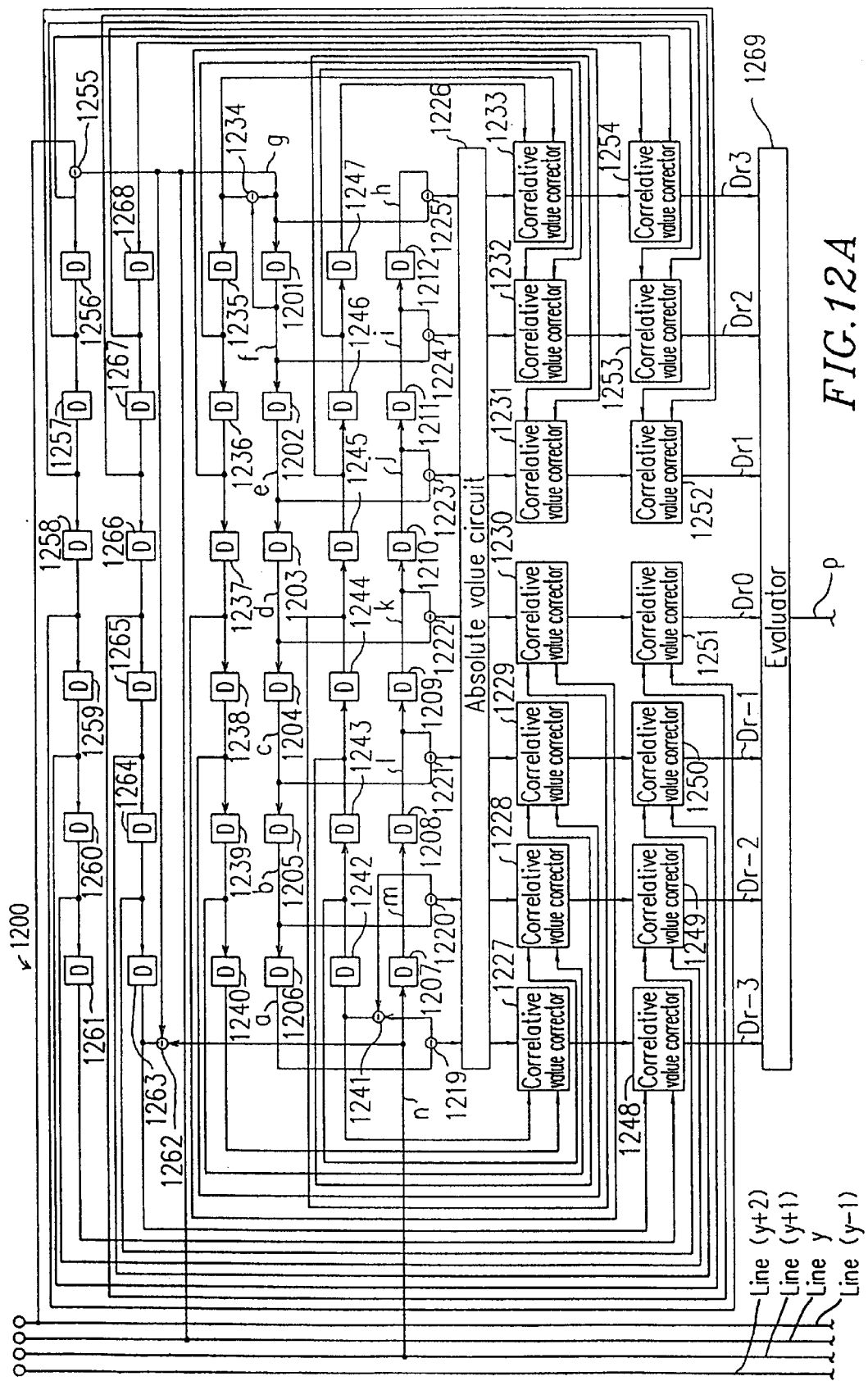
FIG. 12 is another a block diagram of another intrafield interpolator usable in the progressive scanning conversion apparatus shown in FIG. 10.
Figure 12B:
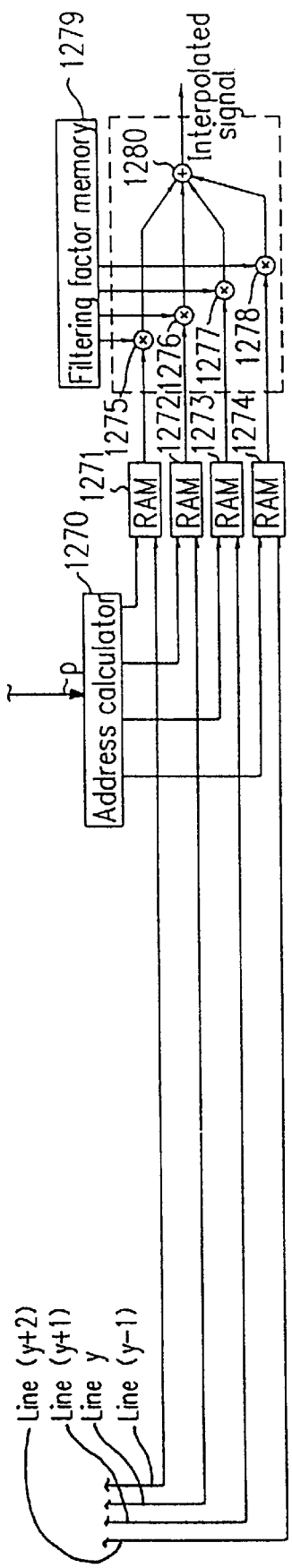

Alternatively, the progressive scanning conversion apparatus 3 can have an intrafield interpolator 1200 shown in FIG. 12. FIG. 12 is a block diagram of the intrafield interpolator 1200. The operation of the intrafield interpolator 1200 will be described in detail with reference to FIG. 12.

The intrafield interpolator 1200 receives the same input signals and operates in the same manner as the intrafield interpolator 1100 for calculation of the differential absolute values between the original signals in the interpolation direction to obtain a correlative value, the correction of the correlative value based on the edge information in the horizontal direction, and the correction of the correlative value based on the edge information in the vertical direction.

The signal which is delayed by the 1H memory 1012 is an original signal representing a pixel on the line y. The signal is further delayed by 1D delay devices 1201 through 1206 (1D corresponds to one pixel in interlaced scanning), thereby obtaining original signals a through g. The original signals a through g represent the original pixels a through g on the line y in FIG. 6.

The signal which is delayed by the 1H memory 1013 is an original signal representing a pixel on the line (y+1). The signal is further delayed by 1D delay circuits 1207 through 1212, thereby obtaining original signals h through n. The original signals h through n represent the original pixels h through n on the line (y+1) in FIG. 6.

By subtractors 1219 through 1225, the differential values of the respective pairs of original pixels in the slope candidates −3 through +3 shown in FIG. 6. The obtained differential values are turned into absolute values by an absolute value circuit 1226 and are output to correlative value correctors 1227 through 1233 as correlative values.

The edge information in the horizontal direction of the original signals on the line y is calculated by a subtractor 1234, and delayed by 1D delay circuits 1235 through 1240. In detail, the edge information in the horizontal direction of the original pixel a is delayed by the 1D delay circuit 1240; such edge information of the original pixel b is delayed by the 1D delay circuit 1239; such edge information of the original pixel c is delayed by the 1D delay circuit 1238; such edge information of the original pixel d is delayed by the 1D delay circuit 1237; such edge information of the original pixel e is delayed by the 1D delay circuit 1236; and such edge information of the original pixel f is delayed by the 1D delay circuit 1235. Such edge information of the original pixel g is obtained by the subtractor 1234 and is not delayed.

The edge information in the horizontal direction of each of the original signals on the line (y+1) is calculated by a subtractor 1241, and delayed by 1D delay circuits 1242 through 1247. In detail, the edge information in the horizontal direction of the original pixel h is delayed by the 1D delay circuit 1247; such edge information of the original pixel i is delayed by the 1D delay circuit 1246; such edge information of the original pixel j is delayed by the 1D delay circuit 1245; such edge information of the original pixel k is delayed by the 1D delay circuit 1244; such edge information of the original pixel l is delayed by the 1D delay circuit 1243; and such edge information of the original pixel m is delayed by the 1D delay circuit 1242. Such edge information of the original pixel n is obtained by the subtractor 1241 and is not delayed.

Based on the edge information in the horizontal direction of the original signals on the line y and the edge information in the horizontal direction on the original signals on the line (y+1), the correlative values obtained by the absolute value circuit 1226 are corrected by correlative value correctors 1227 through 1233.

By the correlative value correctors 1227 through 1233, the edge information in the vertical direction of the original signals on the line y (differential absolute value between each original signal on the line y and the original signal immediately thereabove and on the line (y−1)) is calculated. By a subtractor 1255 and 1D delay circuits 1256 through 1261, the edge information in the vertical direction of the original signals on the line y is calculated as a differential value of the original signal on the line (y+1). By a subtractor 1262 and 1D delay circuits 1263 through 1268, the edge information in the vertical direction of the original signals on the line (y+1) is calculated. In detail, the edge information in the horizontal direction of the original signal h is delayed by the 1D delay circuit 1268, such edge information of the original signal i is delayed by the 1D delay circuit 1267; such edge information of the original signal j is delayed by the 1D delay circuit 1266; such edge information of the original signal k is delayed by the 1D delay circuit 1265; such edge information of the original signal l is delayed by the 1D delay circuit 1264; and such edge information of the original signal m is delayed by the 1D delay circuit 1263. Such edge information of the original signal n is calculated by the subtractor 1262 and is not delayed.

Based on the edge information in the vertical direction of the original signals on the line y and such edge information of the original signals on the line (y+1), the correlative values input to the correlative value correctors 1248 through 1254 are corrected.

The correlative value correctors 1248 through 1254 perform in the same manner as the correlative value correctors 1150 through 1156.

An evaluator 1269 determines the minimum value from among correlative values $Dr_{-3}$ through $Dr_{+3}$ obtained by the correlative value correctors 1248 through 1254.

An address calculator 1270 calculates the addresses in RAMs 1271 through 1274. In detail, the RAMs 1271 through 1274 respectively store the original signals on the lines (y−1), y, (y+1) and (y+2). The address calculator 1270 calculates the addresses in the RAMs 1271 through 1274 at which the four original signals required to generate the interpolated pixel are stored. The four original signals retrieved from the RAMs 1271 through 1274 by the address calculator 1270 are respectively multiplied by prescribed weighting factors which are output from a filtering factor memory 1279 by multipliers 1275 through 1278, and the resultant values are summated by an adder 1280, thereby obtaining the interpolated signal.

By the progressive scanning conversion apparatus 3 having the intrafield interpolator 1200 operates in the same manner as the progressive scanning conversion apparatus 3 having the intrafield interpolator 1100. For generating an original pixel p3 shown in FIG. 7, the same operation as described with reference to FIGS. 10 and 12 is performed. The resultant correlative values are: 100 for the slope candidates −3 and −2; 200 for the slope candidates −1 and +3; 300 for the slope candidates 0 and +2; and 0 for the slope candidate +1. Such correlative values are output from correlative value correctors 1248 through 1254 as $Dr_{-3}$ through $Dr_3$.

The evaluator 1269 determines the correlative value $Dr_1=0$ in the slope candidate +1 to be minimum among the correlative values $Dr_{-3}$ through $Dr_3$ output from the correlative value correctors 1248 through 1254. Thus, the evaluator 1269 output +1 as the interpolation direction P.

Accordingly, the address calculator 1270 calculates the addresses in the slope candidate +1 with respect to the pixel p3. The four signals retrieved from the RAMs 1271 through 1274 by the address calculator 1270 are respectively multiplied by prescribed weighting factors stored in the filtering factor memory 1279 by the multipliers 1275 through 1278. The resultant values are summated by the adder 1280. Thus, the interpolated signal is generated.

As the prescribed weighting factors stored, linear interpolation factors, the cubic convolution interpolation factors, or the lagrange interpolation factors can be used. Whichever set of coefficients is used in this case, the value of the interpolated signal p3 is 100.

In the same manner, the pixel value p4 is generated. The evaluator 1269 outputs +1 as the interpolation direction P. By the filtering factor memory 1279, the multipliers 1275 through 1278, and the adder 1280, 0 is obtained as the pixel value p4.

Figure 13A:
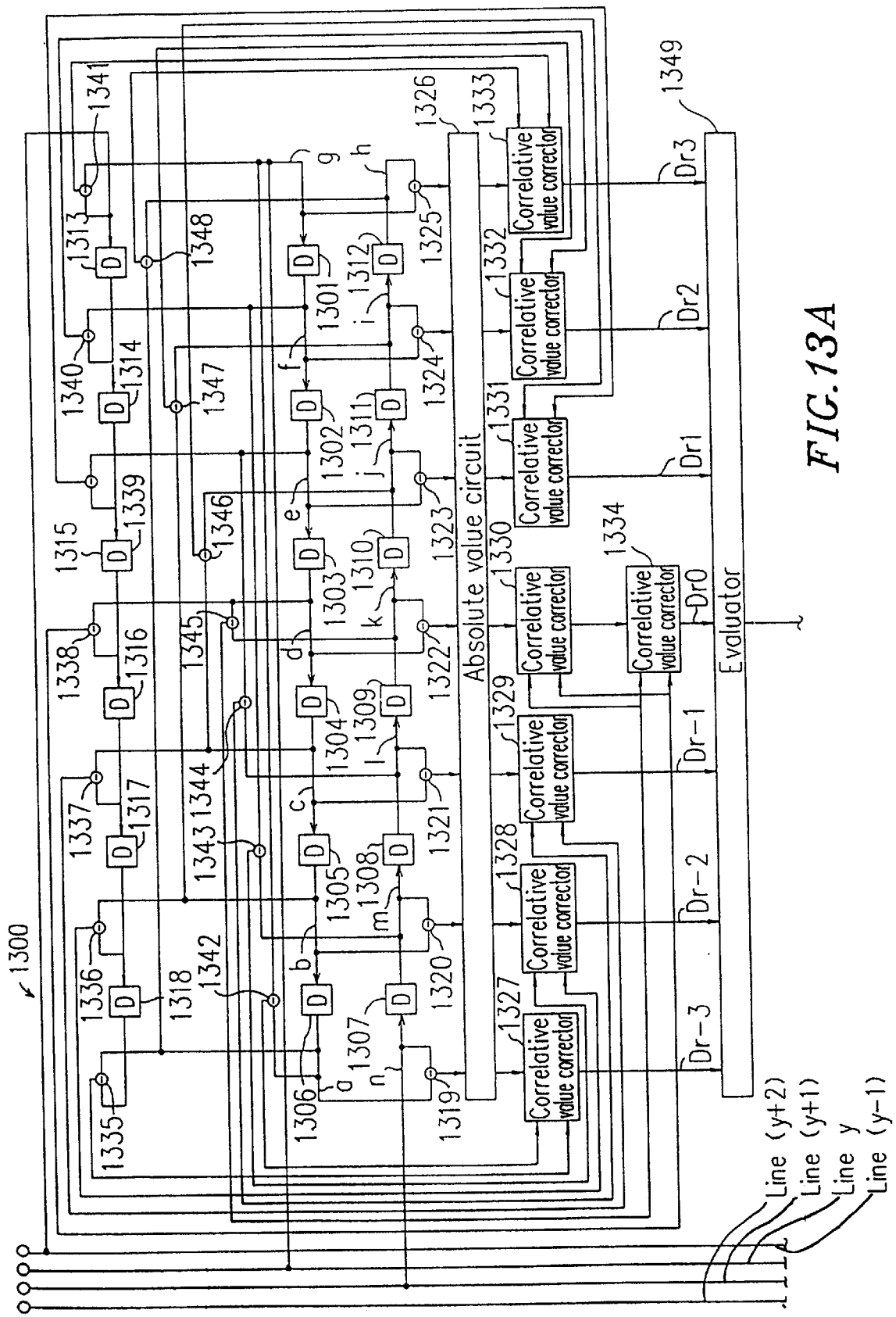
FIG. 13 is a block diagram of still another intrafield interpolator usable in the progressive scanning conversion apparatus shown in FIG. 10.
Figure 13B:
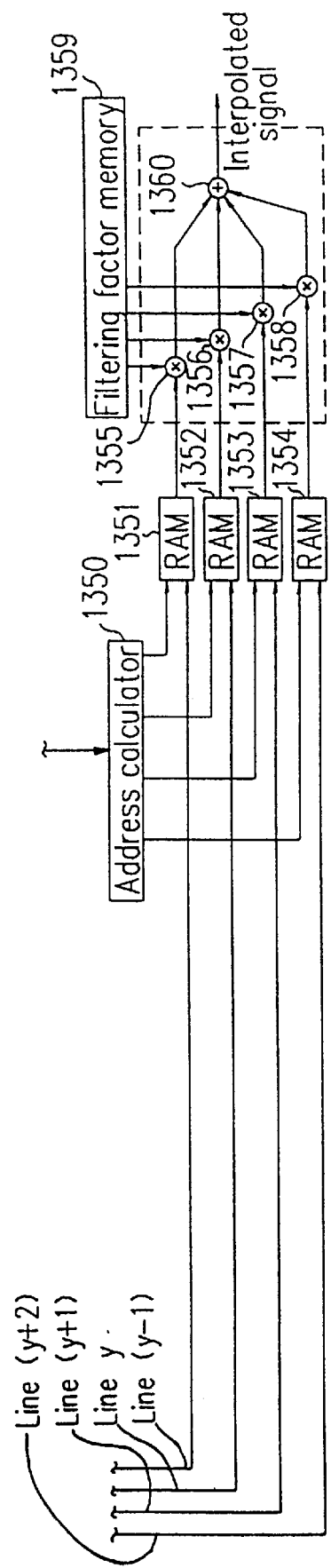

Still alternatively, the progressive scanning conversion apparatus 3 can have an intrafield interpolator 1300 shown in FIG. 13. FIG. 13 is a block diagram of the intrafield interpolator 1300. The operation of the intrafield interpolator 1300 will be described in detail with reference to FIG. 13.

The intrafield interpolator 1300 receives the same input signals and operates in the same manner as the intrafield interpolator 1100 for calculation of the differential absolute values between the original signals in the interpolation direction to obtain a correlative value, and the correction of the correlative value based on the edge information in the vertical direction.

The signal which is delayed by the 1H memory 1012 is an original signal representing a pixel on the line y. The signal is further delayed by 1D delay devices 1301 through 1306 (1D corresponds to one pixel in interlaced scanning), thereby obtaining original signals a through g. The original signals a through g represent the original pixels a through g on the line y in FIG. 6.

The signal which is delayed by the 1H memory 1013 is an original signal representing a pixel on the line (y+1). The signal is further delayed by 1D delay circuits 1307 through 1312, thereby obtaining original signals h through n. The original signals h through n represent the original pixels h through n on the line (y+1) in FIG. 6.

By subtractors 1319 through 1325, the differential values of the respective pairs of original pixels in the slope candidates −3 through +3 shown in FIG. 6 are obtained. The obtained differential values are turned into absolute values by an absolute value circuit 1326 and are output to correlative value correctors 1327 through 1333 as correlative values. 1D delay circuits 1313 through 1318 delay the original signals on the line (y−1).

The edge information in the vertical direction of each of the original signals on the line y is calculated by subtractors 1335 through 1341 as differential values of original signal on the line (y−1). The edge information in the vertical direction of the original signals on the line (y+1) (differential absolute value between each original signal and the adjacent signal in the horizontal direction) is calculated by subtractors 1342 through 1348.

Based on the edge information in the vertical direction of the original signals on the line y and the edge information in the vertical direction on the original signals on the line (y+1), the correlative values obtained by the absolute value circuit 1326 are corrected by correlative value correctors 1327 through 1333.

The correlative value correctors 1327 through 1333 operate in the same manner as the correlative value correctors 1227 through 1233 in the intrafield interpolator 1200, regarding the slope candidates −3 through −1 and +1 through +3. In other words, the correlative values in the slope candidates −3 through −1 and +1 through +3 obtained by the correlative value correctors 1327 through 1329 and 1331 through 1333 are input to the evaluator 1349. The correlative value in the slope candidate 0 obtained by the correlative value corrector 1330 is corrected by the correlative value corrector 1334 based on the edge information in the vertical direction of the original signals in the slope candidate 0.

FIG. 16 is a view illustrating original pixels having no edge in the vertical direction and interpolated pixels. Here, "no edge in the vertical direction" means that there is no difference in the pixel values for two adjacent pixels in the vertical direction. For generating an oblique edge, only having the edge information in the vertical direction is sufficient. However, the edge information in the vertical direction is not sufficient to generate a vertical line formed of original pixels having an edge only in the horizontal direction. In such a case, a desirable interpolation direction cannot be specified, and furthermore a wrong interpolation direction can be selected. Such inconveniences lead a drastic reduction in the image quality.

If the correlative values of the original pixels in the image shown in FIG. 16 are corrected merely based on the edge information in the vertical direction, the correlative values after correction are 0 except for those in the slope candidates −1 and +1. Thus, the desirable interpolation direction cannot be specified. In the case where the interpolated pixel p3 is generated using the slope candidates −3, −2, +2 and +3, the interpolated pixel value p3=100, which is greatly different from the above-obtained correlative value 0. In order to avoid such a problem, the above-obtained correlative value in the slope candidate 0 which is obtained based on the edge information in the vertical direction is further corrected by the correlative value corrector 1334.

Hereinafter, such correction will be described in detail.

In the case where both original pixels of the pair have an edge in the vertical direction and the correlative value in the edge information in the vertical direction is high, the correlative value correctors 1327 through 1333 each add a correction value α to the correlative value obtained by the absolute value circuit 1326. In the case where neither of the pair of original pixels in the slope candidate 0 has any edge in the vertical direction and the correlative value of the edge information in the vertical direction is high, the correlative value corrector 1334 adds a correction value β to the correlative value obtained by the correlative value corrector 1330. Regarding the pair of original pixels in the slope candidate 0, in the case where the pixels have no edge and the correlative value is high, there is a high possibility that the interpolated pixel exists inside the image. For this reason, the correction value β is added to the correlative value in the slope candidate 0. The correction value can be any negative value, but is preferably larger than the correction value α in consideration with the steep oblique line B shown in FIG. 9.

By such correction based on the edge information in the vertical direction, the correlative value $Dr_0$ is obtained by the correlative value correctors 1330 and 1334. The evaluator 1349 determines the minimum value from among the correlative values $Dr_{-3}$ through $Dr_{+3}$. The correlative values $Dr_{-3}$ through $Dr_{-1}$ are respectively output from the correlative value correctors 1327 through 1329. The correlative values $Dr_{+1}$ through $Dr_{+3}$ are respectively output from the correlative value correctors 1331 through 1333. As a result, the optimum interpolation direction P is output.

An address calculator 1350 calculates the addresses in RAMs 1351 through 1354. In detail, the RAMs 1351 through 1354 respectively store the original signals on the lines (y−1), y, (y+1) and (y+2). The address calculator 1350 calculates the addresses in the RAMs 1351 through 1354 at which the four original signals required to generate the interpolated pixel are stored. The four original signals retrieved from the RAMs 1351 through 1354 by the address calculator 1350 are respectively multiplied by prescribed weighting factors which are output from a filtering factor memory 1359 by multipliers 1355 through 1358. The resultant values are summated by an adder 1360, thereby obtaining the interpolated signal.

The operation of the intrafield interpolator 1300 for generating the interpolated pixel p3 shown in FIG. 7 will be described in detail.

The differential values between the pairs of pixels in the slope candidates −3 (a and n), −2 (b and m), −1 (c and l), 0 (d and k), +1 (e and j), +2 (f and i) and +3 (g and h) by the subtractors 1319 through 1325, and are turned into absolute values by the absolute value circuit 1326. The absolute values obtained by the absolute value circuit 1326, namely, the correlative values are: 100 in the slope candidates −3 through 0, +2 and +3; and 0 in the slope candidate +1.

The edge information in the vertical direction of each of the original signals a through g on the line y is obtained by the subtractors 1335 through 1341. The results are: 0 for the original signals a through e; and −100 for the original signals f and g. The edge information in the vertical direction of each of the original signals h through n on the line (y+1) is obtained by the subtractors 1342 through 1348. The results are: 0 for the original signals h through j and m through n; and −100 for the original signals k and l.

The differential absolute values in the edge information in the vertical direction of the original signals in the slope candidates −3 through +3 are obtained by the correlative value correctors 1327 through 1333. The obtained absolute values are: 0 in the slope candidates −3, −2 and +1; and 100 in the slope candidates −1, 0, +2 and +3. Such absolute values are added to the correlative values output by the absolute value circuit 1326. The results are: 100 in the slope candidates −3 and −2; 200 in the slope candidates −1, 0, +2 and +3; and 0 in the slope candidate +1. The operation of the correlative value corrector 1334 is based on the edge information in the vertical direction of the original signals in the slope candidate 0, especially whether or not the original pixels each have an edge. The original pixel immediately above the interpolated pixel p3 (the line y) does not have an edge, but the original pixel immediately below the pixel p3 (the line (y+1)) has an edge. Accordingly, the correlative values are not corrected by the correlative value corrector 1334.

The evaluator 1349 determines the minimum value from among the correlative values $Dr_{-3}$ through $Dr_{+3}$. The correlative values $Dr_{-3}$ through $Dr_{-1}$, are obtained by the correlative value correctors 1327 through 1329; the correlative values $Dr_0$ is obtained by the correlative value corrector 1334; and the correlative values $Dr_{+1}$ through $Dr_{+3}$ are obtained by the correlative value correctors 1330 through 1333. The correlative value $Dr_0$ is determined to be minimum, and thus 1 is output as the interpolation direction P.

Accordingly, the address calculator 1350 calculates the addresses in the slope candidate +1 with respect to the pixel p3. The four signals retrieved from the RAMs 1351 through 1354 by the address calculator 1350 are respectively multiplied by prescribed weighting factors stored in the filtering factor memory 1359 by the multipliers 1355 through 1358. The resultant values are summated by the adder 1360. Thus, the interpolated signal is generated.

As the prescribed weighting factors stored, linear interpolation factors, the cubic convolution interpolation factors, or the lagrange interpolation factors can be used. Whichever set of coefficients is used, the value of the interpolated signal p3 is 100.

In the same manner, the pixel value p4 is generated. The correlative values of the pairs of original pixels in the slope candidates −3 through +3 are obtained, and turned into absolute values by the absolute value circuit 1326. The differential absolute values in the edge information in the vertical direction of the original signals in the slope candidates −3 through +3 are obtained. Such absolute values are added to the correlative values output by the absolute value circuit 1326. The results are: 100 in the slope candidates −3 through −1 and +3; 200 in the slope candidates 0 and 2; and 0 in the slope candidate +1.

Both of the original signals in the slope candidate +1 with respect to the interpolated pixel p4 have edge 2 shown in FIG. 15. Thus, the correction value α1 (=−10) is added to the correlative value of the original signals. The result is −10. Regarding the operation of the correlative value corrector 1334, the original pixel immediately above the interpolated pixel p4 (the line y) does not have an edge, but the original pixel immediately below the pixel p4 (the line (y+1)) has an edge. Thus, the correlative values are not corrected by the correlative value corrector 1334. As a result, the correlative values $Dr_{-3}$ through $Dr_{-1}$ and $Dr_{+3}$ are each 100; $Dr_0$ and $Dr_2$ are each 200; and $Dr_{+1}$ is −10. The evaluator 1349 outputs 1 as the interpolation direction P. From the original signals in the slope direction +1 with respect to the interpolated pixel p4, the pixel value p4 is 0.

Hereinafter, the effects of the correlative value corrector 1334 will be described with reference to a process for generating the interpolated pixel value p3 shown in FIG. 16. The original signals a through n in FIG. 16 respectively corresponds to the original signals a through n in FIG. 6.

The subtractors 1319 through 1325 calculate the differential values between the pairs of original pixels a and n (slope candidate −3), b and m (slope candidate −2), c and l (slope candidate −1), d and k (slope candidate 0), e and j (slope candidate +1), f and i (slope candidate +2), and g and h (slope candidate +3). The differential values are turned into absolute values by the absolute value circuit 1326. The differential absolute values obtained by the absolute value circuit 1326, namely, the correlative values are: 0 in the slope candidates −3, −2, 0, +2 and +3; and 100 in the slope candidates −1 and +1.

The original signals on the line y or the original signals on the line (y+1) do not have any edge in the vertical direction. Thus, the differential absolute values in the edge information in the vertical direction are 0 in all the slope candidates −3 through +3. Accordingly, the correlative value correctors 1327 through 1333 do not correct the respective correlative values. The correlative value corrector 1334 adds the correction value β to the respective correlative value. In this example, the correction value β=−8. As a result of the addition, the correlative value of −8 is obtained for the slope candidate 0. The correlative values $Dr_{-3}$, $Dr_{-2}$, $Dr_{+2}$ and $Dr_{+3}$ are each 0; and $Dr_{-1}$, and $Dr_{+1}$ are each 100; and $Dr_0$ is −8. The evaluator 1349 outputs 0 as the interpolation direction P. The original signals in the slope direction 0 with respect to the interpolated pixel p3 are treated with linear interpolation, lagrange interpolation or cubic convolution interpolation, thereby obtaining the pixel value p3 of 0.

The interpolated pixel values p0 through p2 and p4 through p6 are generated in the same manner.

Figure 14A:
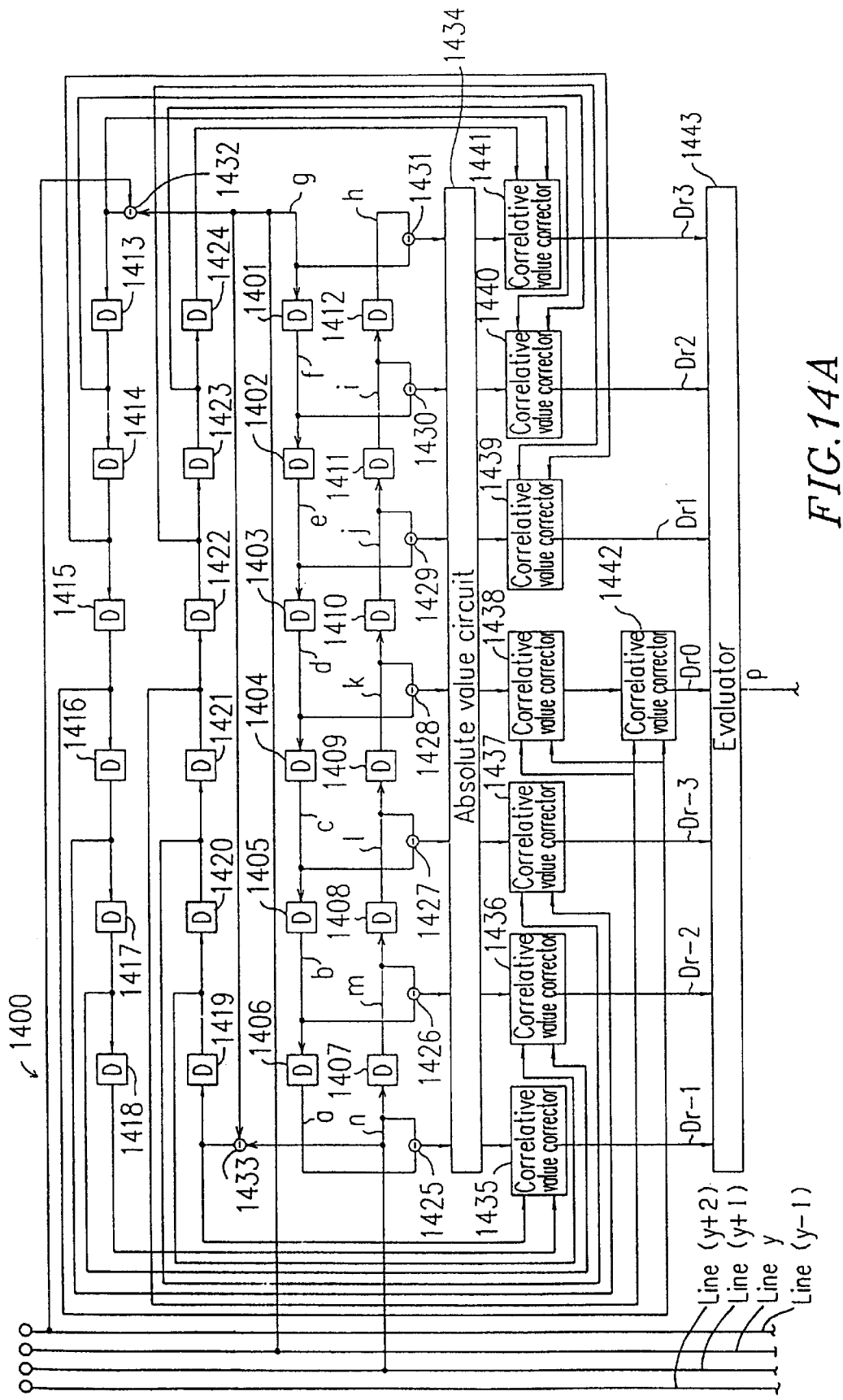
FIG. 14 is a block diagram of still another intrafield interpolator usable in the progressive scanning conversion apparatus shown in FIG. 10.
Figure 14B:
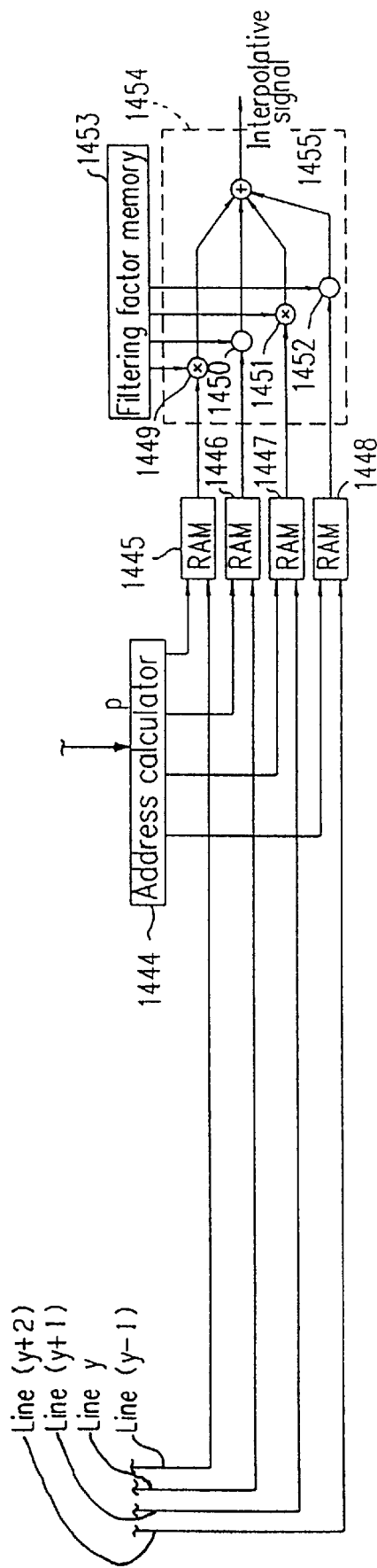

Alternatively, the progressive scanning conversion apparatus 3 can include an intrafield interpolator 1400 shown in FIG. 14. FIG. 14 is a block diagram of the intrafield interpolator 1400. The operation of the intrafield interpolator 1400 will be described with reference to FIG. 14. The intrafield interpolator 1400 is different from the intrafield interpolator 1300 in the following point: the intrafield interpolator 1300 obtains the edge information of the original signals on the line y using the subtractors 1335 through 1341, and obtains the edge information of the original signals on the line (y+1) using the subtractors 1342 through 1348. The intrafield interpolator 1400 obtains the edge information of the original signals on the line y using a subtractor 1432 and 1D delay circuits 1413 through 1418, and obtains the edge information of the original signals on the line (y+1) using a subtractor 1433 and 1D delay circuits 1419 through 1424.

The correlative value correctors 1435 through 1442 operate in the same manner as the correlative value correctors 1327 through 1333 and 1334, and thus detailed description thereof will be omitted.

The edge information in the vertical direction of the original pixel a (line y) is delayed by the 1D delay circuit 1418; such edge information of the original pixel b is delayed by the 1D delay circuit 1417; such edge information of the original pixel c is delayed by the 1D delay circuit 1416; such edge information of the original pixel d is delayed by the 1D delay circuit 1415; such edge information of the original pixel e is delayed by the 1D delay circuit 1414; and such edge information of the original pixel f is delayed by the 1D delay circuit 1413. Such edge information of the original pixel g is output by a subtractor 1432 and is not delayed.

The edge information in the vertical direction of the original pixel h (line (y+1)) is delayed by the 1D delay circuit 1424; such edge information of the original pixel i is delayed by the 1D delay circuit 1423; such edge information of the original pixel j is delayed by the 1D delay circuit 1422; such edge information of the original pixel k is delayed by the 1D delay circuit 1421; such edge information of the original pixel l is delayed by the 1D delay circuit 1420; and such edge information of the original pixel m is delayed by the 1D delay circuit 1419. Such edge information of the original pixel n is output by a subtractor 1433 and is not delayed.

Based on the edge information in the vertical direction, the correlative values are obtained by the correlative value correctors 1435 through 1441 and 1442. An evaluator 1443 determines the minimum value from among the above-obtained correlative values to output the interpolation direction P.

According to the interpolation direction P, the address calculator 1444 calculates the addresses in the interpolation direction with respect to the pixel. The signals retrieved from RAMs 1445 through 1448 by the address calculator 1444 are respectively multiplied by prescribed weighting factors stored in a filtering factor memory 1453 by the multipliers 1449 through 1452. The resultant values are summated by an adder 1455. Thus, the interpolated signal is generated.

In the above example, the evaluation of the correlation is performed based on the differential absolute value between two original signals, but a larger number of original signals can be used.

The intrafield interpolator 1400 generates interpolated pixels in the same manner as the intrafield interpolator 1300. Regarding the oblique line shown in FIG. 7, the interpolated pixel values p0 through p3 are each 100; and p4 and p5 are each 0. Regarding the vertical line shown in FIG. 16, the interpolated pixel values p0 through p2 are each 100; p3 and p4 are each 0; and p5 and p6 are each 100.

Compared with the intrafield interpolator 1300, the intrafield interpolator 1400 requires a significantly smaller number of subtractors for generating edge information in the vertical direction. Thus, the circuit size can be significantly reduced.

As has been described so far, an interpolated signal can be generated using either one of the intrafield interpolators 1100 through 1400. Effective line scanning interpolation can be performed for an oblique line or even a vertical line.

The same effects are achieved if the correlative value correctors include look-up table memories.

In the case where the correction values are set to be α1<α2<0, interpolation in the oblique direction for a steep oblique line can be performed more accurately.

The edge information Edge(r) is set as follows, where "Const" represents a positive constant.

Edge 1: Edge(r)=r−q>Const
Edge 2: Edge(r)=r−q<−Const
Edge 3: −Const≦Edge(r)=r−q≦Const By setting Edge(r) in this manner, the inconvenience that even a slight difference in the luminance or the like which should be ignored is also recognized as an edge can be prevented.

EXAMPLE 4

Figure 17:
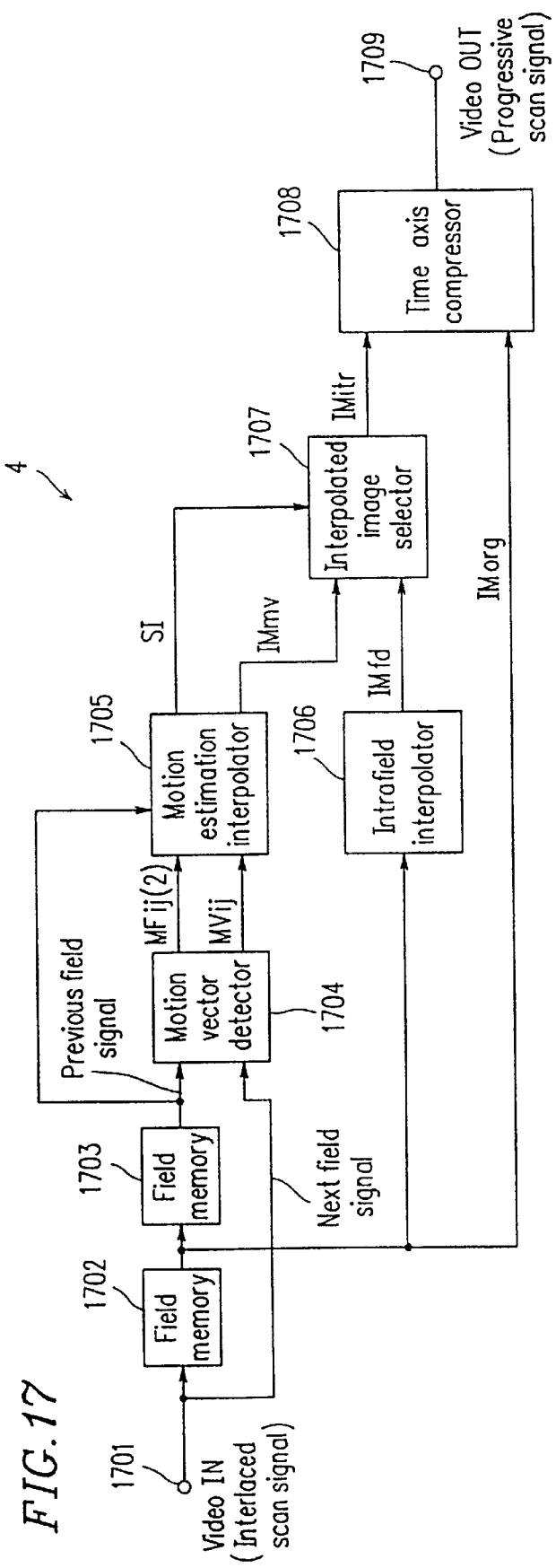
FIG. 17 is a block diagram of a progressive scanning conversion apparatus in a fourth example according to the present invention.

FIG. 17 is a block diagram of a progressive scanning conversion apparatus 4 in a fourth example according to the present invention. The operation of the progressive scanning conversion apparatus 4 will be described together with the structure thereof.

A 2:1 interlaced scan video signal which is input to an input terminal 1701 is delayed by field memories 1702 and 1703. Thus, a signal delayed by the field memory 1702 by one field (current field signal), a signal delayed by the field memories 1702 and 1703 by two signals (previous field signal), and a signal which is not delayed (next field signal) are obtained simultaneously.

A motion vector detector 1704 (described in detail later) detects a motion vector MVij for an interpolated pixel in the current field, using the previous field signal and the next field signal. Simultaneously, the motion vector detector 1704 outputs a motion vector reliability determination result MFij, which indicates the reliability of the motion vector MVij. A motion estimation interpolator 1705 generates an interpolated signal IMmv in the current field, based on the signal in the previous field corresponding to the interpolated signal. Such generation is performed, using the motion vector MVij and the motion vector reliability determination result MFij which are output from the motion vector detector 1704. The motion estimation interpolator 1705 also outputs an interpolated image selection signal SI to an interpolated image selector 1707. By the interpolated image selection signal SI, the interpolated image selector 1707 selects the interpolated signal IMmv generated by the motion estimation interpolator 1705 if the motion vector reliability determination result MFij indicates that the motion vector have reliability. If the motion vector reliability determination result MFij indicates that the motion vector has no reliability, the interpolated image selector 1707 selects an interpolated signal IMfd generated by an intrafield interpolator 1706 (described in detail later).

The intrafield interpolator 1706 generates an interpolated signal by intrafield interpolation; that is, by averaging original signals on the line immediately above the interpolated signal and on the line immediately below the interpolated signal in the current field.

The interpolated image selector 1707 receives the interpolated signals IMmv and IMfd and then outputs an optimum interpolated signal IMitr by the interpolated image selection signal SI. An original signal IMorg in the current field and the interpolated signal IMitr are each time axis-compressed to signals having a data rate which is twice the data rate of the original signals by a time axis compressor 1708, and are output alternately line by line. Thus, a progressive scan signal IMni is output from an output terminal 1709.

Figure 18:
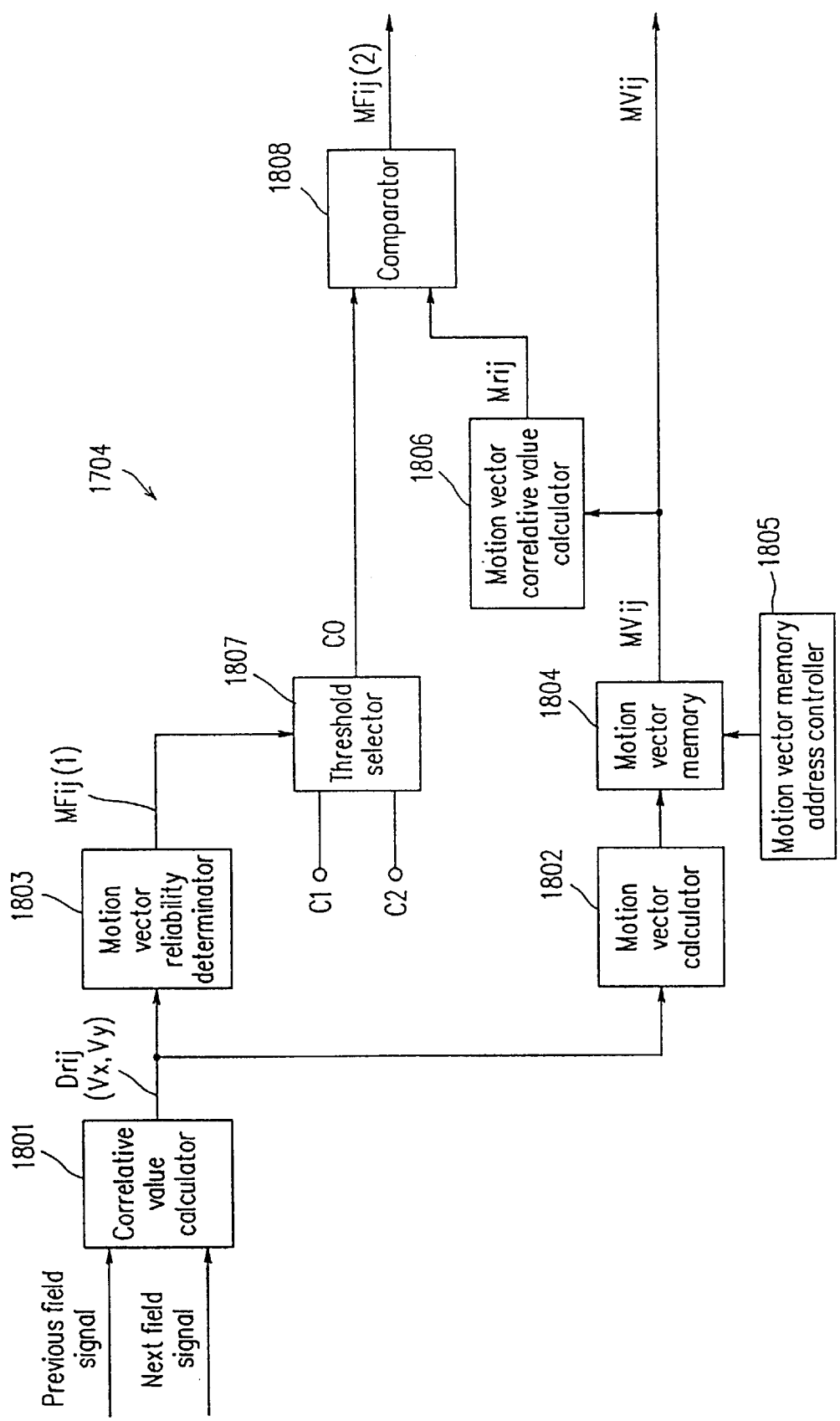
FIG. 18 is a detailed block diagram of the motion vector detector shown in FIG. 17.
Figure 19:
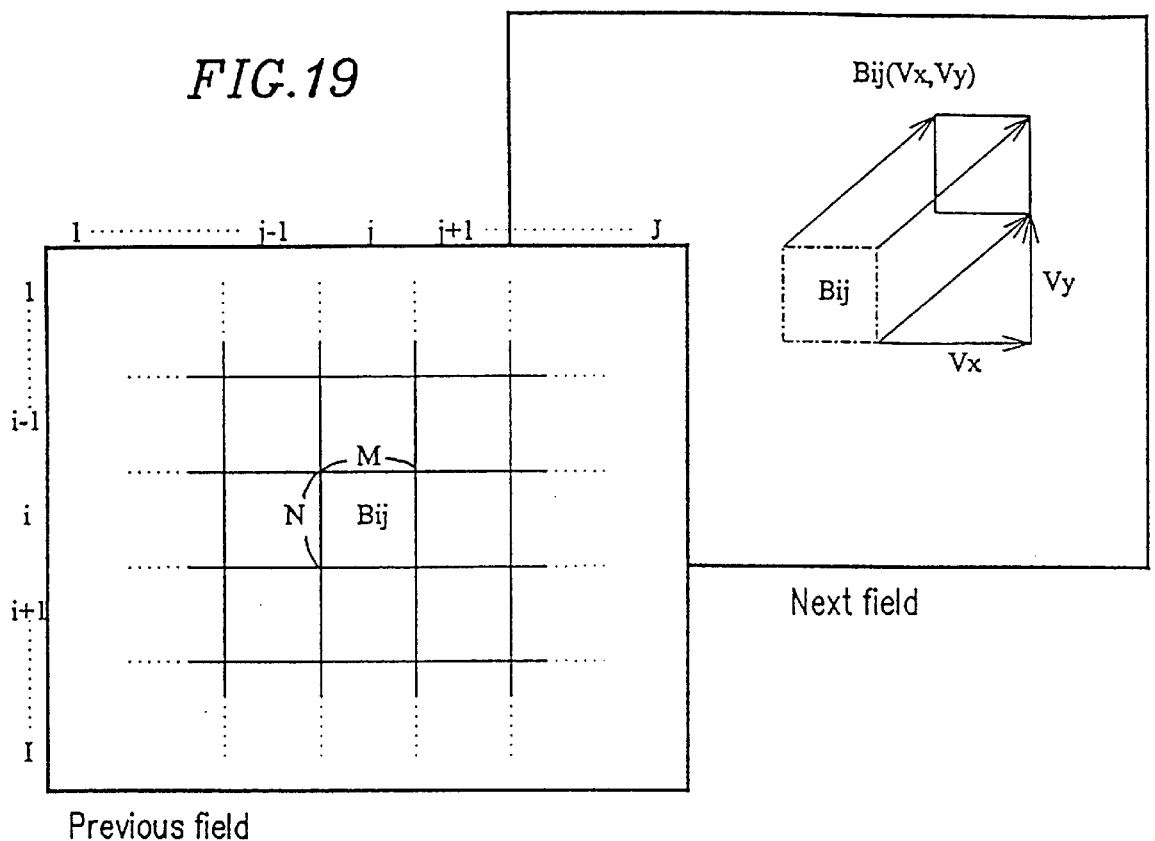
FIG. 19 is a view describing a block matching method used for detecting a motion vector.

FIG. 18 is a detailed block diagram of the motion vector detector 1704. FIG. 19 is a view describing a block matching method used for detecting a motion vector in this example.

Referring to FIG. 19, the block matching method will be described.

As is shown in FIG. 19, the image plane of the previous field is divided into a plurality of blocks Bij (hereinafter, referred to as "motion vector detection blocks"). The plurality of blocks include M pixels (horizontal)×N lines (vertical). Herein, M and N, i and j, and I and J are integers. For example, M=8 and N=8. The motion vector is to be detected from an area of ±K pixels (horizontal) and ±L lines (vertical). K and L are integers. For example, K=16 and L=8. Equations (25) and (26) are used to find a correlative value Drij(Vx,Vy) which indicates the correlation between a motion vector detection block Bij and a block Bij(Vx,Vy) in the next field. The block Bij(Vx,Vy) is away from the motion vector detection block Bij by a moving distance (Vx, Vy), which is a vector having an x component Vx and a y component Vy. The moving distance (Vx, Vy) is within the area of ±K pixels (horizontal) and ±L lines (vertical).

Equations <<<(25) and (26)>>>

$$Drij(Vx, Vy) = \sum_{n=0}^{N} \sum_{m=0}^{M} |I(x+m, y+n) - I'(x+m+Vx, y+n+Vy)| \quad (25)$$

$$Drij(Vx, Vy) = \sum_{n=0}^{N} \sum_{m=0}^{M} (I(x+m, y+n) - I'(x+m+Vx, y+n+Vy))^2 \quad (26)$$

where

I(x+m, y+n):
 the luminance of the pixel (x+m, y+n) in the previous field

I'(x+m+Vx, y+n+Vy):
 the luminance of the pixel (x+m+Vx, y+n+Vy) in the next field I(x+m, y+n) ∈ Bij
I'(x+m+Vx, y+n+Vy) ∈ Bij (Vx,Vy)
−K≦Vx≦K, −L≦Vy≦L As is appreciated from the above description, the correlative value Drij(Vx,Vy) is found in the following manner. First, the differential absolute value between (1) the luminance of each pixel included in the motion vector detection block Bij in the previous field and (2) the luminance of the corresponding pixel in the block Bij(Vx,Vy) in the next field is obtained, or, the square of such a differential absolute value is obtained. The differential absolute values or the squares of the differential absolute values in the block are summated. In this way, the correlative value Drij(Vx,Vy) is obtained.

The moving distance (Vx,Vy) when the correlative value Drij(Vx,Vy) is minimum is the motion vector MVij in the motion vector detection block Bij.

Now, the operation of the motion vector detector 1704 shown in FIG. 18 will be described.

FIG. 20 is a view showing the position of the block in an image to be generated in this example by block matching.

A correlative value calculator 1801 obtains the correlative values Drij(Vx,Vy) as a result of the calculation expressed by equations (25) and (26).

A motion vector calculator 1802 obtains the moving distance (Vx,Vy) which corresponds to the minimum correlative value Drij(Vx,Vy). The moving distance (Vx,Vy) obtained by the motion vector calculator 1802 is the motion vector MVij in the motion vector detection block Bij. The motion vector MVij is stored in a motion vector memory 1804. The correlative values Drij(Vx,Vy) are used for determining the reliability of the motion vector obtained by the motion vector calculator 1802. A motion vector reliability determinator 1803 obtains the average value, the maximum value, and the minimum value of the correlative values Drij(Vx,Vy), and determines the reliability of the motion vector based on the average value, the maximum value, and the minimum value. Thus, a first motion vector reliability determination result MFij(1) is obtained. The result MFij(1) is input to a threshold selector 1807. If the result MFij(1) indicates that the motion vector has reliability, a threshold C1 is selected; and if the result MFij(1) indicates that the motion vector has no reliability, a threshold C2 is selected. Either the threshold C1 or C2 is output as the threshold Co.

FIG. 21 is a view illustrating the relationship between a block Bij and peripheral eight blocks in the vicinity of the block Bij. The reliability of the motion vector MVij in the block Bij is determined, based on the correlation between the motion vector MVij and the motion vectors detected in the peripheral eight blocks B(i−1)(j−1), B(i−1)j, B(i−1)(j+1), Bi(j−1), Bi(j+1), B(i+1)(j−1), B(i+1)j, and B(i+1)(j+1). The addresses in the motion vector memory 1804 are controlled by a motion vector memory address controller 1805 so that the motion vectors in the block Bij and the peripheral eight blocks can be output from the motion vector memory 1804. The motion vector MVij is input to the motion estimation interpolator 1705 and used for generating a signal by motion estimation interpolation. The motion vector MVij and the motion vectors in the peripheral eight blocks are input to a motion vector correlative value calculator 1806. The motion vector correlative value calculator 1806 obtains the correlative value Mrij which indicates the correlation between the motion vector MVij and the motion vectors in the peripheral eight blocks. Such a correlative value Mrij is obtained by equations (27), (28), (29) and (30).

Equations <<<(27), (28), (29) and (30)>>>

$$Mrij = \sum_{n=i-1}^{i+1} \sum_{m=j-1}^{j+1} JD1\left(\sqrt{|Vxij - Vxnm|^2 + |Vyij - Vynm|^2} \leq Cn\right) \quad (27)$$

$$Mrij = \sum_{n=i-1}^{i+1} \sum_{m=j-1}^{j+1} JD2(|Vxij - Vxnm| \leq Cnx, |Vyij - Vynm| \leq Cny,) \quad (28)$$

$$Mrij = \sum_{n=-1}^{i+1} \sum_{m=j-1}^{j+1} \sqrt{|Vxij - Vxnm|^2 + |Vyij - Vynm|^2} \quad (29)$$

$$Mrij = \sum_{n=-1}^{i+1} \sum_{m=j-1}^{j+1} (|Vxij - Vxnm| + |Vyij - Vynm|) \quad (30)$$

where

Vxij: x-direction component of MVij in the block Bij
Vyij: y-direction component of MVij in the block Bij
Vxnm: x-direction component of MVnm in the block Bnm
Vynm: y-direction component of Mvnm in the block Bnm
$i-1 \leq n \leq i+1$, $j-1 \leq m \leq i+1$.
Cn, Cnx, Cny: threshold
JD1(a): function by which 1 is output if a is true and 0 is output if a is false.
JD2(a,b): function by which 1 is output if both a and b are true and 0 is output otherwise.

In equation (27), the Euclidean distance between the motion vector MVij and each Mvnm is found. The number of the peripheral blocks corresponding to the euclidean distance of the threshold Cn or below is determined to be the motion vector correlative value Mrij.

In equation (28), the number of the peripheral blocks in which the differential absolute value between Vxij and Vxnm is the threshold Cnx or below and further the differential absolute value between Vyij and Vynm is the threshold Cny or below is determined to be the motion vector correlative value Mrij.

In equation (29), the euclidean distance between the motion vector Mvij and each Mvnm is found. Such euclidean distances obtained regarding all the peripheral blocks are summated, and the resultant value is determined to be the motion vector correlative value Mrij.

In equation (30), the differential absolute value between Vxij and Vxnm is obtained regarding all the peripheral blocks, and the differential absolute value between Vyij and Vynm is obtained regarding all the peripheral blocks. The sum of such differential absolute values are summated. The resultant value is determined to be the motion vector correlative value Mrij.

The correlative value Mrij obtained by the motion vector correlative value calculator 1806 is compared with the threshold Co selected by the threshold selector 1807 by a comparator 1808. If Mrij is equal to or less than Co, the motion vector Mvij is determined to have reliability. Otherwise, the motion vector Mvij is determined to have no reliability. Such a result is output as a second motion vector reliability determination result MFij(2).

The determination of the reliability of the motion vector will be described in detail.

In this example, block matching is used for detecting a motion vector. An image having detailed patterns changes drastically from field to field. In the case where the image in the block Bij shown in FIG. 20 has such detailed patterns, the motion vector Mvij detected in the block Bij tends to have high reliability. By contrast, an image having a large flat pattern does not change in appearance from field to field. In the case where the image in the block Bij is such a large flat pattern, the motion vector Mvij detected in the block Bij tends to have low reliability. In the latter case, the average value of the correlative values Drij(Vx,Vy) is relatively low, and the difference between the maximum value and the minimum value is relatively small. The reliability determination result MFij(1) obtained by the motion vector reliability determinator 1803 using the average, maximum and minimum values of the correlative values Drij(Vx,Vy) is effective for such an image having a large flat pattern or an image which changes very little.

In a moving image generated by panning a camera or a moving image which contains a large moving object, the correlation between the motion vector Mvij and each of the motion vectors in the peripheral blocks increases if a correct motion vector Mvij is detected. Accordingly, MFij(2) which is output based on such correlation is effective for such an image. In the case where such correlation is used for determining the reliability of the motion vector, the determination result is not substantially related to the pattern in the block Bij.

As is appreciated from the above description, the reliability determination in this example uses the two determination methods. The motion vector reliability determinator 1803 uses the average, maximum and minimum values of the correlative values Drij(Vx,Vy). The motion vector correlative value calculator 1806 obtains the motion vector correlative value Mrij. The motion vector correlative value Mrij is compared with the threshold Co by the comparator 1808. The threshold Co is obtained based on MFij(1) which is output by the motion vector reliability determinator 1803. In order to emphasize MFij(1), either the threshold C1 or C2 is selected as the threshold Co based on MFij(1). As is described above, if MFij(1) indicates that the motion vector has reliability, the threshold C1 is selected. If MFij(1) indicates that the motion vector has no reliability, the threshold C2 is selected. Such selection is performed because the criteria for determination is lower in the case where the motion vector has reliability than in the case where the motion vector has no reliability. When the motion vector correlative value Mrij is found by equation (27) and (28), the correlative value Mrji is greater as the correlation is higher. Thus, the thresholds C1 and C2 which are input to the threshold selector 1807 are set to be C1<C2. When the motion vector correlative value Mrij is found by equation (29) and (30), the correlative value Mrji is smaller as the correlation is higher. Thus, the thresholds C1 and C2 are set to be C1>C2.

In this example, the criteria for the determination for finding the second motion vector determination result is switched based on the first motion vector determination result. Accordingly, the advantages of both the first determination and the second determination can be utilized. Thus, highly accurate determination can be performed.

The reliability determination will be described in detail by example.

FIG. 22 is a view of a motion vector in one block which is different from the motion vectors in the other blocks. The direction of the motion vector in the central motion vector detection block Bij is different from that of the other motion vectors. In such a case, there is a high possibility that the motion vector in the central block is incorrect. However, the motion vector reliability determinator 1803, which uses the average, maximum and minimum values of the correlative values, may determine that the motion vector has reliability, depending on the pattern in the block Bij. By contrast, the motion vector correlative value Mrij obtained by equation (27) and (28) is extremely small, and Mrij obtained by equation (29) and (30) is extremely large. Thus, the second determination result indicates that the motion vector has no reliability. Even if the first determination result indicates incorrectly that the motion vector has reliability, the second determination result MFij(2) indicates correctly that the motion vector has no reliability. As is described above, if Mrij obtained by equation (27) and (28) is greater than the threshold Co, MFij(2) indicates that the motion vector has reliability; and otherwise, MFij(2) indicates that the motion vector has no reliability. If Mrij obtained by equation (29) and (30) is smaller than the threshold Co, MFij(2) indicates that the motion vector has reliability; and otherwise, MFij(2) indicates that the motion vector has no reliability.

FIG. 23 is a view of motion vectors which are substantially the same in all the blocks. In such a case, there is a high possibility that the motion vector in the central block is correct. If the motion vector reliability determinator 1803 determines that the motion vector has no reliability, the following operation is performed. The threshold selector 1807 outputs the threshold C2 as Co. The correlation between the motion vector in the central block and the other motion vectors is high. The motion vector correlative value Mrij obtained by equation (27) and (28) is extremely large. The value Mrij obtained by equation (29) and (30) is extremely small. The comparator 1808 compares Mrij and Co (namely, C2 in this case). As a result, the highly accurate second determination result MFij(2) indicates that the motion vector has reliability.

By performing determination of the reliability twice, locally incorrect determination can be eliminated. Further, since the first determination result is reflected on the threshold used for the second determination, the advantages of both the first and second determinations can be utilized.

The motion vector Mvij and the second determination result MFij(2) are input to the motion estimation interpolator 1705 shown in FIG. 17. The motion vector Mvij is divided by two and allocated on the interpolated pixel in the current field. Using such a motion vector, an image is generated with motion estimation from the previous field. When the motion vector is determined to have reliability, an interpolated image selection signal SI is output. The interpolated image selection signal SI causes the interpolated image selector 1707 to select the interpolated signal IMmv generated by the motion estimation interpolator 1705 if MFij(2) indicates that the motion vector has reliability, and to select an interpolated signal IMfd generated by an intrafield interpolator 1706 if MFij(2) indicates that the motion vector has no reliability.

In generating the interpolated pixel in the intrafield interpolator 1706, the average of two original pixels above and below the interpolated pixel in the current field can be used. Alternatively, lagrange interpolation can be performed using four original pixels above and below the interpolated pixel, or cubic convolution interpolation can be used.

As has been described so far, the progressive scanning conversion apparatus 4 in this example determines the reliability of the motion vector based on two factors: one is the average, maximum and minimum values of the correlative values required for detecting the motion vector; and the other is the correlation between the detected motion vector and the motion vectors in the vicinity thereof. Accordingly, the motion vector is determined to have reliability when the motion vector is correctly detected in a block including an image drastically changing, and is determined to have no reliability when the motion vector is correctly detected in a block including an image changing little. Only the motion vector which is determined to have reliability is used for generating an interpolated signal in the block including an image drastically changing.

When the motion vector is determined to have no reliability, no interpolated signal is generated. This occurs in a block including an image changing little. An interpolated signal in such a block is generated by intrafield interpolation.

Due to such a system, a progressive scan signal IMni, which is output from the time axis compressor 1708, forms a high quality image having no interline flicker or distortion.

EXAMPLE 5

Figure 24:
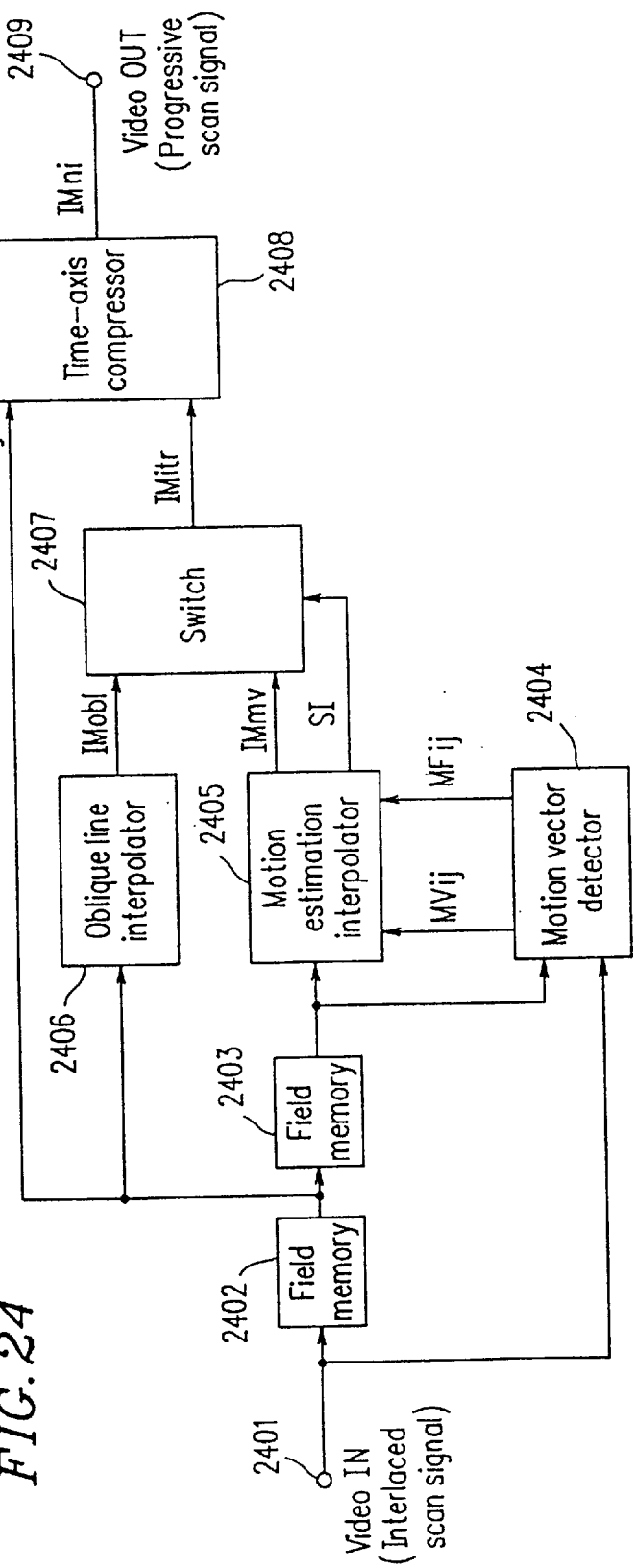
FIG. 24 is a block diagram of a progressive scan conversion apparatus in a fifth example according to the present invention.

FIG. 24 is a block diagram of a progressive scan conversion apparatus 5 in a fifth example according to the present invention.

A 2:1 interlaced scan video signal which is input to an input terminal 2401 is delayed by field memories 2402 and 2403. Thus, a signal delayed by the field memory 2402 by one field (current field signal), a signal delayed by the field memories 2402 and 2403 by two signals (previous field signal), and a signal which is not delayed (next field signal) are obtained simultaneously. A motion vector detector 2404 (described in detail later) detects a motion vector MVij for an interpolated pixel in the current field with such precision as to have a fractional value. Simultaneously, the motion vector detector 2404 outputs a motion vector reliability determination result MFij, which indicates the reliability of the motion vector MVij. A motion estimation interpolator 2405 generates an interpolated signal IMmv in the current field, based on the signal in the previous field corresponding to the interpolated signal. Such generation is performed, using the motion vector MVij and the motion vector reliability determination result MFij which are output from the motion vector detector 2404. The motion estimation interpolator 2405 also outputs an interpolated image selection signal SI to a switch 2407. By the interpolated image selection signal SI, the switch 2407 selects the interpolated signal IMmv generated by the motion estimation interpolator 2405 if the motion vector MVij is determined to have reliability and not to fulfill the condition of pairing artifact (described in detail later). If the motion vector MVij is determined to have no reliability and to fulfill the condition of pairing artifact, the switch 2407 selects an interpolated signal IMobl generated by an oblique line interpolator 2406 (described in detail later).

Briefly, the oblique line interpolator 2406 generates an interpolated signal by using original pixels lined in an oblique direction in the current field having a high level of correlation.

The switch 2407 receives the interpolated signals IMmv and IMobl and then outputs an optimum interpolated signal IMitr by the interpolated image selection signal. An original signal IMorg in the current field and the interpolated signal IMitr are each time axis-compressed to signals having a data rate which is twice the data rate of the original signals by a time axis compressor 2408, and are output alternately line by line. Thus, a progressive scan signal IMni is output from an output terminal 2409.

Figure 25:
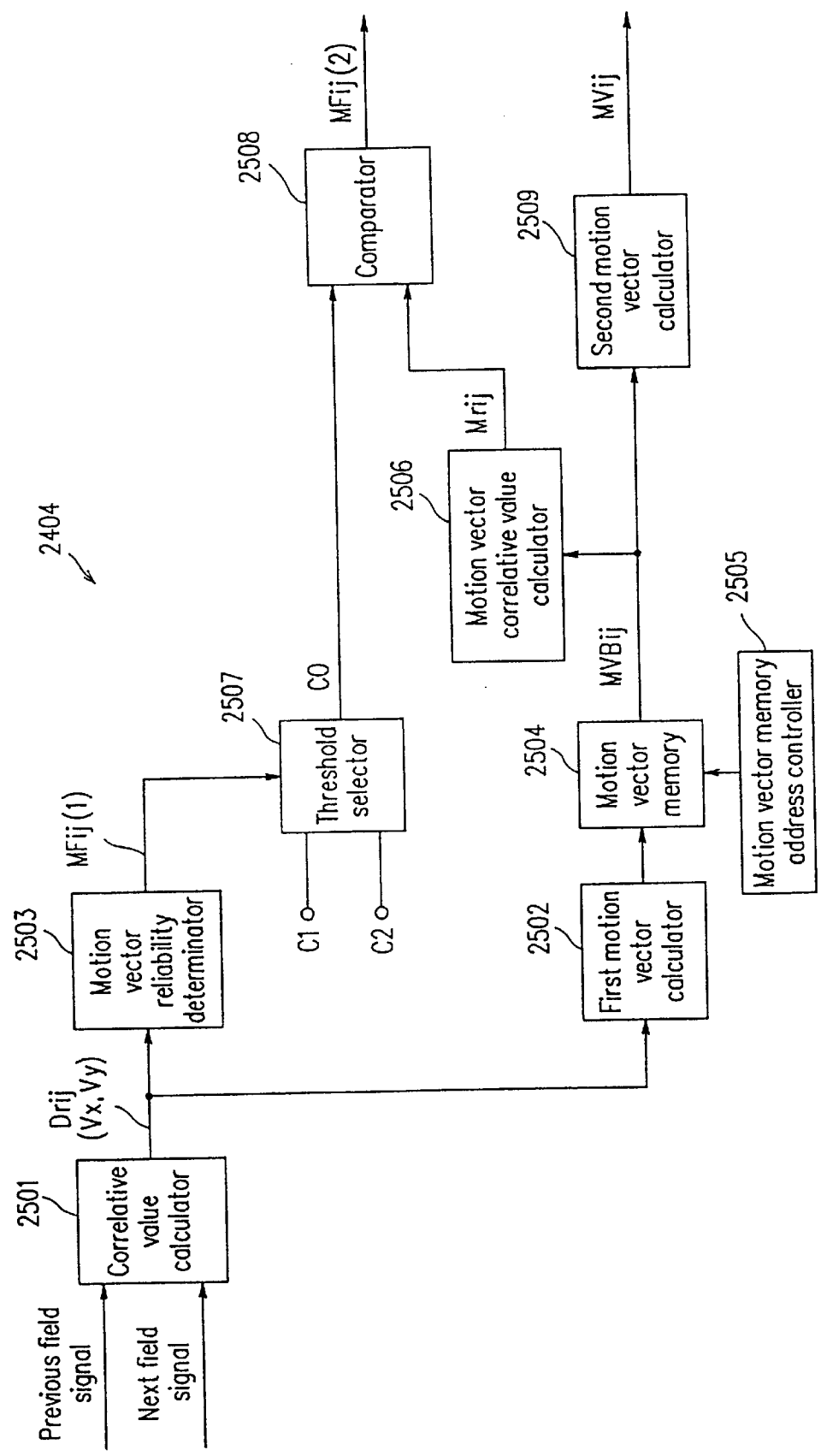
FIG. 25 is a detailed block diagram of a motion vector detector shown in FIG. 24.

FIG. 25 is a detailed block diagram of the motion vector detector 2404. The motion vector detector 2404 operates in the same manner as the motion vector detector 1704 for determining the reliability of the motion vector, but operates in a slightly different manner for detection of the motion vector.

The motion vector detector 2404 detects the motion vector in the following manner.

A correlative value calculator 2501 obtains correlative values Drij(Vx,Vy) in the motion vector detection block Bij, using the previous field signal and the next field signal based on equations (25) and (26). The moving distance (Vx, Vy) which corresponds to the minimum correlative value Drij (Vx,Vy) is found by a first motion vector calculator 2502 (for example, by block matching method). The moving distance (Vx,Vy) found by the first motion vector calculator 2502 is the motion vector MVBij in the block Bij. The motion vector MVBij is stored in a motion vector memory 2504. The correlative values Drij(Vx,Vy) are used for determining the reliability of the motion vector obtained by the first motion vector calculator 2502. A motion vector reliability determinator 2503 obtains the average value, the maximum value, and the minimum value of the correlative values Drij(Vx,Vy), and determines the reliability the motion vector based on these three values. Thus, a first motion vector reliability determination result MFij(1) is obtained. The result MFij(1) is input to a threshold selector 2507. If the result MFij(1) indicates that the motion vector has reliability, a threshold C1 is selected; and if the result MFij(1) indicates the motion vector has no reliability, a threshold C2 is selected. Either the threshold C1 or C2 is output as the threshold Co.

In order to determine the reliability of the motion vector MVBij based on the correlation between the motion vector MVBij and the motion vectors in the peripheral blocks, the addresses in the motion vector memory 2504 are controlled by a motion vector memory address controller 2505. The motion vector memory address controller 2505 outputs such an address control signal that outputs the motion vector MVBij and the motion vectors in the peripheral blocks. The motion vector MVBij and the motion vectors in the peripheral blocks are input to a motion vector correlative value calculator 2506. The motion vector correlative value calculator 2506 obtains the correlative value Mrij which indicates the correlation between the motion vector MVij and the motion vectors in the peripheral blocks. Such a correlative value Mrij is obtained by equations (27), (28), (29) and (30).

The correlative value Mrij is compared with the threshold Co by a comparator 2508. When Mrij is obtained by equation (27) and (28), MFij(2) indicates that the motion vector has reliability if Mrji>Co, and MFij(2) indicates that the motion vector has no reliability if Mrji≦Co. When Mrij is obtained by equation (29) and (30), MFij(2) indicates that the motion vector has reliability if Mrji<Co, and MFij(2) indicates that the motion vector has no reliability if Mrji≧Co.

The motion vector MVBij from the motion vector memory 2504 is output by a second motion vector calculator 2509 as a motion vector MVij which is so precise as to have a fractional value. The block matching method used in the first motion vector calculator 2502 cannot be used to detect a motion vector with such precision to have a fractional value. In this example, the second motion vector calculator 2509 is used to detect a motion vector with such precision. For detecting the motion vector, either one of the two methods can be used: one is a method of detecting a motion vector by block matching for an interpolated pixel generated between the sampled original pixels; and the other is a gradient method. The second motion vector calculator 2509 obtains the motion vector based on the motion vector MVBij, and thus the motion vector MVij is not greatly different from the motion vector MVBij.

Figure 26:
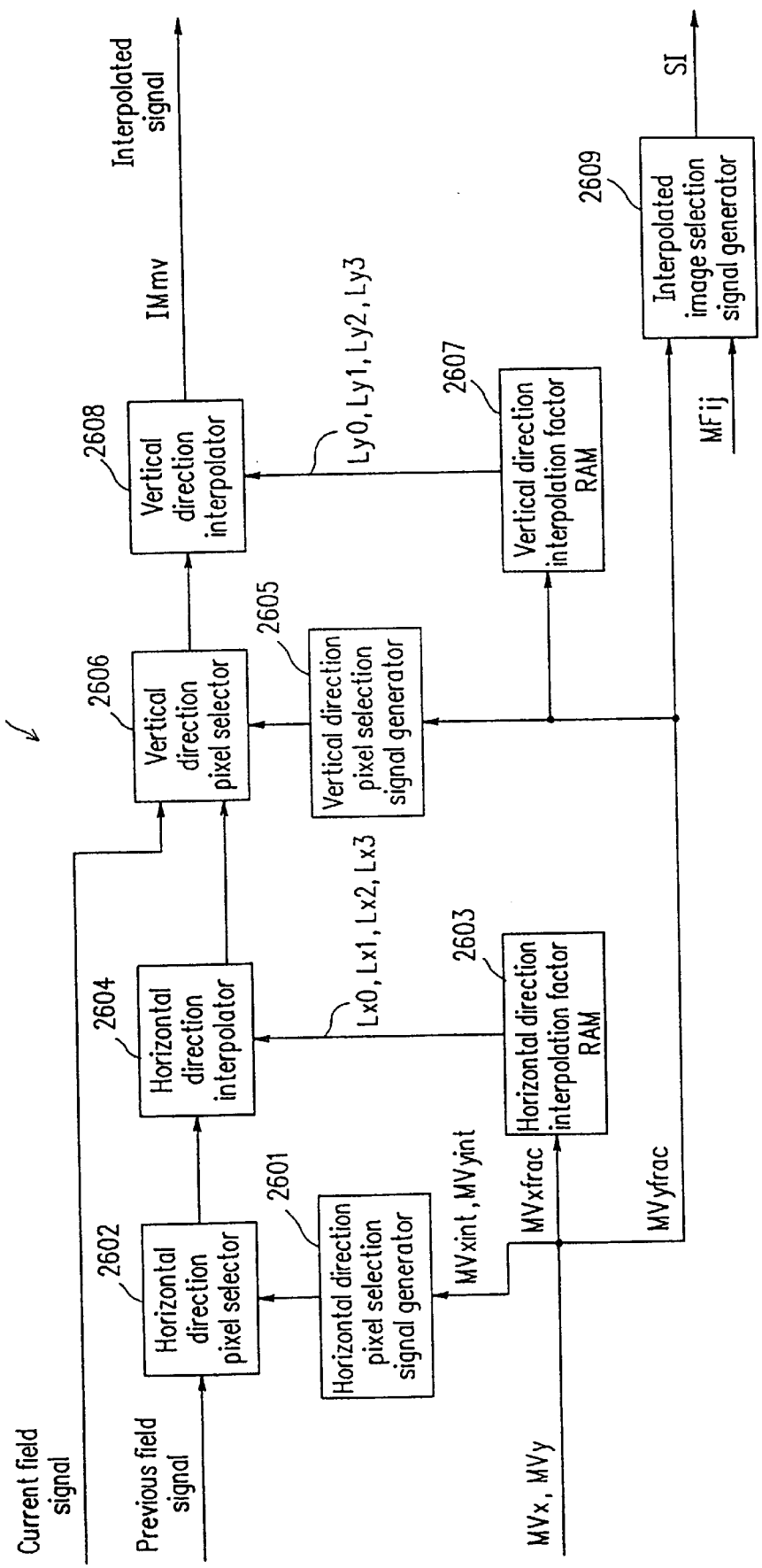
FIG. 26 is a detailed block diagram of a motion estimation interpolator shown in FIG. 24.

FIG. 26 is a detailed block diagram of the motion estimation interpolator 2405 shown in FIG. 24. The motion estimation interpolator 2405 generates an interpolated signal in the same manner as the motion estimation interpolator 1705 in the first example. The switch 2407 will be described in detail.

The motion vector MVij detected with such precision to have a fractional value by the second motion vector calculator 2509 is two-dimensional in the x direction (horizontal) and the y direction (vertical) and is expressed as (MVx, MVy). MVx represents the x direction motion vector, MVy represents the y direction motion vector, wherein MVx=MVxint (integer value)+MVxfrac (fractional value), and MVy=MVyint (integer value)+MVyfrac (fractional value).

Using MVxint and MVyint, a horizontal direction pixel selection signal generator 2601 generates a selection signal for selecting pixels in the previous field used for interpolation in the horizontal direction. Using the selection signal, a horizontal direction pixel selector 2602 selects pixels used for the interpolation in the horizontal direction. Using MVxfrac, horizontal direction interpolation factors Lx0, Lx1, Lx2 and Lx3 are retrieved from a horizontal direction interpolation factor RAM 2603. A horizontal direction interpolator 2604 multiplies the pixels selected by the horizontal direction pixel selector 2602 by their respective factors Lx1, Lx2, Lx3 and Lx4, and summates the resultant values. Thus, the interpolated pixels are generated by interpolation in the horizontal direction.

Next, using MVyfrac, a vertical direction pixel selection signal generator 2605 generates a selection signal for selecting pixels used for interpolation in the vertical direction. Using the selection signal, a vertical direction pixel selector 2606 selects either the pixels generated by the horizontal direction interpolator 2604 or the original pixels in the current field. Using MVyfrac, vertical direction interpolation factors Ly0, Ly1, Ly2 and Ly3 are retrieved from a vertical direction interpolation factor RAM 2607. A vertical direction interpolator 2608 multiplies the pixels selected by the vertical direction pixel selector 2606 by their respective factors Ly1, Ly2, Ly3 and Ly4, and summates the resultant values. Thus, the interpolated pixel IMmv is generated.

Using MVyfrac and MFij from the motion vector detector 2404, an interpolated image selection signal generator 2609 generates an interpolated image selection signal SI.

MFij indicates the reliability determination result of the motion vector detector 2404. When an interpolated signal is generated using an incorrectly detected motion vector, the image quality significantly deteriorates. Use of an incorrectly detected motion vector is prevented by MFij. In other words, when the motion vector is determined to have no reliability, an interpolated signal generated using such a motion vector is not used.

MVyfrac of 0.5 is the condition for pairing artifact. When MVyfrac=0.5, use of a motion vector does not improve the image quality significantly, but rather may deteriorate the image quality. In order to avoid this, in the first example, an interpolated signal is generated by filtering performed in the vertical direction using the original pixels in the current field. In this example, an interpolated signal is generated by line interpolation in an oblique direction. In order to realize such line interpolation, an interpolated image selection signal SI for causing selection of an interpolated signal generated by the oblique line interpolator 2406 is generated by the interpolated image selection signal generator 2609.

Accordingly, by the interpolated image selection signal SI which is output from the interpolated image selection signal generator 2609, the interpolated signal IMmv generated by the motion estimation interpolator 2405 is selected when the motion vector is determined to have reliability and MVyfrac is not 0.5. Otherwise, the interpolated signal IMobl generated by the oblique line interpolator 2406 is selected.

The oblique line interpolator 2406 generates an interpolated signal based on original pixels in the current field having the highest correlation. Namely, the original pixels in the highest correlation among the original pixels in the slope candidates −3 through +3 (FIG. 6). The oblique line interpolator 2406 can be the intrafield interpolator shown in FIG. 11, 12, 13, or 14.

Figure 27:
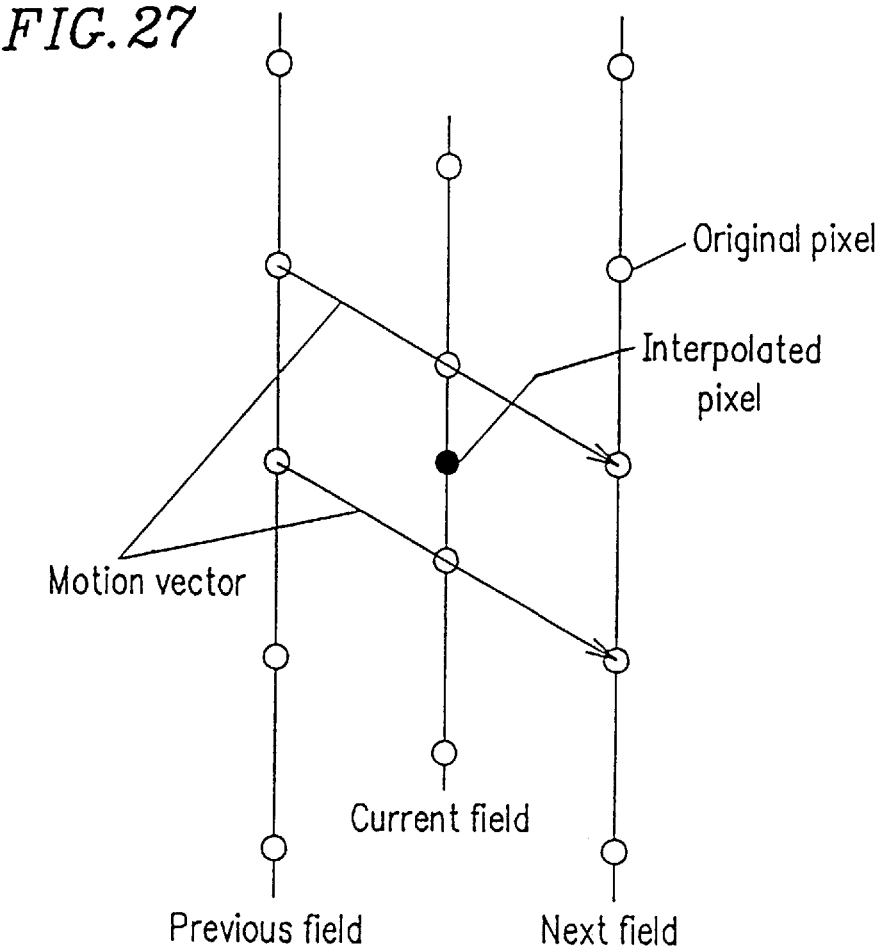
FIG. 27 is a view illustrating an interpolated signal in a current field overlapped with the interpolated signal in the previous field.
Figure 28:
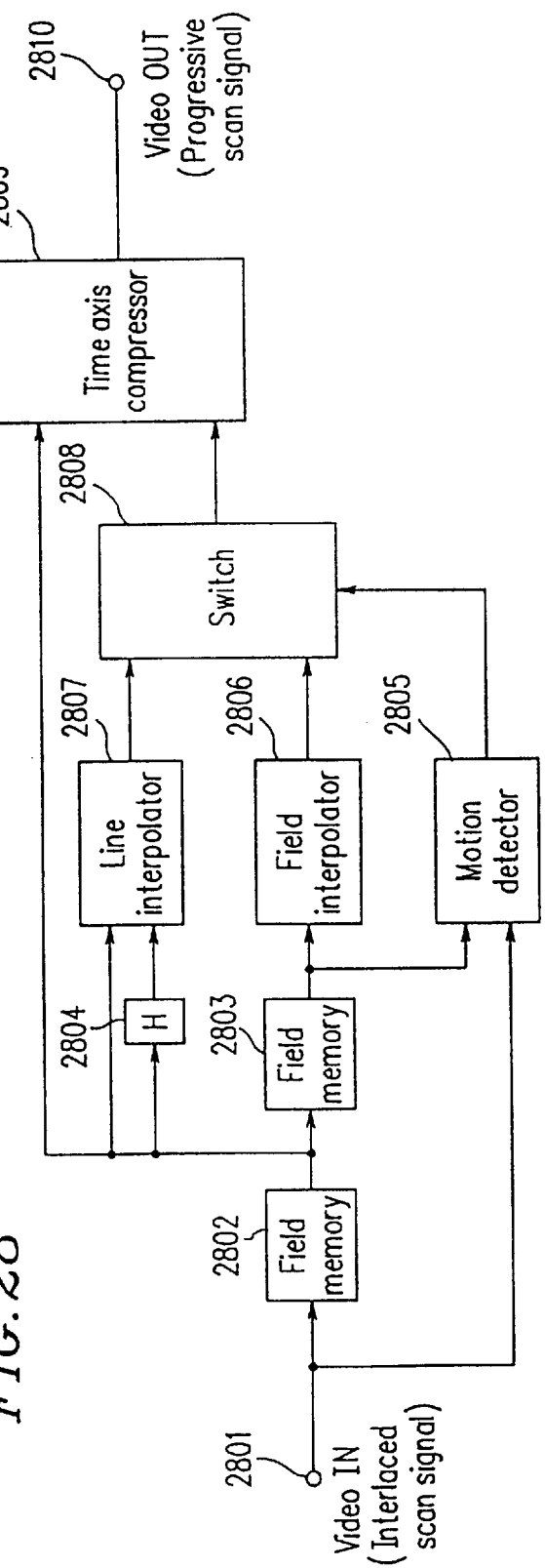
FIG. 28 is a block diagram of a conventional progressive scanning conversion apparatus.

The interpolated signal IMobl is very effective for an oblique edge or an oblique line. When the motion vector is correctly detected and MVyfrac=0.5, namely, when the condition for pairing artifact is fulfilled, the interpolated pixel in the current field overlaps the interpolated pixel in the previous field as is shown in FIG. 27. As is mentioned above, pairing artifact is one of the causes of image quality deterioration in a moving picture generated by interlaced scanning. The detected motion vector cannot be effectively used. When an image including the oblique edge or the oblique line (FIGS. 7 through 9) moves at a rate of 0.5 line per field (one line: one line in the interfaced scan image), namely, when the condition for pairing artifact is fulfilled, the following operation is performed. Since a motion vector cannot be used, an interpolated signal is generated by intrafield interpolation using original signals in the current field. If original signals in the vertical direction are used, the oblique edge is blurred and thus the pairing artifact cannot be completely eliminated. However, if original signals in an oblique direction are used, very effective interpolation can be performed for an oblique edge or an oblique line. Thus, the pairing artifact can be eliminated.

Interline flicker and pairing artifact are main causes of image quality deterioration. The pairing artifact is conspicuous for an oblique edge or an oblique line. According to the present invention, motion estimation interpolation using a motion vector and oblique line interpolation can be combined well, a high quality image with no interline flicker or pairing artifact can be obtained.

In the first through fifth examples, a RAM is used as a memory (for example, the horizontal direction interpolation factor RAM 109) but other types of memories such as a ROM (read only memory) or an EEPROM (electrically-erasable programmable ROM) can be used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A progressive scanning conversion apparatus for converting an interlaced scan signal into a progressive scan signal by performing interpolation based on original pixels which are obtained in a matrix by sampling the interlaced scan video signal in one field, the apparatus comprising:

slope direction detection means for detecting a slope direction of a pair of original pixels, the pixel values of which have a minimum correlative value among a plurality of pairs of original pixels which are symmetrical with respect to an interpolated pixel to be generated for conversion;

slope direction storage means for storing the slope direction detected by the slope direction detection means; and filter means for generating the interpolated pixel; wherein:

the slope direction detection means detects the slope direction from among a plurality of slope directions in a prescribed range, the center of the prescribed range being a prescribed slope direction stored in the slope direction storage means, the slope direction storage means sequentially stores slope direction detected by the slope direction detection means while outputting the prescribed slope direction among the stored slope directions, and the filter means generates the interpolated pixel for conversion based on a prescribed number of original pixels in the slope direction detected by the slope direction detection means.

2. A progressive scanning conversion apparatus according to claim 1, wherein the prescribed range includes a first original pixel which is located right with respect to and on the same scan line as one of the pair of original pixels in the prescribed slope direction stored in the slope direction storage means and includes a second original pixel which is located left with respect to and on the same scan line as the other one of the pair of original pixels.

3. A progressive scanning conversion apparatus according to claim 1, wherein the slope direction detection means evaluates the correlation of the plurality of pairs of original pixels symmetrical with respect to the interpolated pixel based on correlative values thereof, and determines the pair of original pixels having a minimum correlative value to have a highest level of correlation.

4. A progressive scanning conversion apparatus according to claim 1, wherein the slope direction detection means generates the interpolated pixel based on the prescribed slope direction stored in the slope direction storage means in the case one pair of pixels having a minimum correlative value cannot be specified.

5. A progressive scanning conversion apparatus according to claim 1, wherein the filter means outputs an average value of the values of the pair of original pixels having a minimum correlative value as the pixel value of the interpolated pixel.

6. A progressive scanning conversion apparatus according to claim 1, wherein the filter means generates the interpolated pixel based on the original pixels on a plurality of lines vertically interposing the interpolated pixel to be generated.

7. A progressive scanning conversion apparatus for converting an interlaced scan signal into a progressive scan signal by performing interpolation based on original pixels which are obtained in a matrix by sampling the interlaced scan video signal in one field, the apparatus comprising:

original pixel selection means for selecting a plurality of pairs of original pixels which are symmetrical with respect to an interpolated pixel to be generated for conversion;

correlative value calculation means for calculating correlative values of the values of the pairs of original pixels selected by the original pixel selection means;

edge information detection means for detecting edge information of each of the original pixels;

correlative value correction means for correcting the correlative values calculated by the correlative value calculation means, using the edge information detected by the edge information detection means;

slope direction detection means for detecting a slope direction of the pair of original pixels having a minimum correlative value among the correlative values obtained by the correlative value correction means; and filter means for generating the interpolated pixel based on a prescribed number of original pixels in the slope direction detected by the slope direction detection means.

8. A progressive scanning conversion apparatus according to claim 7, wherein the correlative value correction means includes a look-up table memory.

9. A progressive scanning conversion apparatus according to claim 7, wherein the slope direction detection means evaluates the correlation of the plurality of pairs of original pixels based on differential absolute values thereof, and determines the pair of original pixels having a minimum correlative value to have a highest level of correlation.

10. A progressive scanning conversion apparatus according to claim 7, wherein the filter means outputs an average value of the pair of original pixels having a minimum correlative value as the pixel value of the interpolated pixel.

11. A progressive scanning conversion apparatus according to claim 7, wherein the filter means generates the interpolated pixel based on the original pixels on a plurality of lines vertically interposing the interpolated pixel to be generated for conversion.

12. A progressive scanning conversion apparatus for converting an interlaced scan signal into a progressive scan signal by performing interpolation based on original pixels which are obtained in a matrix by sampling the interlaced scan video signal in one field, the apparatus comprising:

original pixel selection means for selecting a plurality of pairs of original pixels which are symmetrical with respect to an interpolated pixel to be generated for conversion;

correlative value calculation means for calculating correlative values of the values of the pairs of original pixels selected by the original pixel selection means;

vertical direction edge information detection means for detecting edge information in the vertical direction of each of the original pixels;

first correlative value correction means for correcting the correlative values calculated by the correlative value calculation means, using the edge information in the vertical direction detected by the vertical direction edge information detection means;

second correlative value correction means for correcting the correlative values obtained by the first correlative value correction means using the edge information in the vertical direction of each of the original pixels;

slope direction detection means for detecting a slope direction of the pair of original pixels having a minimum correlative value among the correlative values obtained by the first and second correlative value correction means; and filter means for generating the interpolated pixel based on a prescribed number of original pixels in the slope direction detected by the slope direction detection means.

13. A progressive scanning conversion apparatus according to claim 12, wherein the first correlative value correction means includes a look-up table memory.

14. A progressive scanning conversion apparatus according to claim 12, wherein the second correlative value correction means includes a look-up table memory.

15. A progressive scanning conversion apparatus according to claim 12, wherein the slope direction detection means evaluates the correlation of the plurality of pairs of original pixels based on differential absolute values thereof, and determines the pair of original pixels having a minimum correlative value to have a highest level of correlation.

16. A progressive scanning conversion apparatus according to claim 12, wherein the filter means outputs an average value of the values of the pair of original pixels having a minimum correlative value as the pixel value of the interpolated pixel for conversion.

17. A progressive scanning conversion apparatus according to claim 12, wherein the filter means generates the interpolated pixel based on the original pixels on a plurality of lines vertically interposing the interpolated pixel to be generated.

* * * * *